United States Patent
Haber et al.

(10) Patent No.: US 12,522,657 B2
(45) Date of Patent: Jan. 13, 2026

(54) THERAPEUTIC TARGETING OF CADHERIN 11 IN CANCER

(71) Applicants: The General Hospital Corporation, Boston, MA (US); The Brigham and Women's Hospital, Inc., Boston, MA (US)

(72) Inventors: Daniel A. Haber, Chestnut Hill, MA (US); Michael Brenner, Newton, MA (US); Shyamala Maheswaran, Lexington, MA (US); David T. Ting, Dover, MA (US); Douglas Micalizzi, Somerville, MA (US)

(73) Assignees: The General Hospital Corporation, Boston, MA (US); The Brigham and Women's Hospital, Inc., Boston, MA (US)

(*) Notice: Subject to any disclaimer, the term of this patent is extended or adjusted under 35 U.S.C. 154(b) by 0 days.

(21) Appl. No.: 18/573,191

(22) PCT Filed: Jun. 22, 2022

(86) PCT No.: PCT/US2022/034443
§ 371 (c)(1),
(2) Date: Dec. 21, 2023

(87) PCT Pub. No.: WO2022/271771
PCT Pub. Date: Dec. 29, 2022

(65) Prior Publication Data
US 2024/0269310 A1  Aug. 15, 2024

Related U.S. Application Data

(60) Provisional application No. 63/213,540, filed on Jun. 22, 2021.

(51) Int. Cl.
| | |
|---|---|
| *C07K 16/28* | (2006.01) |
| *A61K 39/00* | (2006.01) |
| *A61K 47/68* | (2017.01) |
| *A61P 35/04* | (2006.01) |
| *G01N 33/574* | (2006.01) |

(52) U.S. Cl.
CPC ........ *C07K 16/28* (2013.01); *A61K 47/68037* (2023.08); *A61K 47/6849* (2017.08); *A61P 35/04* (2018.01); *G01N 33/57492* (2013.01); *A61K 2039/505* (2013.01); *A61K 47/6855* (2017.08); *A61K 47/6859* (2017.08); *C07K 2317/31* (2013.01); *G01N 2333/46* (2013.01)

(58) Field of Classification Search
CPC .............. A61K 47/68037; A61K 45/06; A61K 47/6849; A61P 35/04; G01N 33/57492; G01N 2333/46
See application file for complete search history.

(56) References Cited

U.S. PATENT DOCUMENTS

| | | |
|---|---|---|
| 10,364,289 B2 | 7/2019 | Nam et al. |
| 2004/0023316 A1 | 2/2004 | Reiter et al. |
| 2009/0297530 A1 | 12/2009 | Wang-Johanning |
| 2011/0274703 A1 | 11/2011 | Agarwal et al. |
| 2012/0128693 A1* | 5/2012 | Byers ............... A61P 29/00 514/249 |
| 2015/0352225 A1 | 12/2015 | Rabuka et al. |
| 2016/0095939 A1* | 4/2016 | Goldenberg ....... A61K 47/6811 424/1.49 |
| 2020/0181249 A1 | 6/2020 | Curtis et al. |

FOREIGN PATENT DOCUMENTS

| | | |
|---|---|---|
| WO | WO-2013/149058 A1 | 10/2013 |
| WO | WO-2014/165082 A3 | 3/2015 |

OTHER PUBLICATIONS

Armstrong AJ et al. Circulating tumor cells from patients with advanced prostate and breast cancer display both epithelial and mesenchymal markers. Mol Cancer Res. Aug. 2011;9(8):997-1007. doi: 10.1158/1541-7786.MCR-10-0490. Epub Jun. 10, 2011. PMID: 21665936; PMCID: PMC3157566. (Year: 2011).*

Chen JH et al. Monospecific antibody targeting of CDH11 inhibits epithelial-to-mesenchymal transition and represses cancer stem cell-like phenotype by up-regulating miR-335 in metastatic breast cancer, in vitro and in vivo. BMC Cancer. Jun. 27, 2019; 19(1):634. doi: 10.1186/s12885-019-5811-1. (Year: 2019).*

Lee DM, Kiener HP, Agarwal SK, Noss EH, Watts GF, Chisaka O, Takeichi M, Brenner MB. Cadherin-11 in synovial lining formation and pathology in arthritis. Science. Feb. 16, 2007;315(5814):1006-10. doi: 10.1126/science.1137306. Epub Jan. 25, 2007. PMID: 17255475. (Year: 2007).*

West H, Jin J. Neoadjuvant Therapy. JAMA Oncol. 2015; 1(4):550. doi: 10.1001/jamaoncol.2015.1241 (Year: 2015).*

Abnova Product Information, CDH11 monoclonal antibody (M25), clone 2C67. Downloaded Jun. 12, 2024. (Year: 2024).*

Peran I et al. Cadherin 11 Promotes Immunosuppression and Extracellular Matrix Deposition to Support Growth of Pancreatic Tumors and Resistance to Gemcitabine in Mice. Gastroenterology. Mar. 2021;160(4):1359-1372.e13. doi: 10.1053/j.gastro.2020.11. 044. Epub Dec. 9, 2020. PMID: 33307028. (Year: 2021).*

Almagro JC, Daniels-Wells TR, Perez-Tapia SM, Penichet ML. Progress and Challenges in the Design and Clinical Development of Antibodies for Cancer Therapy. Front Immunol. Jan. 4, 2018;8:1751. doi: 10.3389/fimmu.2017.01751. PMID: 29379493; PMCID: PMC5770808. (Year: 2018).*

(Continued)

*Primary Examiner* — Janet L Andres
*Assistant Examiner* — Carol Ann Chase
(74) *Attorney, Agent, or Firm* — Clark & Elbing LLP

(57) ABSTRACT

The present invention relates to methods, uses, and compositions for the treatment of cancer (e.g., a breast cancer or a pancreatic cancer). More specifically, the invention concerns the treatment of patients having cancer for the therapeutic inhibition of cancer cell growth and metastasis with an anti-Cadherin 11 monoclonal antibody with specific monoclonal antibody clones 23C6 or 3H10.

22 Claims, 40 Drawing Sheets
Specification includes a Sequence Listing.

(56) References Cited

OTHER PUBLICATIONS

Winkler K, Kramer A, Küttner G, Seifert M, Scholz C, Wessner H, Schneider-Mergener J, Höhne W. Changing the antigen binding specificity by single point mutations of an anti-p24 (HIV-1) antibody. J Immunol. Oct. 15, 2000; 165(8):4505-14. doi: 10.4049/jimmunol.165.8.4505. PMID: 11035090. (Year: 2000).*

Herold EM, John C, Weber B, Kremser S, Eras J, Berner C, Deubler S, Zacharias M, Buchner J. Determinants of the assembly and function of antibody variable domains. Sci Rep. Sep. 25, 2017;7(1):12276. doi: 10.1038/s41598-017-12519-9. PMID: 28947772; PMCID: PMC5613017. (Year: 2017).*

"Ig heavy chain V region (clone ASC-8)—mouse (fragment)," GenBank submission PH1710, <https://www.ncbi.nlm.nih.gov/protein/PH1710>, last modified Mar. 17, 1999, retrieved on Dec. 18, 2023 (1 page).

International Search Report and Written Opinion for International Application No. PCT/US22/34443, mailed Dec. 14, 2022 (12 pages).

Birtolo et al., "Cadherin-11 Is a Cell Surface Marker Up-Regulated in Activated Pancreatic Stellate Cells and Is Involved in Pancreatic Cancer Cell Migration," Am J Pathol. 187(1):146-155 (Jan. 2017).

Lee et al., "Inhibition of cell adhesion by a cadherin-11 antibody thwarts bone metastasis," Mol Cancer Res. 11(11):1401-11 (Aug. 2013).

\* cited by examiner

SEQUENCE LISTING

```
<160> NUMBER OF SEQ ID NOS: 36

<210> SEQ ID NO 1
<211> LENGTH: 8
<212> TYPE: PRT
<213> ORGANISM: Mus musculus

<400> SEQUENCE: 1

Gly Tyr Ser Phe Thr Asp Tyr Asn
1               5
```

<210> SEQ ID NO 2
<211> LENGTH: 8
<212> TYPE: PRT
<213> ORGANISM: Mus musculus

<400> SEQUENCE: 2

Ile Asn Pro Asn Tyr Gly Thr Thr
1               5

<210> SEQ ID NO 3
<211> LENGTH: 12
<212> TYPE: PRT
<213> ORGANISM: Mus musculus

<400> SEQUENCE: 3

Thr Arg Leu Tyr Tyr Gly Ser Arg Tyr Phe Asp Val
1               5                   10

<210> SEQ ID NO 4
<211> LENGTH: 7
<212> TYPE: PRT
<213> ORGANISM: Mus musculus

<400> SEQUENCE: 4

Ser Ser Val Ser Ser Ser Tyr
1               5

<210> SEQ ID NO 5
<211> LENGTH: 3
<212> TYPE: PRT
<213> ORGANISM: Mus musculus

<400> SEQUENCE: 5

Ser Thr Ser
1

<210> SEQ ID NO 6
<211> LENGTH: 9
<212> TYPE: PRT
<213> ORGANISM: Mus musculus

<400> SEQUENCE: 6

His Gln Tyr His Arg Ser Pro Pro Thr
1               5

<210> SEQ ID NO 7
<211> LENGTH: 119
<212> TYPE: PRT
<213> ORGANISM: Mus musculus

<400> SEQUENCE: 7

Glu Phe Gln Leu Gln Gln Ser Gly Pro Glu Leu Val Lys Pro Gly Ala
1               5                   10                  15

Ser Val Lys Ile Ser Cys Lys Ala Ser Gly Tyr Ser Phe Thr Asp Tyr
                20                  25                  30

Asn Met Asn Trp Val Lys Gln Ser Asn Gly Lys Ser Leu Glu Trp Ile
            35                  40                  45

Gly Ala Ile Asn Pro Asn Tyr Gly Thr Thr Tyr Asn Gln Lys Phe
        50                  55                  60

Lys Gly Lys Ala Thr Leu Thr Val Asp Gln Ser Ser Ser Thr Ala Tyr
65                  70                  75                  80

```
Met Gln Leu Asn Ser Leu Thr Ser Glu Asp Ser Ala Val Tyr Tyr Cys
                85                  90                  95

Thr Arg Leu Tyr Tyr Gly Ser Arg Tyr Phe Asp Val Trp Gly Thr Gly
            100                 105                 110

Thr Thr Val Thr Val Ser Ser
        115

<210> SEQ ID NO 8
<211> LENGTH: 108
<212> TYPE: PRT
<213> ORGANISM: Mus musculus

<400> SEQUENCE: 8

Gln Ile Val Val Thr Gln Ser Pro Ala Ile Met Ser Ala Ser Leu Gly
1               5                   10                  15

Glu Arg Val Thr Met Thr Cys Thr Ala Ser Ser Ser Val Ser Ser Ser
            20                  25                  30

Tyr Leu His Trp Tyr Gln Gln Lys Pro Gly Ser Ser Pro Lys Leu Trp
        35                  40                  45

Ile Tyr Ser Thr Ser Asn Leu Ala Ser Gly Val Pro Ala Arg Phe Ser
    50                  55                  60

Gly Ser Gly Ser Gly Thr Ser Tyr Ser Leu Thr Ile Ser Ser Met Glu
65                  70                  75                  80

Ala Glu Asp Val Ala Thr Tyr Tyr Cys His Gln Tyr His Arg Ser Pro
                85                  90                  95

Pro Thr Phe Gly Gly Gly Ala Lys Leu Glu Ile Lys
            100                 105

<210> SEQ ID NO 9
<211> LENGTH: 25
<212> TYPE: PRT
<213> ORGANISM: Mus musculus

<400> SEQUENCE: 9

Glu Phe Gln Leu Gln Gln Ser Gly Pro Glu Leu Val Lys Pro Gly Ala
1               5                   10                  15

Ser Val Lys Ile Ser Cys Lys Ala Ser
            20                  25

<210> SEQ ID NO 10
<211> LENGTH: 17
<212> TYPE: PRT
<213> ORGANISM: Mus musculus

<400> SEQUENCE: 10

Met Asn Trp Val Lys Gln Ser Asn Gly Lys Ser Leu Glu Trp Ile Gly
1               5                   10                  15

Ala

<210> SEQ ID NO 11
<211> LENGTH: 38
<212> TYPE: PRT
<213> ORGANISM: Mus musculus

<400> SEQUENCE: 11

Ser Tyr Asn Gln Lys Phe Lys Gly Lys Ala Thr Leu Thr Val Asp Gln
1               5                   10                  15

Ser Ser Ser Thr Ala Tyr Met Gln Leu Asn Ser Leu Thr Ser Glu Asp
            20                  25                  30
```

```
Ser Ala Val Tyr Tyr Cys
        35

<210> SEQ ID NO 12
<211> LENGTH: 11
<212> TYPE: PRT
<213> ORGANISM: Mus musculus

<400> SEQUENCE: 12

Trp Gly Thr Gly Thr Thr Val Thr Val Ser Ser
1               5                   10

<210> SEQ ID NO 13
<211> LENGTH: 26
<212> TYPE: PRT
<213> ORGANISM: Mus musculus

<400> SEQUENCE: 13

Gln Ile Val Val Thr Gln Ser Pro Ala Ile Met Ser Ala Ser Leu Gly
1               5                   10                  15

Glu Arg Val Thr Met Thr Cys Thr Ala Ser
            20                  25

<210> SEQ ID NO 14
<211> LENGTH: 17
<212> TYPE: PRT
<213> ORGANISM: Mus musculus

<400> SEQUENCE: 14

Leu His Trp Tyr Gln Gln Lys Pro Gly Ser Ser Pro Lys Leu Trp Ile
1               5                   10                  15

Tyr

<210> SEQ ID NO 15
<211> LENGTH: 36
<212> TYPE: PRT
<213> ORGANISM: Mus musculus

<400> SEQUENCE: 15

Asn Leu Ala Ser Gly Val Pro Ala Arg Phe Ser Gly Ser Gly Ser Gly
1               5                   10                  15

Thr Ser Tyr Ser Leu Thr Ile Ser Ser Met Glu Ala Glu Asp Val Ala
            20                  25                  30

Thr Tyr Tyr Cys
        35

<210> SEQ ID NO 16
<211> LENGTH: 10
<212> TYPE: PRT
<213> ORGANISM: Mus musculus

<400> SEQUENCE: 16

Phe Gly Gly Gly Ala Lys Leu Glu Ile Lys
1               5                   10

<210> SEQ ID NO 17
<211> LENGTH: 75
<212> TYPE: DNA
<213> ORGANISM: Mus musculus
```

<400> SEQUENCE: 17
gagttccagc tgcagcagtc tggacctgag ctggtgaagc ctggcgcttc agtgaagata    60
tcctgcaagg cttcc    75

<210> SEQ ID NO 18
<211> LENGTH: 51
<212> TYPE: DNA
<213> ORGANISM: Mus musculus

<400> SEQUENCE: 18
atgaactggg tgaagcagag caatggaaag agccttgagt ggattggagc a    51

<210> SEQ ID NO 19
<211> LENGTH: 114
<212> TYPE: DNA
<213> ORGANISM: Mus musculus

<400> SEQUENCE: 19
agttacaatc agaagttcaa gggcaaggcc acattgactg tagaccaatc ttccagcaca    60
gcctacatgc agctcaacag cctgacatct gaggactctg cagtctatta ctgt    114

<210> SEQ ID NO 20
<211> LENGTH: 34
<212> TYPE: DNA
<213> ORGANISM: Mus musculus

<400> SEQUENCE: 20
tggggcacag ggaccacggt caccgtctcc tcag    34

<210> SEQ ID NO 21
<211> LENGTH: 78
<212> TYPE: DNA
<213> ORGANISM: Mus musculus

<400> SEQUENCE: 21
caaattgttg tcacccagtc tccagcaatc atgtctgcat ctctagggga acgggtcacc    60
atgacctgca ctgccagc    78

<210> SEQ ID NO 22
<211> LENGTH: 51
<212> TYPE: DNA
<213> ORGANISM: Mus musculus

<400> SEQUENCE: 22
ttgcactggt accagcaaaa gccaggatcc tcccccaaac tctggattta t    51

<210> SEQ ID NO 23
<211> LENGTH: 108
<212> TYPE: DNA
<213> ORGANISM: Mus musculus

<400> SEQUENCE: 23
aacctggctt ctggagtccc agctcgcttc agtggcagtg ggtctgggac ctcttactct    60
ctcacaatca gcagcatgga ggctgaagat gttgccactt attattgc    108

<210> SEQ ID NO 24
<211> LENGTH: 30
<212> TYPE: DNA
<213> ORGANISM: Mus musculus

```
<400> SEQUENCE: 24
ttcggtggag gcgccaagct ggaaatcaaa                                    30

<210> SEQ ID NO 25
<211> LENGTH: 358
<212> TYPE: DNA
<213> ORGANISM: Mus musculus

<400> SEQUENCE: 25
gagttccagc tgcagcagtc tggacctgag ctggtgaagc ctggcgcttc agtgaagata    60
tcctgcaagg cttccggtta ctcattcact gactataata tgaactgggt gaagcagagc   120
aatggaaaga gccttgagtg gattggagca attaatccta actatggtac tactagttac   180
aatcagaagt tcaagggcaa ggccacattg actgtagacc aatcttccag cacagcctac   240
atgcagctca acagcctgac atctgaggac tctgcagtct attactgtac aagactttac   300
tacggtagta ggtacttcga tgtctggggc acagggacca cggtcaccgt ctcctcag     358

<210> SEQ ID NO 26
<211> LENGTH: 324
<212> TYPE: DNA
<213> ORGANISM: Mus musculus

<400> SEQUENCE: 26
caaattgttg tcacccagtc tccagcaatc atgtctgcat ctctagggga acgggtcacc    60
atgacctgca ctgccagctc aagtgtaagt tccagttact tgcactggta ccagcaaaag   120
ccaggatcct cccccaaact ctggatttat agcacatcca acctggcttc tggagtccca   180
gctcgcttca gtggcagtgg gtctgggacc tcttactctc tcacaatcag cagcatggag   240
gctgaagatg ttgccactta ttattgccac cagtatcatc gttccccacc gacgttcggt   300
ggaggcgcca agctggaaat caaa                                          324

<210> SEQ ID NO 27
<211> LENGTH: 24
<212> TYPE: DNA
<213> ORGANISM: Mus musculus

<400> SEQUENCE: 27
ggttactcat tcactgacta taat                                          24

<210> SEQ ID NO 28
<211> LENGTH: 24
<212> TYPE: DNA
<213> ORGANISM: Mus musculus

<400> SEQUENCE: 28
attaatccta actatggtac tact                                          24

<210> SEQ ID NO 29
<211> LENGTH: 36
<212> TYPE: DNA
<213> ORGANISM: Mus musculus

<400> SEQUENCE: 29
acaagacttt actacggtag taggtacttc gatgtc                             36

<210> SEQ ID NO 30
<211> LENGTH: 21
<212> TYPE: DNA
<213> ORGANISM: Mus musculus
```

-continued

```
<210> SEQ ID NO 31
<211> LENGTH: 9
<212> TYPE: DNA
<213> ORGANISM: Mus musculus

<400> SEQUENCE: 31 agcacatcc                                                                9

<210> SEQ ID NO 32
<211> LENGTH: 27
<212> TYPE: DNA
<213> ORGANISM: Mus musculus

<400> SEQUENCE: 32
caccagtatc atcgttcccc accgacg                                           27

<210> SEQ ID NO 33
<211> LENGTH: 94
<212> TYPE: PRT
<213> ORGANISM: Homo sapiens

<400> SEQUENCE: 33
```

```
<400> SEQUENCE: 30
tcaagtgtaa gttccagtta c                                                 21
```

Leu Gly Met Leu Cys His Ser His Ala Phe Ala Pro Glu Arg Arg Gly
1               5                   10                  15

His Leu Arg Pro Ser Phe His Gly His His Glu Lys Gly Lys Glu Gly
            20                  25                  30

Gln Val Leu Gln Arg Ser Lys Arg Gly Trp Val Trp Asn Gln Phe Phe
        35                  40                  45

Val Ile Glu Glu Tyr Thr Gly Pro Asp Pro Val Leu Val Gly Arg Leu
    50                  55                  60

His Ser Asp Ile Asp Ser Gly Asp Gly Asn Ile Lys Tyr Ile Leu Ser
65                  70                  75                  80

Gly Glu Gly Ala Gly Thr Ile Phe Val Ile Asp Asp Lys Ser
                85                  90

```
<210> SEQ ID NO 34
<211> LENGTH: 105
<212> TYPE: PRT
<213> ORGANISM: Homo sapiens

<400> SEQUENCE: 34
```

Ala Pro Lys Phe Ala Ala Pro Tyr Glu Gly Phe Ile Cys Glu Ser Asp
1               5                   10                  15

Gln Thr Lys Pro Leu Ser Asn Gln Pro Ile Val Thr Ile Ser Ala Asp
            20                  25                  30

Asp Lys Asp Asp Thr Ala Asn Gly Pro Arg Phe Ile Phe Ser Leu Pro
        35                  40                  45

Pro Glu Ile Ile His Asn Pro Asn Phe Thr Val Arg Asp Asn Arg Asp
    50                  55                  60

Asn Thr Ala Gly Val Tyr Ala Arg Arg Gly Gly Phe Ser Arg Gln Lys
65                  70                  75                  80

Gln Asp Leu Tyr Leu Leu Pro Ile Val Ile Ser Asp Gly Gly Ile Pro
                85                  90                  95

Pro Met Ser Ser Thr Asn Thr Leu Thr
                100                 105

```
<210> SEQ ID NO 35
<211> LENGTH: 96
<212> TYPE: PRT
<213> ORGANISM: Homo sapiens

<400> SEQUENCE: 35

Leu Asn Thr Val Gly His His Arg Pro Pro His Gln Ala Ser
1               5                   10                  15

Val Ser Gly Ile Gln Ala Glu Leu Leu Thr Phe Pro Asn Ser Ser Pro
            20                  25                  30

Gly Leu Arg Arg Gln Lys Arg Asp Trp Val Ile Pro Pro Ile Ser Cys
        35                  40                  45

Pro Glu Asn Glu Lys Gly Pro Phe Pro Lys Asn Leu Val Gln Ile Lys
    50                  55                  60

Ser Asn Lys Asp Lys Glu Gly Lys Val Phe Tyr Ser Ile Thr Gly Gln
65                  70                  75                  80

Gly Ala Asp Thr Pro Pro Val Gly Val Phe Ile Ile Glu Arg Glu Thr
                85                  90                  95

<210> SEQ ID NO 36
<211> LENGTH: 91
<212> TYPE: PRT
<213> ORGANISM: Homo sapiens

<400> SEQUENCE: 36

Ala Pro Ile Pro Glu Pro Arg Thr Ile Phe Phe Cys Glu Arg Asn Pro
1               5                   10                  15

Lys Pro Gln Val Ile Asn Ile Ile Asp Ala Asp Leu Pro Pro Asn Thr
            20                  25                  30

Ser Pro Phe Thr Ala Glu Leu Thr His Gly Ala Ser Ala Asn Trp Thr
        35                  40                  45

Ile Gln Tyr Asn Asp Pro Thr Gln Glu Ser Ile Ile Leu Lys Pro Lys
    50                  55                  60

Met Ala Leu Glu Val Gly Asp Tyr Lys Ile Asn Leu Lys Leu Met Asp
65                  70                  75                  80

Asn Gln Asn Lys Asp Gln Val Thr Thr Leu Glu
                85                  90
```

THERAPEUTIC TARGETING OF CADHERIN 11 IN CANCER

SEQUENCE LISTING

The instant application contains a Sequence Listing which has been submitted electronically in ASCII format and is hereby incorporated by reference in its entirety. Said ASCII copy, created on Jun. 21, 2022 is named 51569-002WO2_Sequence_Listing_6_21_22_ST25 and is 12,366 bytes in size.

FIELD OF THE INVENTION

The invention relates to methods, compositions and uses thereof for treating cancer (e.g., an anti-Cadherin 11 (CDH11) antibody).

BACKGROUND OF THE INVENTION

Cancers are characterized by the uncontrolled growth of cell subpopulations. Cancers are the leading cause of death in the developed world and the second leading cause of death in developing countries, with over 14 million new cancer cases diagnosed and over eight million cancer deaths occurring each year. Metastasis, or the dissemination of tumor cells to distant organs, is the primary cause of mortality in the majority of solid tumor malignancies. Cancer care thus represents a significant and ever-increasing societal burden. Thus, there is an unmet need for developing effective immunotherapies.

SUMMARY OF THE INVENTION

The invention, in general, features anti-Cadherin 11 (CDH11) antibodies and immunoconjugates and methods of using the same.

In one aspect, the invention features a method for treating or delaying progression of a cancer in an individual, said method including administering an effective amount of an antibody that binds CDH11 including a CDR-H1 including the amino acid sequence of SEQ ID NO: 1; a CDR-H2 including the amino acid sequence of SEQ ID NO: 2; a CDR-H3 including the amino acid sequence of SEQ ID NO: 3; a CDR-L1 including the amino acid sequence of SEQ ID NO: 4; a CDR-L2 including the amino acid sequence of SEQ ID NO: 5; and a CDR-L3 including the amino acid sequence of SEQ ID NO: 6; wherein the cancer expresses CDH11.

In some embodiments of the preceding aspect, the method suppresses metastasis.

In some embodiments of the preceding aspect, the method includes a neoadjuvant therapy (for example, chemotherapy, radiation therapy, hormone therapy, targeted therapy, immunotherapy, or other biological therapy).

In some embodiments of the preceding aspect, the method includes an adjuvant therapy (for example, chemotherapy, radiation therapy, hormone therapy, targeted therapy, or biological therapy).

In some embodiments of the preceding aspect, the method includes administering one or more chemotherapeutic agents.

In some embodiments of the preceding aspect, the method includes administering radiation therapy.

In some embodiments of the preceding aspect, the individual has a cancer.

In some embodiments of the preceding aspect, the antibody is conjugated to a cytotoxic agent.

In another aspect, the invention features a method of detecting the presence of a circulating tumor cell (CTC) in a sample from a subject, the method including: providing a sample including blood from a subject; and contacting the sample with an antibody that binds CDH11 including a CDR-H1 including the amino acid sequence of SEQ ID NO: 1; a CDR-H2 including the amino acid sequence of SEQ ID NO: 2; a CDR-H3 including the amino acid sequence of SEQ ID NO: 3; a CDR-L1 including the amino acid sequence of SEQ ID NO: 4; a CDR-L2 including the amino acid sequence of SEQ ID NO: 5; and a CDR-L3 including the amino acid sequence of SEQ ID NO: 6; and detecting the binding of the antibody to the CTC, thereby detecting the presence of the CTC in the sample.

In another aspect, the invention features a method of diagnosing cancer in a subject, the method including: providing a sample including blood from the subject; and contacting the sample with an antibody that binds CDH11 including a CDR-H1 including the amino acid sequence of SEQ ID NO: 1; a CDR-H2 including the amino acid sequence of SEQ ID NO: 2; a CDR-H3 including the amino acid sequence of SEQ ID NO: 3; a CDR-L1 including the amino acid sequence of SEQ ID NO: 4; a CDR-L2 including the amino acid sequence of SEQ ID NO: 5; and a CDR-L3 including the amino acid sequence of SEQ ID NO: 6; under conditions sufficient to allow binding of the antibody to cells expressing CDH11, and detecting the binding of the antibody to a cancer cell surface marker present on a cell in the sample, wherein the presence of binding to a cell in the sample indicates that the subject has cancer.

In another aspect, the invention features a method for the characterization of one or more CTC in a sample, the method including: (a) determining the expression level of a CDH11 gene in a sample; and (b) comparing the expression level of the CDH11 gene to a reference level of the CDH11 gene.

In some embodiments of the preceding aspect, the method further includes: (c) determining that the expression level of the CDH11 gene in a blood sample from a subject is increased relative to the reference level of the CDH11 gene; and (d) administering an effective amount of an antibody that binds CDH11 including a CDR-H1 including the amino acid sequence of SEQ ID NO: 1; a CDR-H2 including the amino acid sequence of SEQ ID NO: 2; a CDR-H3 including the amino acid sequence of SEQ ID NO: 3; a CDR-L1 including the amino acid sequence of SEQ ID NO: 4; a CDR-L2 including the amino acid sequence of SEQ ID NO: 5; and a CDR-L3 including the amino acid sequence of SEQ ID NO: 6.

In some embodiments of the preceding aspect, determining that the expression level of the CDH11 gene in a blood sample from a subject is increased relative to the reference level of the CDH11 gene identifies a subject who is likely to respond to a treatment for delaying progression of a cancer.

In another aspect, the invention features a method for the characterization of one or more cancer associated fibroblasts (CAFs) in a sample, the method including: (a) determining the expression level of a CDH11 gene in a sample; and (b) comparing the expression level of the CDH11 gene to a reference level of the CDH11 gene.

In some embodiments of any of the preceding aspects, the sample is a biopsy from a subject. In some embodiments, the biopsy is a blood sample.

In another aspect, the invention features an immunoconjugate including: (i) an antibody that binds CDH11; and (ii) a cytotoxic agent.

In some embodiments of the preceding aspect, the antibody includes a CDR-H1 having at least 90% (e.g., 91%, 92%, 93%, 94%, 95%, 96%, 97%, 98%, and 99%) sequence identity the amino acid sequence of SEQ ID NO: 1; a CDR-H2 having at least 90% (e.g., 91%, 92%, 93%, 94%, 95%, 96%, 97%, 98%, and 99%) sequence identity the amino acid sequence of SEQ ID NO: 2; a CDR-H3 having at least 90% (e.g., 91%, 92%, 93%, 94%, 95%, 96%, 97%, 98%, and 99%) sequence identity the amino acid sequence of SEQ ID NO: 3; a CDR-L1 having at least 90% (e.g., 91%, 92%, 93%, 94%, 95%, 96%, 97%, 98%, and 99%) sequence identity the amino acid sequence of SEQ ID NO: 4; a CDR-L2 having at least 90% (e.g., 91%, 92%, 93%, 94%, 95%, 96%, 97%, 98%, and 99%) sequence identity the amino acid sequence of SEQ ID NO: 5; and a CDR-L3 having at least 90% (e.g., 91%, 92%, 93%, 94%, 95%, 96%, 97%, 98%, and 99%) sequence identity the amino acid sequence of SEQ ID NO: 6.

In some embodiments of the preceding aspect, the antibody includes a CDR-H1 including the amino acid sequence of SEQ ID NO: 1; a CDR-H2 including the amino acid sequence of SEQ ID NO: 2; a CDR-H3 including the amino acid sequence of SEQ ID NO: 3; a CDR-L1 including the amino acid sequence of SEQ ID NO: 4; a CDR-L2 including the amino acid sequence of SEQ ID NO: 5; and a CDR-L3 including the amino acid sequence of SEQ ID NO: 6.

In some embodiments of any of the preceding aspects, the cytotoxic agent is an antineoplastic agent. In some embodiments, the antineoplastic agent is SN-38.

In some embodiments of any of the preceding aspects, the antibody binds to a CTC.

In some embodiments of any of the preceding aspects, the antibody includes: (a) a heavy chain variable region (HCVR) sequence having at least 90% (e.g., 91%, 92%, 93%, 94%, 95%, 96%, 97%, 98%, and 99%) sequence identity to the amino acid sequence of SEQ ID NO: 7; (b) a light chain variable region (LCVR) sequence having at least 90% (e.g., 91%, 92%, 93%, 94%, 95%, 96%, 97%, 98%, and 99%) sequence identity to the amino acid sequence of SEQ ID NO: 8; or (c) a HCVR sequence as in (a) and a LCVR sequence as in (b).

In some embodiments of the preceding aspect, the HCVR and/or the LCVR includes at least one substitution.

In some embodiments of any of the preceding aspects, the antibody includes a HCVR including the amino acid sequence of SEQ ID NO: 7 and a LCVR including the amino acid sequence of SEQ ID NO: 8.

In some embodiments of any of the preceding aspects, the antibody is a full-length antibody. Alternatively, in some embodiments of any of the preceding aspects, the antibody is an antibody fragment that binds to CDH11. In some embodiments, the antibody fragment is selected from the group consisting of Fab, Fab'-SH, Fv, scFv, and (Fab')2 fragments.

In some embodiments of any of the preceding aspects, the immunoconjugate further includes a linker.

In some embodiments of any of the preceding aspects, the cancer is a metastatic cancer. In some embodiments, the metastatic cancer is metastatic breast cancer. In some embodiments, the metastatic cancer is metastatic pancreatic cancer.

In some embodiments of any of the preceding aspects, the cancer is a localized cancer.

In another aspect, the invention features a nucleic acid molecule encoding a HCVR of an anti-human CDH11 antibody, wherein the nucleic acid molecule includes the following CDR coding sequences: SEQ ID NO: 27 (CDR-H1), SEQ ID NO: 28 (CDR-H2), and SEQ ID NO: 29 (CDR-H3).

In some embodiments of the preceding aspect, the nucleic acid molecule includes a sequence encoding: (a) a heavy chain framework 1 (HC-FR1) sequence of SEQ ID NO: 9; (b) a heavy chain framework 2 (HC-FR2) sequence of SEQ ID NO: 10; (c) a heavy chain framework 3 (HC-FR3) sequence of SEQ ID NO: 11; (d) a heavy chain framework 4 (HC-FR4) sequence of SEQ ID NO: 12; and/or (e) a variant of any one or more of (a)-(d) having at least 90% (e.g., 91%, 92%, 93%, 94%, 95%, 96%, 97%, 98%, and 99%) sequence identity to its reference sequence, wherein the sequences are in the order: HC-FR1, CDR-H1, HC-FR2, CDR-H2, HC-FR3, CDR-H3, and HC-FR4.

In some embodiments of the preceding aspect, the nucleic acid molecule includes (a) the HC-FR1 sequence of SEQ ID NO: 9 which is encoded by SEQ ID NO: 17; (b) the HC-FR2 sequence of SEQ ID NO: 10 which is encoded by SEQ ID NO: 18; (c) the HC-FR3 sequence of SEQ ID NO: 11 which is encoded by SEQ ID NO: 19; (d) the HC-FR4 sequence of SEQ ID NO: 12 which is encoded by SEQ ID NO: 20; and/or (e) a variant of an HC-FR of any one or more of (a)-(d) which is encoded by a variant of any one or more of the reference sequences.

In some embodiments of the preceding aspect, the nucleic acid molecule includes a sequence encoding each of said HC-FR1, HC-FR2, HC-FR3, and HC-FR4, wherein optionally one or more of said HC-FR1, HC-FR2, HC-FR3, and HC-FR4 is replaced with a variant thereof having at least 90% (e.g., 91%, 92%, 93%, 94%, 95%, 96%, 97%, 98%, and 99%) sequence identity to its reference sequence.

In some embodiments of any of the preceding aspects, the HCVR is encoded by the sequence of SEQ ID NO: 25 or a variant thereof encoding a variant of a sequence having at least 90% (e.g., 91%, 92%, 93%, 94%, 95%, 96%, 97%, 98%, and 99%) sequence identity to SEQ ID NO: 7.

In some embodiments of the preceding aspect, the nucleic acid molecule encodes a heavy chain including said heavy chain variable region of said anti-human CDH11 antibody.

In another aspect, the invention features a nucleic acid molecule encoding a LCVR of an anti-human CDH11 antibody, wherein the nucleic acid molecule includes the following CDR coding sequences: SEQ ID NO: 30 (CDR-L1), SEQ ID NO: 31 (CDR-L2), and SEQ ID NO: 32 (CDR-L3).

In some embodiments of the preceding aspect, the nucleic acid molecule includes a sequence encoding: (a) a light chain framework 1 (LC-FR1) sequence of SEQ ID NO: 13; (b) a light chain framework 2 (LC-FR2) sequence of SEQ ID NO: 14; (c) a light chain framework 3 (LC-FR3) sequence of SEQ ID NO: 15; (d) a light chain framework 4 (LC-FR4) sequence of SEQ ID NO: 16; and/or (e) a variant of any one or more of (a)-(d) having at least 90% (e.g., 91%, 92%, 93%, 94%, 95%, 96%, 97%, 98%, and 99%) sequence identity to its reference sequence, wherein the sequences are in the order: LC-FR1, CDR-L1, LC-FR2, CDR-L2, LC-FR3, CDR-L3, and LC-FR4.

In some embodiments of the preceding aspect, the nucleic acid molecule includes (a) the LC-FR1 sequence of SEQ ID NO: 13 which is encoded by SEQ ID NO: 21; (b) the LC-FR2 sequence of SEQ ID NO: 14 which is encoded by SEQ ID NO: 22; (c) the LC-FR3 sequence of SEQ ID NO: 15 which is encoded by SEQ ID NO: 23; (d) the LC-FR4 sequence of SEQ ID NO: 16 which is encoded by SEQ ID NO: 24; and/or (e) a variant of an HC-FR of any one or more of (a)-(d) which is encoded by a variant of any one or more of the reference sequences.

In some embodiments of the preceding aspect, the nucleic acid molecule includes a sequence encoding each of said LC-FR1, LC-FR2, LC-FR3, and LC-FR4, wherein optionally one or more of said LC-FR1, LC-FR2, LC-FR3, and LC-FR4 is replaced with a variant thereof having at least 90% (e.g., 91%, 92%, 93%, 94%, 95%, 96%, 97%, 98%, and 99%) sequence identity to its reference sequence.

In some embodiments of any of the preceding aspects, the light chain variable region is encoded by the sequence of SEQ ID NO: 26 or a variant thereof encoding a variant sequence having at least 90% (e.g., 91%, 92%, 93%, 94%, 95%, 96%, 97%, 98%, and 99%) sequence identity to SEQ ID NO: 8.

In some embodiments of the preceding aspect, the nucleic acid molecule encodes a light chain including said light chain variable region of said anti-human CDH11 antibody.

In another aspect, the disclosure features a nucleic acid molecule including one or more nucleic acid molecule of any one of the preceding aspects.

In some embodiments of any of preceding aspects, the nucleic acid molecule encodes (a) an antibody heavy chain; (b) an antibody light chain; (c) an antibody heavy chain and an antibody light chain; (d) an HCVR; (e) a LCVR; (f) an HCVR and a LCVR; (g) an antibody fragment; or (h) a single chain antibody.

In another aspect, the disclosure features a vector including one or more nucleic acid molecule of any one of the preceding aspects.

In another aspect, the disclosure features a cell including one or more nucleic acid molecule of any one of the preceding aspects or a vector of the preceding aspect.

In another aspect, the disclosure features a method of generating an anti-human CDH11 antibody, the method including expressing a nucleic acid molecule of any one of the preceding aspects.

In another aspect, the disclosure features an antibody encoded by a nucleic acid molecule of any one of the preceding aspects, wherein the antibody does not include a murine heavy chain constant region and/or a murine light chain constant region.

In another aspect, the disclosure features an anti-human CDH11 antibody including: (a) a heavy chain variable region including: (i) a CDR-H1 of SEQ ID NO: 1, (ii) a CDR-H2 of SEQ ID NO: 2, and (iii) a CDR-H3 of SEQ ID NO: 3; and/or (b) a light chain variable region including: (i) a CDR-L1 of SEQ ID NO: 4, (ii) a CDR-L2 of SEQ ID NO: 5, and (iii) a CDR-L3 of SEQ ID NO: 6, wherein the antibody includes at least one substitution in one of said CDR sequences, relative to the recited sequences, and/or is a single chain antibody.

In some embodiments of the preceding aspect, the antibody includes a heavy chain including said heavy chain variable region of said anti-human CDH11 antibody, and/or the antibody includes a light chain including said light chain variable region of said anti-human CDH11 antibody.

In some embodiments of any of the preceding aspects, the antibody is: (a) monoclonal, monospecific, multispecific, or bispecific; (b) a human, chimeric, or humanized antibody; and/or (c) an IgG antibody, optionally selected from IgG1, IgG2, IgG2a, IgG2b IgG3, and IgG4.

In some embodiments of any of the preceding aspects, the antibody includes an antibody fragment which is optionally is a single chain antibody (scFv), Fab, Fab', F(ab')2, F(ab)c, Dab, Nanobody, or Fv.

In another aspect, the disclosure features a single chain antibody against human CDH11, or a fusion thereof, wherein the single chain antibody includes one or more of the following CDR sequences: CDR-H1 (SEQ ID NO: 1), CDR-H2 (SEQ ID NO: 2), CDR-H3 (SEQ ID NO: 3), CDR-L1 (SEQ ID NO: 4), CDR-L2 (SEQ ID NO: 5), and/or CDR-L3 (SEQ ID NO: 6), and optionally one or more of the CDRs includes one or more substitution within one or more of the recited sequences.

In some embodiments of the preceding aspect, the antibody or single chain antibody or a fusion thereof includes: (a) (i) a HC-FR1 sequence of SEQ ID NO: 9; (ii) a HC-FR2 sequence of SEQ ID NO: 10; (iii) a HC-FR3 sequence of SEQ ID NO: 11; (iv) a HC-FR4 sequence of SEQ ID NO: 12; and/or (v) a variant of any one or more of (a) (i)-(iv) having at least 90% (e.g., 91%, 92%, 93%, 94%, 95%, 96%, 97%, 98%, and 99%) sequence identity to its reference sequence, wherein the sequences are in the order: HC-FR1, CDR-H1, HC-FR2, CDR-H2, HC-FR3, CDR-H3, and HC-FR4; and/or (b) (i) a LC-FR1 sequence of SEQ ID NO: 13; (ii) a LC-FR2 sequence of SEQ ID NO: 14; (iii) a LC-FR3 sequence of SEQ ID NO: 15; (iv) a LC-FR4 sequence of SEQ ID NO: 16; and/or (v) a variant of any one or more of (b) (i)-(iv) having at least 90% (e.g., 91%, 92%, 93%, 94%, 95%, 96%, 97%, 98%, and 99%) sequence identity to its reference sequence, wherein the sequences are in the order: LC-FR1, CDR-L1, LC-FR2, CDR-L2, LC-FR3, CDR-L3, and LC-FR4.

In some embodiments of the preceding aspect, the antibody or single chain antibody or a fusion thereof includes: (a) each of said HC-FR1, HC-FR2, HC-FR3, and HC-FR4, wherein optionally one or more of said HC-FR1, HC-FR2, HC-FR3, and HC-FR4 is replaced with a variant thereof having at least 90% (e.g., 91%, 92%, 93%, 94%, 95%, 96%, 97%, 98%, and 99%) sequence identity to its reference sequence; and/or (b) each of said LC-FR1, LC-FR2, LC-FR3, and LC-FR4, wherein optionally one or more of said LC-FR1, LC-FR2, LC-FR3, and LC-FR4 is replaced with a variant thereof having at least 90% (e.g., 91%, 92%, 93%, 94%, 95%, 96%, 97%, 98%, and 99%) sequence identity to its reference sequence.

In some embodiments of the preceding aspect, the single chain antibody or a fusion thereof includes (a) the HCVR includes the sequence of SEQ ID NO: 7 or a variant thereof having at least 90% (e.g., 91%, 92%, 93%, 94%, 95%, 96%, 97%, 98%, and 99%) sequence identity to SEQ ID NO: 7; and/or (b) the LCVR includes the sequence of SEQ ID NO: 8 or a variant thereof having at least 90% (e.g., 91%, 92%, 93%, 94%, 95%, 96%, 97%, 98%, and 99%) sequence identity to SEQ ID NO: 8.

In some embodiments of any of the preceding aspects, the variant thereof includes at least one substitution. In some embodiments of any of the preceding aspects, the at least one substitution includes a substitution at a contact residue and/or at a neighboring residue thereof. In some embodiments, the contact residue or a neighboring residue thereof is determined by a crystal structure of an antigen-antibody complex, wherein the antibody is 23C6 and the antigen is CDH11. In some embodiments, the contact residue includes: Phe 2, Gly 26, Tyr 27, Ser 28, Thr 30, Asp 31, Tyr 32, Asn 54, Tyr 55, Thr 57, Arg 98, Tyr 100, Tyr 101, Gly 102, Ser 103, Arg 104, Tyr 105, and Asp 107 relative to SEQ ID NO: 7. In some embodiments, the contact residue includes: Ser 30, Ser 31, Ser 32, Tyr 33, His 35, Tyr 50, Ser 51, Ser 53, Asn 54, Leu 55, Ala 56, Ser 57, Gly 58, Val 59, Ala 61, Tyr 92, and His 93 relative to SEQ ID NO: 8.

In some embodiments of any of the preceding aspects, the single chain antibody includes 2, 3, 4, 5, or all 6 of said CDRs.

In some embodiments of any of the preceding aspects, the variable light chain portion of the single chain antibody is linked to the variable heavy chain portion of the single chain antibody via a linker.

In some embodiments of any of the preceding aspects, the single chain antibody or a fusion thereof includes an Fc sequence fused to the single chain antibody, optionally at the C-terminus of the variable light chain sequence of the single chain antibody.

In another aspect, the disclosure features a nucleic acid molecule encoding an antibody, single chain antibody, or fusion of any one of the preceding aspects, or a vector including the same.

In another aspect, the disclosure features a pharmaceutical composition including an antibody, single chain antibody, or fusion of any one of the preceding aspects.

In another aspect, the disclosure features a method of treating cancer in an individual, said method including administering an effective amount of the immunoconjugate of any one of the preceding aspects or the pharmaceutical formulation of the preceding aspect.

In another aspect, the disclosure features a method of treating cancer in a subject, the method including administering an antibody of any one of the preceding aspects or a pharmaceutical composition of the preceding aspect to the subject.

In some embodiments of any of the preceding aspects, the antibody is conjugated to a cytotoxic agent. In some embodiments, the cytotoxic agent is SN-38.

In some embodiments of any of the preceding aspects, the antibody binds to CDH11 (e.g., human CDH11) and CDH1 (e.g., human CDH1).

In some embodiments of any of the preceding aspects, the antibody binds to human CDH11 and human CDH1.

In some embodiments of any of the preceding aspects, the antibody binds to the extracellular domain of human CDH11.

In some embodiments of any of the preceding aspects, the antibody binds to an epitope of human CDH11 comprising (SEQ ID NO: 33)
LGMLCHSHAFAPERRGHLRPSFHGHHEKGKEGQVLQRSKRGWVWNQFFV
IEEYTGPDPVLVGRLHSDIDSGDGNIKYILSGEGAGTIFVIDDKS or (SEQ ID NO: 34)
APKFAAPYEGFICESDQTKPLSNQPIVTISADDKDDTANGPRFIFSLPP
EIIHNPNFTVRDNRDNTAGVYARRGGFSRQKQDLYLLPIVISDGGIPPM
SSTNTLT.

In some embodiments of any of the preceding aspects, the antibody binds to the extracellular domain of human CDH1 or murine CDH1.

In some embodiments of any of the preceding aspects, the antibody binds to the extracellular domain of human CDH1 and murine CDH1.

In some embodiments of any of the preceding aspects, the antibody binds to the extracellular domain of human CDH1.

In some embodiments of any of the preceding aspects, the antibody binds to an epitope of human CDH1 comprising (SEQ ID NO: 35)
LNTVGHHHRPPPHQASVSGIQAELLTFPNSSPGLRRQKRDWVIPPISCP
ENEKGPFPKNLVQIKSNKDKEGKVFYSITGQGADTPPVGVFIIERET or (SEQ ID NO: 36)
APIPEPRTIFFCERNPKPQVINIIDADLPPNTSPFTAELTHGASANWTI
QYNDPTQESIILKPKMALEVGDYKINLKLMDNQNKDQVTTLE.

In another aspect, the disclosure features an antibody that binds to CDH11 (e.g., human CDH11) and CDH1 (e.g., human CDH1).

In another aspect, the disclosure features an immunoconjugate comprising: (i) an antibody that binds CDH11 and CDH1; and (ii) a cytotoxic agent.

The immunoconjugates described herein, advantageously feature antigen-binding capacity of an anti-CDH11 antibody, which, in turn, enables useful features of high target specificity, high target affinity, and low inherent toxicity, combined with important features of a conjugated cytotoxic agent, including the ability to kill cancer cells. Therefore, the invention is advantageous because such immunoconjugates can increase immune clearance and/or serve as a vehicle to deliver a cytotoxic agent to a subject having cancer. In addition, the anti-CDH11 antibody has the ability to ability to target CTCs, the metastatic cells in the blood. The ability to target the metastatic cells enables the advantage of the immunoconjugates described herein to target respective metastatic processes, in addition to primary tumors and/or already-present tumors. In some embodiments, the antibody included in the immunoconjugate binds to CDH11 (e.g., human CDH11) and CDH1 (e.g., human CDH1).

Other features and advantages of the invention will be apparent from the following Detailed Description and the Claims.

DETAILED DESCRIPTION

Figure 1:
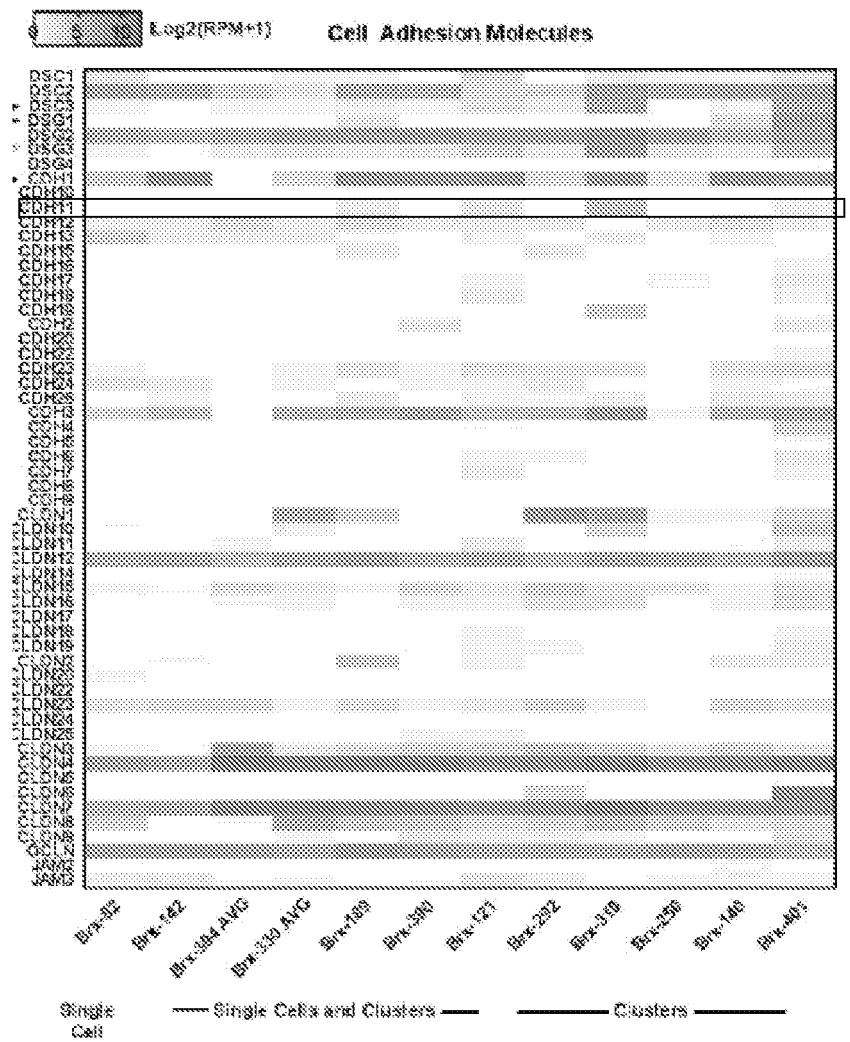
FIG. 1 shows a heatmap depicting the fold change in RNA expression levels of cell adhesion molecules (y-axis), including Cadherin 11 (CDH11; black outline), in breast cancer circulating tumor cell (CTC) lines Brx-82, Brx-142, Brx-394 AVG, Brx-189, Brx-390, Brx-121, Brx-292, Brx-319, Brx-250, Brx-140, and Brx-401, respectively. The x-axis labels indicate the respective CTC line. The intensity of shading represents log 2(RNA transcript reads per million (RPM)+1).

The present invention is based, in part, on the discovery that certain cadherins are expressed on cancer circulating tumor cells (CTC) such as breast cancer cells or epithelial to mesenchymal transition (EMT) cancer cells or both, and thus can be used to target these cells with antibody-based therapeutics. Certain cadherins are typically substantially absent from normal blood cells but are present on a variety of cancerous cells. This allows for detecting, identifying, isolating, monitoring, and therapeutically targeting CTC and EMT cancer cells in the blood, primary tumors, and metastases. Cadherins are surface antigens that have been implicated in a wide variety of cancers (e.g., see Berx, G. and F. van Roy, *Cold Spring Harb Perspect Biol,* 1(6): a003129 (2009); Kim, D. S., et al., *Cancer,* 110(12):2785-92 (2007); Peinado, H. et al. *Int J Dev Biol,* 48(5-6):365-75 (2004)) and offer a potential therapeutic target for cancer. Cadherin 11 (CDH11) is a particular gene that is expressed on the surface of EMT and CTC cells, thereby providing a target for therapeutic intervention with a neutralizing anti-CDH11 antibody that can increase immune clearance and/or serve as a vehicle to deliver a cytotoxic agent.

Definitions

Before describing the invention in detail, it is to be understood that this invention is not limited to particular compositions or biological systems, which can, of course, vary. It is also to be understood that the terminology used herein is for the purpose of describing particular embodiments only and is not intended to be limiting.

As used in this specification and the appended claims, the singular forms "a", "an" and "the" include plural referents unless the content clearly dictates otherwise. Thus, for example, reference to "a molecule" optionally includes a combination of two or more such molecules, and the like.

It is understood that aspects and embodiments of the invention described herein include "comprising," "consisting," and "consisting essentially of" aspects and embodiments.

The term "about" as used herein refers to the usual error range for the respective value readily known to the skilled person in this technical field. Reference to "about" a value or parameter herein includes (and describes) embodiments that are directed to that value or parameter per se.

The term "antibody" as used herein in the broadest sense encompasses various antibody structures, including but not limited to monoclonal antibodies, polyclonal antibodies, multispecific antibodies (e.g., bispecific antibodies), and antibody fragments so long as they exhibit the desired antigen-binding activity. An "antibody" can refer, for example, to a glycoprotein comprising at least two heavy chains (HCs) and two light chains (LCs) inter-connected by disulfide bonds, or an antigen binding portion thereof. Each heavy chain is comprised of a heavy chain variable region (HCVR) and a heavy chain constant region (CH). The heavy chain constant region may be comprised of three domains, CH1, CH2, and/or CH3. Each light chain is comprised of a light chain variable region (LCVR) and a light chain constant region (CL). The HCVR and LCVR regions can be further subdivided into regions of hypervariability, termed "complementarity determining regions" (CDRs), interspersed with regions that are more conserved, termed "framework regions" (FRs). Each HCVR and LCVR may be composed, for example, of three CDRs and four FRs, arranged from amino-terminus to carboxyl-terminus in the following order: FR1, CDR1, FR2, CDR2, FR3, CDR3, and FR4. The variable regions of the heavy and light chains contain a binding domain that interacts with an antigen. The constant regions of the antibodies may mediate the binding of the immunoglobulin to host tissues or factors, including various cells of the immune system (e.g., effector cells) and the first component (C1q) of the classical complement system.

An antibody variable region consists of a "framework" region interrupted by three "antigen binding sites," which are defined using various terms: Complementarity Determining Regions (CDRs), three in the HCVR (HCDR1, HCDR2, and HCDR3) and three in the LCVR (LCDR1, LCDR2, and LCDR3) are based on sequence variability (Wu et al., J. Exp. Med. 132:211-250, 1970: Kabat et al., Sequences of Proteins of Immunological Interest, 5$^{th}$ Ed. Public Health Service, National Institutes of Health, Bethesda, M D, 1991);

"Framework" or "framework sequences" are the remaining sequences of a variable region other than those defined to be antigen binding sites (e.g., CDRs). Because the antigen binding sites can be defined by various terms as described above, the exact amino acid sequence of a framework depends on how the antigen-binding site was defined. The framework sequences described in the sequences provided herein are to be considered in the context of the indicated CDRs.

The term "variable region" or "variable domain" refers to the domain of an antibody heavy or light chain that is involved in binding the antibody to antigen. The variable domains of the heavy chain and light chain (HCVR and LCVR, respectively) of a native antibody generally have similar structures, with each domain comprising four conserved framework regions (FRs) and three hypervariable regions (HVRs). (See, e.g., Kindt et al. *Kuby Immunology,* 6$^{th}$ ed., W.H. Freeman and Co., page 91 (2007).) A single HCVR or LCVR domain may be sufficient to confer antigen-binding specificity. Furthermore, antibodies that bind a particular antigen may be isolated using a HCVR or LCVR domain from an antibody that binds the antigen to screen a library of complementary LCVR or HCVR domains, respectively. See, e.g., Portolano et al., *J. Immunol.* 150:880-887 (1993); Clarkson et al., *Nature* 352:624-628 (1991).

An "isolated antibody" is one which has been identified and separated and/or recovered from a component of its natural environment and/or is substantially free of other antibodies having different antigenic specificities (e.g., an isolated antibody that specifically binds to CDH11 is substantially free of antibodies that specifically bind antigens other than CDH11). Contaminant components of its natural environment are materials which would interfere with diagnostic or therapeutic uses for the antibody, and may include enzymes, hormones, and other proteinaceous or nonproteinaceous solutes. In preferred embodiments, the antibody will be purified (1) to greater than 95% by weight of antibody as determined by the Lowry method, and most preferably more than 99% by weight, (2) to a degree sufficient to obtain at least 15 residues of N-terminal or internal amino acid sequence by use of a spinning cup sequenator, or (3) to homogeneity by SDS-PAGE under reducing or nonreducing conditions using Coomassie™ blue or, preferably, silver stain. Isolated antibody includes the antibody in situ within recombinant cells since at least one component of the antibody's natural environment will not be present. Similarly, isolated antibody includes the antibody in medium around recombinant cells. Ordinarily, however, isolated antibody will be prepared by at least one purification step.

The terms "full-length antibody," "intact antibody," and "whole antibody" are used herein interchangeably to refer to an antibody having a structure substantially similar to a native antibody structure or having heavy chains that contain an Fc region as defined herein.

The term "human antibody" includes antibodies having variable and constant regions (if present) of human germline immunoglobulin sequences. Human antibodies can include amino acid residues not encoded by human germline immunoglobulin sequences (e.g., mutations introduced by random or site-specific mutagenesis in vitro or by somatic mutation in vivo) (see, Lonberg, N. et al. (1994) *Nature* 368(6474): 856-859); Lonberg, N. (1994) *Handbook of Experimental Pharmacology* 113:49-101; Lonberg, N. and Huszar, D. (1995) *Intern. Rev. Immunol.* Vol. 13: 65-93, and Harding, F. and Lonberg, N. (1995) *Ann. N.Y. Acad. Sci* 764:536-546). However, the term "human antibody" does not include antibodies in which CDR sequences derived from the germline of another mammalian species, such as a mouse, have been grafted onto human framework sequences (i.e., humanized antibodies).

Isolated humanized antibodies may be synthetic. Human antibodies, while derived from human immunoglobulin sequences, may be generated using systems such as phage display incorporating synthetic CDRs and/or synthetic frameworks, or can be subjected to in vitro mutagenesis to improve antibody properties, resulting in antibodies that do not naturally exist within the human antibody germline repertoire in vivo.

A "humanized antibody" refers to an antibody in which the antigen binding sites (e.g., CDRs) are derived from a non-human species and the variable region frameworks are either derived from human immunoglobulin sequences or are mutated such that they are closer in sequence and/or function to human framework sequences than the original framework sequences. Humanized antibodies may thus include substitutions in the framework regions of another species, which makes the framework closer to a human framework. Accordingly, the framework in a humanized antibody may not be an exact copy of an expressed human immunoglobulin or germline gene sequences. Those of skill in the art may use, e.g., a framework-homology approach to humanize, e.g., a murine or other non-human antibody, and, through this process, may alter certain residues to be closure to human sequences and also may maintain certain non-human residues (e.g., vernier zone amino acids). Alternatively, CDRs from another species may be inserted into a human variable region scaffold, as is known in the art.

The term "monoclonal antibody," as used herein, refers to an antibody which displays a single binding specificity and affinity for a particular epitope. Accordingly, the term "human monoclonal antibody," or "HuMab," refers to an antibody which displays a single binding specificity and which has variable and constant regions derived from human germline immunoglobulin sequences. In one embodiment, human monoclonal antibodies are produced by a hybridoma which includes a B cell obtained from a transgenic non-human animal, e.g., a transgenic mouse, having a genome comprising a human heavy chain transgene and a light chain transgene fused to an immortalized cell.

The term "epitope" refers to a portion of an antigen to which an antibody specifically binds. Epitopes usually consist of chemically active (such as polar, non-polar, or hydrophobic) surface groupings of moieties such as amino acids or polysaccharide side chains, and can have specific three-dimensional structural characteristics, as well as specific charge characteristics. An epitope can be composed of contiguous and/or noncontiguous amino acids that form a conformational spatial unit. For a noncontiguous epitope, amino acids from differing portions of the linear sequence of the antigen come in close proximity in 3-dimensional space through the folding of the protein molecule.

An "antibody fragment" refers to a molecule other than an intact antibody that comprises a portion of an intact antibody that specifically binds to the antigen (e.g., CDH11 or a fragment thereof) to which the intact antibody binds. Examples of antibody fragments include but are not limited to Fv, Fab, Fab', Fab'-SH, F(ab')2; diabodies; linear antibodies; single-chain antibody molecules (e.g., scFv); and multispecific antibodies formed from antibody fragments. These antibody fragments are obtained using conventional techniques, and the fragments are screened for utility in the same manner as are intact antibodies. Antibody fragments can be produced by recombinant DNA techniques, or by enzymatic or chemical cleavage of intact immunoglobulins.

The term "hypervariable region" or "HVR," as used herein, refers to each of the regions of an antibody variable domain which are hypervariable in sequence and/or form structurally defined loops ("hypervariable loops"). Generally, native four-chain antibodies comprise six HVRs; three in the HCVR (H1, H2, H3), and three in the LCVR (L1, L2, L3). HVRs generally comprise amino acid residues from the hypervariable loops and/or from the "complementarity determining regions" (CDRs), the latter being of highest sequence variability and/or involved in antigen recognition. Exemplary hypervariable loops occur at amino acid residues 26-32 (L1), 50-52 (L2), 91-96 (L3), 26-32 (H1), 53-55 (H2), and 96-101 (H3). (Chothia and Lesk, *J. Mol. Biol.* 196:901-917 (1987).) Exemplary CDRs (CDR-L1, CDR-L2, CDR-L3, CDR-H1, CDR-H2, and CDR-H3) occur at amino acid residues 24-34 of L1, 50-56 of L2, 89-97 of L3, 31-35B of H1, 50-65 of H2, and 95-102 of H3. (Kabat et al., *Sequences of Proteins of Immunological Interest,* 5th Ed. Public Health Service, National Institutes of Health, Bethesda, MD (1991).) With the exception of CDR1 in HCVR, CDRs generally comprise the amino acid residues that form the hypervariable loops.

"Variant" refers to a polypeptide or a polynucleotide that differs from a reference polypeptide or a reference polynucleotide by one or more modifications, for example, substitutions, insertions, or deletions.

An "effective amount" is at least the minimum amount required to effect a measurable improvement or prevention of a particular disorder. An effective amount herein may vary according to factors such as the disease state, age, sex, and weight of the patient, and the ability of the antibody to elicit a desired response in the individual. An effective amount is also one in which any toxic or detrimental effects of the treatment are outweighed by the therapeutically beneficial effects. For prophylactic use, beneficial or desired results include results such as eliminating or reducing the risk, lessening the severity, or delaying the onset of the disease, including biochemical, histological and/or behavioral symptoms of the disease, its complications and intermediate pathological phenotypes presenting during development of the disease. For therapeutic use, beneficial or desired results include clinical results such as decreasing one or more symptoms resulting from the disease, increasing the quality of life of those suffering from the disease, decreasing the dose of other medications required to treat the disease, enhancing effect of another medication such as via targeting, delaying the progression of the disease, and/or prolonging survival. In the case of cancer or tumor, an effective amount of the drug may have the effect in reducing the number of cancer cells; reducing the tumor size; inhibiting (i.e., slow to some extent or desirably stop) cancer cell infiltration into peripheral organs; inhibit (i.e., slow to some extent and desirably stop) tumor metastasis; inhibiting to some extent tumor growth; and/or relieving to some extent one or more of the symptoms associated with the disorder. An effective amount can be administered in one or more administrations. For purposes of this invention, an effective amount of drug, compound, or pharmaceutical composition is an amount sufficient to accomplish prophylactic or therapeutic treatment either directly or indirectly. As is understood in the clinical context, an effective amount of a drug, compound, or pharmaceutical composition may or may not be achieved in conjunction with another drug, compound, or pharmaceutical composition. Thus, an "effective amount" may be considered in the context of administering one or more therapeutic agents, and a single agent may be considered to be given in an effective amount if, in conjunction with one or more other agents, a desirable result may be or is achieved.

"Cadherins" are surface antigens implicated in a wide variety of cancers; see, e.g. Berx and van Roy, *Cold Spring Harb Perspect Biol*, 1(6):a003129 (2009); Kim et al., *Cancer*, 110(12):2785-92 (2007); Peinado et al. *Int J Dev Biol*, 48(5-6):365-75 (2004).

As used herein, the terms "Cadherin 11" and "CDH11" encompasses full-length, unprocessed CDH11, as well as any form of CDH11 resulting from processing in the cell, as well as any naturally occurring variants of CDH11 (e.g., splice variants or allelic variants). CDH11 refers to an integral membrane protein from the cadherin superfamily that mediates calcium-dependent cell-cell adhesion. As a cadherin, CDH11 contains a large N-terminal extracellular domain, a single transmembrane domain, and a small and highly conserved C-terminal domain. Human CDH11 has NCBI Gene ID NO 1009. An exemplary wild-type human CDH11 type 1 (e.g., isoform 1) nucleic acid sequence is provided in NCBI RefSeq Acc. No. NM_001308392.1, and an exemplary wild-type CDH11 type 1 (e.g., isoform 1) amino acid sequence is provided in NCBI RefSeq Acc. No. NP_001295321.1. An exemplary wild-type human CDH11 type 2 (e.g., isoform 2) nucleic acid sequence is provided in NCBI RefSeq Acc. No. NM_001797.2, and an exemplary wild-type CDH11 type 2 (e.g., isoform 2) amino acid sequence is provided in NCBI RefSeq Acc. No. NP_001788.2.

As used herein, "in conjunction with" refers to administration of one treatment modality in addition to another treatment modality. As such, "in conjunction with" refers to administration of one treatment modality before, during, or after administration of the other treatment modality to the individual.

"Tumor", as used herein, refers to all neoplastic cell growth and proliferation, whether malignant or benign, and all pre-cancerous and cancerous cells and tissues.

The terms "cancer" and "cancerous" refer to or describe the physiological condition in mammals that is typically characterized by unregulated cell growth. Examples of cancer include but are not limited to, carcinoma, lymphoma, blastoma, sarcoma, and leukemia or lymphoid malignancies. More particular examples of such cancers include, but not limited to, pancreatic cancer and breast cancer. In certain embodiments, cancers that are amenable to treatment by the antibodies include breast cancer and pancreatic cancer.

The term "cytotoxic agent" as used herein refers to any agent that is detrimental to cells (e.g., causes cell death, inhibits proliferation, or otherwise hinders a cellular function). Cytotoxic agents include, but are not limited to, radioactive isotopes; chemotherapeutic agents; growth inhibitory agents; enzymes and fragments thereof such as nucleolytic enzymes; and toxins such as small molecule toxins or enzymatically active toxins of bacterial, fungal, plant or animal origin, including fragments and/or variants thereof. Exemplary cytotoxic agents can be selected from anti-microtubule agents, platinum coordination complexes, alkylating agents, antibiotic agents, topoisomerase II inhibitors, antimetabolites, topoisomerase I inhibitors, hormones and hormonal analogues, signal transduction pathway inhibitors, non-receptor tyrosine kinase angiogenesis inhibitors, immunotherapeutic agents, proapoptotic agents, inhibitors of LDH-A, inhibitors of fatty acid biosynthesis, cell cycle signaling inhibitors, HDAC inhibitors, proteasome inhibitors, and inhibitors of cancer metabolism. In some embodiments, the cytotoxic agent is SN-38.

An "immunoconjugate" is an antibody conjugated to one or more heterologous molecule(s), including but not limited to a cytotoxic agent. In some embodiments, the immunoconjugate is an anti-CDH11 antibody conjugated to a cytotoxic agent. In some embodiments, the cytotoxic agent is SN-38.

"Chemotherapeutic agent" includes compounds useful in the treatment of cancer. Examples of chemotherapeutic agents include SN-38, 5-fluorouacil (5FU), irinotecan, oxaliplatin, carboplatin, cisplatin, paclitaxel, albumin-bound paclitaxel, docetaxel, gemcitabine, anti-PD1, anti-PDL1, and anti-CTLA4.

By "radiation therapy" is meant the use of directed gamma rays or beta rays to induce sufficient damage to a cell so as to limit its ability to function normally or to destroy the cell altogether. It will be appreciated that there will be many ways known in the art to determine the dosage and duration of treatment. Typical treatments are given as a one-time administration and typical dosages range from 10 to 200 units (Grays) per day.

The term "nucleic acid molecule," as used herein, is intended to include DNA molecules and RNA molecules. A nucleic acid molecule may be single-stranded or double-stranded, but preferably is double-stranded DNA.

The term "isolated nucleic acid," as used herein in reference to nucleic acids molecules encoding antibodies or antibody portions (e.g., HCVR, LCVR, CDRs) that bind to CDH11, is intended to refer to a nucleic acid molecule in which the nucleotide sequences encoding the antibody or antibody portion are free of other nucleotide sequences encoding antibodies that bind antigens other than CDH11, which other sequences may naturally flank the nucleic acid in human genomic DNA.

Antibodies that are substantially identical to the antibodies described herein are included in the invention. The term "substantially identical" means that the antibody HCVR or LCVR amino acid sequences being compared are identical or have "insubstantial differences." Insubstantial differences can include substitutions of 1, 2, 3, 4, 5, 6, 7, 8, 9, 10, 11, 12, 13, 14, or 15 amino acids in the antibody LCVR and/or LCVR that do not adversely affect antibody properties. In some embodiments, a sequence is included within the scope of the invention if it is at least 90%, 95%, 98%, or 100% identical to a reference sequence recited herein. In some embodiments, the sequence is at least 90%, 91%, 92%, 93%, 94%, 95%, 96%, 97%, 98%, or 99%, or 100% identical to a reference sequence. Percent identity may be determined for example by pairwise alignment using the default settings of the AlignX module of Vector NTI v.9.0.0 (Invitrogen, Carlsbad, CA). The protein sequences of the present invention may be used as a query sequence to perform a search against public or patent databases to, for example, identify related sequences. Exemplary programs used to perform such searches are the XBLAST or BLASTP programs (http_//wwrw_nobi_nlmr/nih_gov), or the GenomeQuest™ (GenomeQuest, Westborough, MA) suite using the default settings. Exemplary substitutions that may be made to the antibodies that specifically bind LC used in the methods of the invention are for example conservative substitutions with an amino acid having similar charge, hydrophobic, or stereochemical characteristics. Conservative substitutions may also be made to improve antibody properties, for example, stability or affinity, or to improve antibody effector functions. In some embodiments, 1, 2, 3, 4, 5, 6, 7, 8, 9, 10, 11, 12, 13, 14, or 15 amino acid substitutions may be made for example to the HCVR and/or the LCVR of the anti-LC.

The term "pharmaceutical composition" refers to a preparation which is in such form as to permit the biological activity of an active ingredient contained therein to be effective, and which contains no additional components which are unacceptably toxic to a subject to which the formulation would be administered.

A "pharmaceutically acceptable carrier" refers to an ingredient in a pharmaceutical formulation, other than an active ingredient, which is nontoxic to a subject. A pharmaceutically acceptable carrier includes, but is not limited to, a buffer, excipient, stabilizer, or preservative.

As used herein, the terms "specific binding," "selective binding," "selectively binds," and "specifically binds," refer to antibody binding to an epitope on a predetermined antigen. Typically, the antibody binds with an affinity (KD) of approximately less than $10^{-7}$ M, such as approximately less than $10^{-8}$ M, $10^{-9}$ M or $10^{-10}$ M or even lower when determined by surface plasmon resonance (SPR) technology in a BIACORE 3000 instrument, which can be performed, for example, using recombinant CDH11 as the analyte and the antibody as the ligand. In some embodiments, binding by the antibody to the predetermined antigen is with an affinity that is at least two-fold greater than its affinity for binding to a non-specific antigen (e.g., BSA, casein) other than the predetermined antigen or a closely-related antigen. The phrases "an antibody recognizing an antigen" and "an antibody specific for an antigen" are used interchangeably herein with the term "an antibody which binds specifically to an antigen."

A "subject" or an "individual" is a mammal. Mammals include, but are not limited to, domesticated animals (e.g., cows, sheep, cats, dogs, and horses), primates (e.g., humans and non-human primates such as monkeys), rabbits, deer, and rodents (e.g., mice and rats). In certain embodiments, the subject or individual is a human.

"Sustained response" refers to the sustained effect on reducing tumor growth after cessation of a treatment. For example, the tumor size may remain to be the same or smaller as compared to the size at the beginning of the administration phase. In some embodiments, the sustained response has a duration at least the same as the treatment duration, at least 1.5×, 2.0×, 2.5×, or 3.0× length of the treatment duration.

As used herein, the term "treatment" refers to clinical intervention designed to alter the natural course of the individual or cell being treated during the course of clinical pathology. Desirable effects of treatment include decreasing the rate of disease progression, ameliorating or palliating the disease state, and remission or improved prognosis. For example, an individual is successfully "treated" if one or more symptoms associated with cancer are mitigated or eliminated, including, but not limited to, reducing the proliferation of (or destroying) cancerous cells (e.g., metastatic cells), decreasing symptoms resulting from the disease, increasing the quality of life of those suffering from the disease, decreasing the dose of other medications required to treat the disease, and/or prolonging survival of individuals.

As used herein, "delaying progression of a disease" means to defer, hinder, slow, retard, stabilize, and/or postpone development of the disease (such as cancer). This delay can be of varying lengths of time, depending on the history of the disease and/or individual being treated. As is evident to one skilled in the art, a sufficient or significant delay can, in effect, encompass prevention, in that the individual does not develop the disease. For example, a late stage cancer, such as development of metastasis, may be delayed.

As used herein, "administering" is meant a method of giving a dosage of a compound (e.g., an anti-CDH11 antibody of the invention or a nucleic acid encoding an anti-CDH11 antibody of the invention) or a composition (e.g., a pharmaceutical composition, e.g., a pharmaceutical composition including an anti-CDH11 antibody of the invention) to a subject. The compositions utilized in the methods described herein can be administered, for example, intramuscularly, intravenously, intradermally, percutaneously, intraarterially, intraperitoneally, intralesionally, intracranially, intraarticularly, intraprostatically, intrapleurally, intratracheally, intranasally, intravitreally, intravaginally, intrarectally, topically, intratumorally, peritoneally, subcutaneously, subconjunctivally, intravesicularlly, mucosally, intrapericardially, intraumbilically, intraocularly, orally, topically, locally, by inhalation, by injection, by infusion, by continuous infusion, by localized perfusion bathing target cells directly, by catheter, by lavage, in cremes, or in lipid compositions. The method of administration can vary depending on various factors (e.g., the compound or composition being administered and the severity of the condition, disease, or disorder being treated).

As used herein, the term "vector" is meant to include, but is not limited to, a nucleic acid molecule (e.g., a nucleic acid molecule that is capable of transporting another nucleic acid to which it has been linked), a virus (e.g., a lentivirus or an adenovirus, e.g., a recombinant adeno-associated virus (rAAV)), cationic lipid (e.g., liposome), cationic polymer (e.g., polysome), virosome, nanoparticle, or dentrimer. Accordingly, one type of vector is a viral vector, wherein additional DNA segments (e.g., transgenes, e.g., transgenes encoding the heavy and/or light chain genes of an anti-CDH11 antibody of the invention) may be ligated into the viral genome, and the viral vector may then be administered (e.g., by electroporation, e.g., electroporation into muscle tissue) to the subject in order to allow for transgene expression in a manner analogous to gene therapy. Another type of vector is a "plasmid," which refers to a circular double stranded DNA loop into which additional DNA segments may be ligated. Certain vectors are capable of autonomous replication in a host cell into which they are introduced (e.g., bacterial vectors having a bacterial origin of replication and episomal mammalian vectors). Other vectors (e.g., non-episomal mammalian vectors) can be integrated into the genome of a host cell upon introduction into the host cell, and thereby are replicated along with the host genome. Moreover, certain vectors are capable of directing the expression of genes to which they are operatively linked. Such vectors are referred to herein as "recombinant expression vectors" (or simply, "expression vectors"). In general, expression vectors of utility in recombinant DNA techniques are often in the form of plasmids.

Nucleic Acid Molecules and Antibodies

The invention features nucleic acid molecules encoding antibodies, including antibody fragments and fusions. Also, the invention features antibody conjugates in which any of the antibodies described herein are conjugated to a cytotoxic agent. In some embodiments, an antibody of the invention is conjugated to, e.g. SN-38.

In some embodiments, the nucleic acid molecules encode a heavy chain variable region (HCVR) of an anti-human CDH11 antibody, wherein the nucleic acid molecule comprises the following complementarity determining region (CDR) coding sequences: SEQ ID NO: 27 (CDR-H1), SEQ ID NO: 28 (CDR-H2), and SEQ ID NO: 29 (CDR-H3).

In some embodiments, the nucleic acid molecules comprise a sequence encoding: (a) a heavy chain framework 1 (HC-FR1) sequence of SEQ ID NO: 9; (b) a heavy chain framework 2 (HC-FR2) sequence of SEQ ID NO: 10; (c) a heavy chain framework 3 (HC-FR3) sequence of SEQ ID NO: 11; (d) a heavy chain framework 4 (HC-FR4) sequence of SEQ ID NO: 12; and/or (e) a variant of any one or more of (a)-(d) having at least 90% (e.g., at least 90%, 91%, 92%, 93%, 94%, 95%, 96%, 97%, 98%, or 99%, or 100%) sequence identity to its reference sequence, wherein the sequences are in the order: HC-FR1, CDR-H1, HC-FR2, CDR-H2, HC-FR3, CDR-H3, and HC-FR4.

In some embodiments, (a) the HC-FR1 sequence of SEQ ID NO: 9 is encoded by SEQ ID NO: 17; (b) the HC-FR2 sequence of SEQ ID NO: 10 is encoded by SEQ ID NO: 18; (c) the HC-FR3 sequence of SEQ ID NO: 11 is encoded by SEQ ID NO: 19; (d) the HC-FR4 sequence of SEQ ID NO: 12 is encoded by SEQ ID NO: 20; and/or (e) a variant of an HC-FR of any one or more of (a)-(d) is encoded by a variant of any one or more of the reference sequences.

In some embodiments, the nucleic acid molecule comprises a sequence encoding each of HC-FR1, HC-FR2, HC-FR3, and HC-FR4, wherein optionally one or more of said HC-FR1, HC-FR2, HC-FR3, and HC-FR4 is replaced with a variant thereof having at least 90% (e.g., at least 90%, 91%, 92%, 93%, 94%, 95%, 96%, 97%, 98%, or 99%, or 100%) sequence identity to its reference sequence.

In some embodiments, the HCVR comprises the sequence of SEQ ID NO: 7 or a variant thereof having at least 90% (e.g., at least 90%, 91%, 92%, 93%, 94%, 95%, 96%, 97%, 98%, or 99%, or 100%) sequence identity to SEQ ID NO: 7.

In some embodiments, the HCVR is encoded by the sequence of SEQ ID NO: 25 or a variant thereof encoding a variant of a sequence having at least 90% (e.g., at least 90%, 91%, 92%, 93%, 94%, 95%, 96%, 97%, 98%, or 99%, or 100%) sequence identity to SEQ ID NO: 7.

In some embodiments, the nucleic acid molecule encodes a heavy chain comprising said heavy chain variable region of said anti-human CDH11 antibody.

The invention also features nucleic acid molecules encoding a light chain variable region (LCVR) of an anti-human CDH11 antibody, wherein the nucleic acid molecule comprises the following CDR coding sequences: SEQ ID NO: 30 (CDR-L1), SEQ ID NO: 31 (CDR-L2), and SEQ ID NO: 32 (CDR-L3).

In some embodiments, the nucleic acid molecule comprises a sequence encoding: (a) a light chain framework 1 (LC-FR1) sequence of SEQ ID NO: 13; (b) a light chain framework 2 (LC-FR2) sequence of SEQ ID NO: 14; (c) a light chain framework 3 (LC-FR3) sequence of SEQ ID NO: 15; (d) a light chain framework 4 (LC-FR4) sequence of SEQ ID NO: 16; and/or (e) a variant of any one or more of (a)-(d) having at least 90% (e.g., at least 90%, 91%, 92%, 93%, 94%, 95%, 96%, 97%, 98%, or 99%, or 100%) sequence identity to its reference sequence, wherein the sequences are in the order: LC-FR1, CDR-L1, LC-FR2, CDR-L2, LC-FR3, CDR-L3, and LC-FR4.

In some embodiments, (a) the LC-FR1 sequence of SEQ ID NO: 13 is encoded by SEQ ID NO: 21; (b) the LC-FR2 sequence of SEQ ID NO: 14 is encoded by SEQ ID NO: 22; (c) the LC-FR3 sequence of SEQ ID NO: 15 is encoded by SEQ ID NO: 23; (d) the LC-FR4 sequence of SEQ ID NO: 16 is encoded by SEQ ID NO: 24; and/or (e) a variant of an HC-FR of any one or more of (a)-(d) is encoded by a variant of any one or more of the reference sequences.

In some embodiments, the nucleic acid molecule comprises a sequence encoding each of said LC-FR1, LC-FR2, LC-FR3, and LC-FR4, wherein optionally one or more of said LC-FR1, LC-FR2, LC-FR3, and LC-FR4 is replaced with a variant thereof having at least 90% (e.g., at least 90%, 91%, 92%, 93%, 94%, 95%, 96%, 97%, 98%, or 99%, or 100%) sequence identity to its reference sequence.

In some embodiments, the LCVR comprises the sequence of SEQ ID NO: 8 or a variant thereof having at least 90% (e.g., at least 90%, 91%, 92%, 93%, 94%, 95%, 96%, 97%, 98%, or 99%, or 100%) sequence identity to SEQ ID NO: 8.

In some embodiments, the LCVR is encoded by the sequence of SEQ ID NO: 26 or a variant thereof encoding a variant sequence having at least 90% (e.g., at least 90%, 91%, 92%, 93%, 94%, 95%, 96%, 97%, 98%, or 99%, or 100%) sequence identity to SEQ ID NO: 8.

In some embodiments, the nucleic acid molecule encodes a light chain comprising said light chain variable region of said anti-human CDH11 antibody.

The invention also features a nucleic acid molecule encoding a heavy chain, or a portion thereof (e.g., one or more CDRs, variable region, constant region, or Fc-portion of a constant region thereof), and/or a light chain, or a portion thereof (e.g., one or more CDRs, variable region, or constant region thereof).

In some embodiments, the nucleic acid molecule encodes (a) an antibody heavy chain, (b) an antibody light chain, (c)

an antibody heavy chain and an antibody light chain, (d) an HCVR, (e) a LCVR, (f) an HCVR and a LCVR, (g) an antibody fragment, or (h) a single chain antibody.

The invention also features vectors comprising one or more nucleic acid molecule described herein, as well as cells comprising one or more of such nucleic acid molecules or vectors.

Furthermore, the invention features methods of generating an anti-human CDH11 antibody, the methods comprising expressing a nucleic acid molecule as described herein.

The invention features antibodies encoded by a nucleic acid molecule described herein. In some embodiments, the antibody does not comprise a murine heavy chain constant region and/or a murine light chain constant region.

In some embodiments, the antibody is: (a) monoclonal, monospecific, multispecific, or bispecific; (b) a human, chimeric, or humanized antibody; and/or (c) an IgG antibody, optionally selected from IgG1, IgG2, IgG3, and IgG4. In some embodiments, the antibody comprises an antibody fragment which is optionally is a single chain antibody (scFv), Fab, Fab', F(ab')2, F(ab)c, Dab, Nanobody, or Fv.

The invention features an anti-human CDH11 antibody comprising: (a) a heavy chain variable region comprising: (i) a CDR-H1 of SEQ ID NO: 1, (ii) a CDR-H2 of SEQ ID NO: 2, and (iii) a CDR-H3 of SEQ ID NO: 3, and/or (b) a light chain variable region comprising: (i) a CDR-L1 of SEQ ID NO: 4, (ii) a CDR-L2 of SEQ ID NO: 5, and (iii) a CDR-L3 of SEQ ID NO: 6, wherein the antibody comprises at least one substitution in one of said CDR sequences, relative to the recited sequences, and/or is a single chain antibody.

In some embodiments, the antibody comprises: (a) (i) a HC-FR1 sequence of SEQ ID NO: 9; (ii) a HC-FR2 sequence of SEQ ID NO: 10; (iii) a HC-FR3 sequence of SEQ ID NO: 11; (iv) a HC-FR4 sequence of SEQ ID NO: 12; and/or (v) a variant of any one or more of (a) (i)-(iv) having at least 90% (e.g., at least 90%, 91%, 92%, 93%, 94%, 95%, 96%, 97%, 98%, or 99%, or 100%) sequence identity to its reference sequence, wherein the sequences are in the order: HC-FR1, CDR-H1, HC-FR2, CDR-H2, HC-FR3, CDR-H3, and HC-FR4; and/or (b) (i) a LC-FR1 sequence of SEQ ID NO: 13; (ii) a LC-FR2 sequence of SEQ ID NO: 14; (iii) a LC-FR3 sequence of SEQ ID NO: 15; (iv) a LC-FR4 sequence of SEQ ID NO: 16; and/or (v) a variant of any one or more of (b) (i)-(iv) having at least 90% (e.g., at least 90%, 91%, 92%, 93%, 94%, 95%, 96%, 97%, 98%, or 99%, or 100%) sequence identity to its reference sequence, wherein the sequences are in the order: LC-FR1, CDR-L1, LC-FR2, CDR-L2, LC-FR3, CDR-L3, and LC-FR4.

In some embodiments, the antibody comprises: (a) each of said HC-FR1, HC-FR2, HC-FR3, and HC-FR4, wherein optionally one or more of said HC-FR1, HC-FR2, HC-FR3, and HC-FR4 is replaced with a variant thereof having at least 90% (e.g., at least 90%, 91%, 92%, 93%, 94%, 95%, 96%, 97%, 98%, or 99%, or 100%) sequence identity to its reference sequence; and/or (b) each of said LC-FR1, LC-FR2, LC-FR3, and LC-FR4, wherein optionally one or more of said LC-FR1, LC-FR2, LC-FR3, and LC-FR4 is replaced with a variant thereof having at least 90% (e.g., at least 90%, 91%, 92%, 93%, 94%, 95%, 96%, 97%, 98%, or 99%, or 100%) sequence identity to its reference sequence.

In some embodiments, (a) the HCVR comprises the sequence of SEQ ID NO: 7 or a variant thereof having at least 90% (e.g., at least 90%, 91%, 92%, 93%, 94%, 95%, 96%, 97%, 98%, or 99%, or 100%) sequence identity to SEQ ID NO: 7; and/or (b) the LCVR comprises the sequence of SEQ ID NO: 8 or a variant thereof having at least 90% (e.g., at least 90%, 91%, 92%, 93%, 94%, 95%, 96%, 97%, 98%, or 99%, or 100%) sequence identity to SEQ ID NO: 8.

In some embodiments, the antibody comprises a heavy chain comprising said heavy chain variable region of said anti-human CDH11 antibody, and/or the antibody comprises a light chain comprising said light chain variable region of said anti-human CDH11 antibody.

In some embodiments, the antibody is: (a) a human, chimeric, or humanized antibody; and/or (b) an IgG antibody, optionally selected from IgG1, IgG2, IgG3, and IgG4. In some embodiments, the antibody comprises an antibody fragment which is optionally is a single chain antibody (scFv), Fab, Fab', F(ab')2, F(ab)c, Dab, Nanobody, or Fv.

The invention also features single chain antibodies against human CDH11, or a fusion thereof, wherein the single chain antibody comprises one or more of the following CDR sequences: CDR-H1 (SEQ ID NO: 1), CDR-H2 (SEQ ID NO: 2), CDR-H3 (SEQ ID NO: 3), CDR-L1 (SEQ ID NO: 4), CDR-L2 (SEQ ID NO: 5), and/or CDR-L3 (SEQ ID NO: 6), and optionally one or more of the CDRs comprises one or more substitution within one or more of the recited sequences.

In some embodiments, the single chain antibody comprises: (a) (i) a heavy chain framework 1 (HC-FR1) sequence of SEQ ID NO: 9; (ii) a heavy chain framework 2 (HC-FR2) sequence of SEQ ID NO: 10; (iii) a heavy chain framework 3 (HC-FR3) sequence of SEQ ID NO: 11; (iv) a heavy chain framework 4 (HC-FR4) sequence of SEQ ID NO: 12; and/or (v) a variant of any one or more of (a) (i)-(iv) having at least 90% (e.g., at least 90%, 91%, 92%, 93%, 94%, 95%, 96%, 97%, 98%, or 99%, or 100%) sequence identity to its reference sequence, wherein the sequences are in the order: HC-FR1, CDR-H1, HC-FR2, CDR-H2, HC-FR3, CDR-H3, and HC-FR4; and/or (b) (i) a light chain framework 1 (LC-FR1) sequence of SEQ ID NO: 13; (ii) a light chain framework 2 (LC-FR2) sequence of SEQ ID NO: 14; (iii) a light chain framework 3 (LC-FR3) sequence of SEQ ID NO: 15; (iv) a light chain framework 4 (LC-FR4) sequence of SEQ ID NO: 16; and/or (v) a variant of any one or more of (b) (i)-(iv) having at least 90% (e.g., at least 90%, 91%, 92%, 93%, 94%, 95%, 96%, 97%, 98%, or 99%, or 100%) sequence identity to its reference sequence, wherein the sequences are in the order: LC-FR1, CDR-L1, LC-FR2, CDR-L2, LC-FR3, CDR-L3, and LC-FR4.

In some embodiments, the single chain antibody or fusion thereof comprises (a) each of said HC-FR1, HC-FR2, HC-FR3, and HC-FR4, wherein optionally one or more of said HC-FR1, HC-FR2, HC-FR3, and HC-FR4 is replaced with a variant thereof having at least 90% (e.g., at least 90%, 91%, 92%, 93%, 94%, 95%, 96%, 97%, 98%, or 99%, or 100%) sequence identity to its reference sequence; and/or (b) each of said LC-FR1, LC-FR2, LC-FR3, and LC-FR4, wherein optionally one or more of said LC-FR1, LC-FR2, LC-FR3, and LC-FR4 is replaced with a variant thereof having at least 90% (e.g., at least 90%, 91%, 92%, 93%, 94%, 95%, 96%, 97%, 98%, or 99%, or 100%) sequence identity to its reference sequence.

In some embodiments, (a) the HCVR comprises the sequence of SEQ ID NO: 7 or a variant thereof having at least 90% (e.g., at least 90%, 91%, 92%, 93%, 94%, 95%, 96%, 97%, 98%, or 99%, or 100%) sequence identity to SEQ ID NO: 7; and/or (b) the LCVR comprises the sequence of SEQ ID NO: 8 or a variant thereof having at least 90% (e.g., at least 90%, 91%, 92%, 93%, 94%, 95%, 96%, 97%, 98%, or 99%, or 100%) sequence identity to SEQ ID NO: 8.

In some embodiments, the single chain antibody comprises 2, 3, 4, 5, or all 6 of said CDRs.

In some embodiments, the variable light chain portion of the single chain antibody is linked to the variable heavy chain portion of the single chain antibody via a linker, which optionally comprises a linker.

As described herein, an exemplary anti-CDH11 antibody, is exemplified by the incorporation of one or more of the sequences in Table 1 (below).

TABLE 1

Exemplary Sequences of an anti-CDH11 antibody

| SEQ ID NO: | Description | Sequence |
|---|---|---|
| 1 | CDR-H1 | GYSFTDYN |
| 2 | CDR-H2 | INPNYGTT |
| 3 | CDR-H3 | TRLYYGSRYFDV |
| 4 | CDR-L1 | SSVSSSY |
| 5 | CDR-L2 | STS |
| 6 | CDR-L3 | HQYHRSPPT |
| 7 | HCVR | EFQLQQSGPELVKPGASVKISCKASGYSFTDYNMNWVK QSNGKSLEWIGAINPNYGTTSYNQKFKGKATLTVDQSS STAYMQLNSLTSEDSAVYYCTRLYYGSRYFDVWGTGTT VTVSS |
| 8 | LCVR | QIVVTQSPAIMSASLGERVTMTCTASSSVSSSYLHWYQ QKPGSSPKLWIYSTSNLASGVPARFSGSGSGTSYSLTIS SMEAEDVATYYCHQYHRSPPTFGGGAKLEIK |
| 9 | HC-FR1 | EFQLQQSGPELVKPGASVKISCKAS |
| 10 | HC-FR2 | MNWVKQSNGKSLEWIGA |
| 11 | HC-FR3 | SYNQKFKGKATLTVDQSSSTAYMQLNSLTSEDSAVYYC |
| 12 | HC-FR4 | WGTGTTVTVSS |
| 13 | LC-FR1 | QIVVTQSPAIMSASLGERVTMTCTAS |
| 14 | LC-FR2 | LHWYQQKPGSSPKLWIY |
| 15 | LC-FR3 | NLASGVPARFSGSGSGTSYSLTISSMEAEDVATYYC |
| 16 | LC-FR4 | FGGGAKLEIK |
| 17 | HC-FR1 | GAGTTCCAGCTGCAGCAGTCTGGACCTGAGCTGGTG AAGCCTGGCGCTTCAGTGAAGATATCCTGCAAGGCTT CC |
| 18 | HC-FR2 | ATGAACTGGGTGAAGCAGAGCAATGGAAAGAGCCTT GAGTGGATTGGAGCA |
| 19 | HC-FR3 | AGTTACAATCAGAAGTTCAAGGGCAAGGCCACATTGA CTGTAGACCAATCTTCCAGCACAGCCTACATGCAGCT CAACAGCCTGACATCTGAGGACTCTGCAGTCTATTAC TGT |
| 20 | HC-FR4 | TGGGGCACAGGGACCACGGTCACCGTCTCCTCAG |
| 21 | LC-FR1 | CAAATTGTTGTCACCCAGTCTCCAGCAATCATGTCTG CATCTCTAGGGGAACGGGTCACCATGACCTGCACTG CCAGC |
| 22 | LC-FR2 | TTGCACTGGTACCAGCAAAAGCCAGGATCCTCCCCCA AACTCTGGATTTAT |
| 23 | LC-FR3 | AACCTGGCTTCTGGAGTCCCAGCTCGCTTCAGTGGC AGTGGGTCTGGGACCTCTTACTCTCTCACAATCAGCA GCATGGAGGCTGAAGATGTTGCCACTTATTATTGC |
| 24 | LC-FR4 | TTCGGTGGAGGCGCCAAGCTGGAAATCAAA |
| 25 | HCVR | GAGTTCCAGCTGCAGCAGTCTGGACCTGAGCTGGTG AAGCCTGGCGCTTCAGTGAAGATATCCTGCAAGGCTT CCGGTTACTCATTCACTGACTATAATATGAACTGGGT GAAGCAGAGCAATGGAAAGAGCCTTGAGTGGATTGG AGCAATTAATCCTAACTATGGTACTACTAGTTACAATC AGAAGTTCAAGGGCAAGGCCACATTGACTGTAGACCA |

TABLE 1-continued

Exemplary Sequences of an anti-CDH11 antibody

| SEQ ID NO: | Description | Sequence |
|---|---|---|
| | | ATCTTCCAGCACAGCCTACATGCAGCTCAACAGCCTG<br>ACATCTGAGGACTCTGCAGTCTATTACTGTACAAGAC<br>TTTACTACGGTAGTAGGTACTTCGATGTCTGGGGCAC<br>AGGGACCACGGTCACCGTCTCCTCAG |
| 26 | LCVR | CAAATTGTTGTCACCCAGTCTCCAGCAATCATGTCTG<br>CATCTCTAGGGGAACGGGTCACCATGACCTGCACTG<br>CCAGCTCAAGTGTAAGTTCCAGTTACTTGCACTGGTA<br>CCAGCAAAAGCCAGGATCCTCCCCCAAACTCTGGATT<br>TATAGCACATCCAACCTGGCTTCTGGAGTCCCAGCTC<br>GCTTCAGTGGCAGTGGGTCTGGGACCTCTTACTCTCT<br>CACAATCAGCAGCATGGAGGCTGAAGATGTTGCCACT<br>TATTATTGCCACCAGTATCATCGTTCCCCACCGACGT<br>TCGGTGGAGGCGCCAAGCTGGAAATCAAA |
| 27 | CDR-H1 | GGTTACTCATTCACTGACTATAAT |
| 28 | CDR-H2 | ATTAATCCTAACTATGGTACTACT |
| 29 | CDR-H3 | ACAAGACTTTACTACGGTAGTAGGTACTTCGATGTC |
| 30 | CDR-L1 | TCAAGTGTAAGTTCCAGTTAC |
| 31 | CDR-L2 | AGCACATCC |
| 32 | CDR-L3 | CACCAGTATCATCGTTCCCCACCGACG |

In some embodiments, the antibody binds to CDH11 (e.g., human CDH11) and CDH1 (e.g., human CDH1).

In some embodiments, the antibody binds to human CDH11 and human CDH1.

In some embodiments, the antibody binds to the extracellular domain of human CDH11.

In some embodiments, the antibody binds to an epitope of human CDH11 comprising (SEQ ID NO: 33)
LGMLCHSHAFAPERRGHLRPSFHGHHEKGKEGQVLQRSKRGWVWNQFFV
IEEYTGPDPVLVGRLHSDIDSGDGNIKYILSGEGAGTIFVIDDKS
or (SEQ ID NO: 34)
APKFAAPYEGFICESDQTKPLSNQPIVTISADDKDDTANGPRFIFSLPP
EIIHNPNFTVRDNRDNTAGVYARRGGFSRQKQDLYLLPIVISDGGIPPM
SSTNTLT,
or a portion thereof.

In some embodiments, the antibody binds to an epitope of human CDH11 comprising or consisting of (SEQ ID NO: 33)
LGMLCHSHAFAPERRGHLRPSFHGHHEKGKEGQVLQRSKRGWVWNQFFV
IEEYTGPDPVLVGRLHSDIDSGDGNIKYILSGEGAGTIFVIDDKS.

In some embodiments, the antibody binds to an epitope of human CDH11 comprising or consisting of (SEQ ID NO: 34)
APKFAAPYEGFICESDQTKPLSNQPIVTISADDKDDTANGPRFIFSLPP
EIIHNPNFTVRDNRDNTAGVYARRGGFSRQKQDLYLLPIVISDGGIPPM
SSTNTLT.

In some embodiments, the antibody binds to the extracellular domain of human CDH1 or murine CDH1.

In some embodiments, the antibody binds to the extracellular domain of human CDH1 and murine CDH1.

In some embodiments, the antibody binds to the extracellular domain of human CDH1.

In some embodiments, the antibody binds to an epitope of human CDH1 comprising (SEQ ID NO: 35)
LNTVGHHHRPPPHQASVSGIQAELLTFPNSSPGLRRQKRDWVIPPISCP
ENEKGPFPKNLVQIKSNKDKEGKVFYSITGQGADTPPVGVFIIERET
or (SEQ ID NO: 36)
APIPEPRTIFFCERNPKPQVINIIDADLPPNTSPFTAELTHGASANWTI
QYNDPTQESIILKPKMALEVGDYKINLKLMDNQNKDQVTTLE,
or portion thereof.

In some embodiments, the antibody binds to an epitope of human CDH1 comprising or consisting of (SEQ ID NO: 35)
LNTVGHHHRPPPHQASVSGIQAELLTFPNSSPGLRRQKRDWVIPPISCP
ENEKGPFPKNLVQIKSNKDKEGKVFYSITGQGADTPPVGVFIIERET.

In some embodiments, the antibody binds to an epitope of human CDH1 comprising or consisting of (SEQ ID NO: 36)
APIPEPRTIFFCERNPKPQVINIIDADLPPNTSPFTAELTHGASANWTI
QYNDPTQESIILKPKMALEVGDYKINLKLMDNQNKDQVTTLE.

Substitution, Insertion, and Deletion Variants

In certain embodiments, CDH11 antibody variants or antibody fragments and fusions thereof having one or more amino acid substitutions are provided. Sites of interest for substitutional mutagenesis include the HVRs and framework regions. Conservative substitutions are shown in Table 2 under the heading of "preferred substitutions." More substantial changes are provided in Table 2 under the heading of "exemplary substitutions," and as further described below in reference to amino acid side chain classes. Amino acid substitutions may be introduced into a CDH11 antibody and the products screened for a desired activity, for example, retained/improved antigen binding and/or decreased immunogenicity.

TABLE 2

Exemplary and Preferred Amino Acid Substitutions

| Original Residue | Exemplary Substitutions | Preferred Substitutions |
|---|---|---|
| Ala (A) | Val; Leu; Ile | Val |
| Arg (R) | Lys; Gln; Asn | Lys |
| Asn (N) | Gln; His; Asp, Lys; Arg | Gln |
| Asp (D) | Glu; Asn | Glu |
| Cys (C) | Ser; Ala | Ser |
| Gln (Q) | Asn; Glu | Asn |
| Glu (E) | Asp; Gln | Asp |
| Gly (G) | Ala | Ala |
| His (H) | Asn; Gln; Lys; Arg | Arg |
| Ile (I) | Leu; Val; Met; Ala; Phe; Norleucine | Leu |
| Leu (L) | Norleucine; Ile; Val; Met; Ala; Phe | Ile |
| Lys (K) | Arg; Gln; Asn | Arg |
| Met (M) | Leu; Phe; Ile | Leu |
| Phe (F) | Trp; Leu; Val; Ile; Ala; Tyr | Tyr |
| Pro (P) | Ala | Ala |
| Ser (S) | Thr | Thr |
| Thr (T) | Val; Ser | Ser |
| Trp (W) | Tyr; Phe | Tyr |
| Tyr (Y) | Trp; Phe; Thr; Ser | Phe |
| Val (V) | Ile; Leu; Met; Phe; Ala; Norleucine | Leu |

Amino acids may be grouped according to common side-chain properties:
(1) hydrophobic: Norleucine, Met, Ala, Val, Leu, Ile;
(2) neutral hydrophilic: Cys, Ser, Thr, Asn, Gln;
(3) acidic: Asp, Glu;
(4) basic: His, Lys, Arg;
(5) residues that influence chain orientation: Gly, Pro;
(6) aromatic: Trp, Tyr, Phe.

Non-conservative substitutions will entail exchanging a member of one of these classes for another class.

One type of substitutional variant involves substituting one or more HVR residues of a parent antibody. Generally, the resulting variant(s) selected for further study will have modifications (e.g., improvements) in certain biological properties (e.g., increased affinity, reduced immunogenicity) relative to the parent antibody and/or will have substantially retained certain biological properties of the parent antibody. An exemplary substitutional variant is an affinity matured antibody, which may be conveniently generated, e.g., using phage display-based affinity maturation techniques. Briefly, one or more HVR residues are mutated and the variant antibodies displayed on phage are screened for a particular biological activity (e.g. binding affinity).

Alterations (e.g., substitutions) may be made in HVRs, e.g., to improve antibody affinity. Such alterations may be made in HVR "hotspots," i.e., residues encoded by codons that undergo mutation at high frequency during the somatic maturation process (see, e.g., Chowdhury, *Methods Mol. Biol.* 207:179-196 (2008)), and/or residues that contact the antigen, with the resulting variant HCVR or LCVR being tested for binding affinity. Affinity maturation by constructing and reselecting from secondary libraries has been described, e.g., in Hoogenboom et al. in *Methods in Molecular Biology* 178:1-37 (O'Brien et al., ed., Human Press, Totowa, NJ, (2001).) In some embodiments of affinity maturation, diversity is introduced into the variable genes chosen for maturation by any of a variety of methods (e.g., error-prone PCR, chain shuffling, or oligonucleotide-directed mutagenesis). A secondary library is then created. The library is then screened to identify any antibody variants with the desired affinity. Another method to introduce diversity involves HVR-directed approaches, in which several HVR residues (e.g., 4-6 residues at a time) are randomized. HVR residues involved in antigen binding may be specifically identified, e.g., using alanine scanning mutagenesis or modeling.

In certain embodiments, substitutions, insertions, or deletions may occur within one or more HVRs so long as such alterations do not substantially reduce the ability of the antibody to bind the antigen. For example, conservative alterations (e.g., conservative substitutions as provided herein) that do not substantially reduce binding affinity may be made in HVRs. Such alterations may, for example, be outside of antigen contacting residues in the HVRs. In certain embodiments, each HVR either is unaltered, or contains more than one (e.g. two, three, four, five, six, seven, eight, nine, or ten) amino acid substitutions.

A useful method for identification of residues or regions of an antibody that may be targeted for mutagenesis is the determination of antigen contact residues by a crystal structure of an antigen-antibody complex, as described in Example 5. Such contact residues and neighboring residues thereof may be targeted or eliminated as candidates for substitution. Variants may be screened to determine whether they contain the desired properties. Alternatively, or additionally, a useful method for identification of residues or regions that may be targeted is called "alanine scanning mutagenesis" as described by Cunningham and Wells (1989) *Science*, 244:1081-1085. In this method, a residue or group of target residues (e.g., charged residues such as Arg, Asp, His, Lys, and Glu) are identified and replaced by a neutral or negatively charged amino acid (e.g., alanine or polyalanine) to determine whether the interaction of the antibody with antigen is affected. Further substitutions may be introduced at the amino acid locations demonstrating functional sensitivity to the initial substitutions.

In some embodiments, the anti-CDH11 antibody variant or antibody fragment and fusion thereof includes one or more substitutions and/or deletions occurring at an amino acid described in Table 3, below.

TABLE 3

Exemplary CDH11 Residue Sites for Directed Amino Acid Substitution

| Heavy Chain Residue Sites | Light Chain Residue Sites |
|---|---|
| Phe 2, Gly 26, Tyr 27, Ser 28, Thr 30, Asp 31, Tyr 32, Asn 54, Tyr 55, Thr 57, Arg 98, Tyr 100, Tyr 101, Gly 102, Ser 103, Arg 104, Tyr 105, and Asp 107 | Ser 30, Ser 31, Ser 32, Tyr 33, His 35, Tyr 50, Ser 51, Ser 53, Asn 54, Leu 55, Ala 56, Ser 57, Gly 58, Val 59, Ala 61, Tyr 92, and His 93 |

In some embodiments, a nucleic acid molecule encodes a HCVR and/or a LCVR of an anti-CDH11 antibody variant which includes one or more substitutions and/or deletions occurring at an amino acid described in Table 3, above.

For example, in some embodiments, the one or more substitutions and/or deletions occur at residue: Phe 2, Gly 26, Tyr 27, Ser 28, Thr 30, Asp 31, Tyr 32, Asn 54, Tyr 55, Thr 57, Arg 98, Tyr 100, Tyr 101, Gly 102, Ser 103, Arg 104, Tyr 105, and Asp 107 relative to SEQ ID NO: 7.

In some embodiments, the one or more substitutions and/or deletions occur at: Ser 30, Ser 31, Ser 32, Tyr 33, His 35, Tyr 50, Ser 51, Ser 53, Asn 54, Leu 55, Ala 56, Ser 57, Gly 58, Val 59, Ala 61, Tyr 92, and His 93 relative to SEQ ID NO: 8.

Immunoconjugates

The invention also features immunoconjugates comprising an anti-CDH11 antibody herein conjugated to one or more cytotoxic agents, such as chemotherapeutic agents or drugs, for example SN-38.

Immunoconjugates allow for the targeted delivery of a drug moiety to a tumor, and, in some embodiments intracellular accumulation therein, where systemic administration of unconjugated drugs may result in unacceptable levels of toxicity to normal cells (Polakis P. (2005) *Current Opinion in Pharmacology* 5:382-387).

Antibody-drug conjugates (ADC) are targeted chemotherapeutic molecules which combine properties of both antibodies and cytotoxic drugs (e.g., SN-38) by targeting potent cytotoxic drugs to antigen-expressing tumor cells (Teicher, B. A. (2009) *Current Cancer Drug Targets* 9:982-1004), thereby enhancing the therapeutic index by maximizing efficacy and minimizing off-target toxicity (Carter, P. J. and Senter P. D. (2008) *The Cancer Jour.* 14(3):154-169; Chari, R. V. (2008) *Acc. Chem. Res.* 41:98-107.

The ADC compounds of the invention include those with anticancer activity. In some embodiments, the ADC compounds include an antibody conjugated, i.e. covalently attached, to the drug moiety. In some embodiments, the antibody is covalently attached to the drug moiety through a linker. The ADC of the invention selectively deliver an effective dose of a drug to tumor tissue whereby greater selectivity, i.e. a lower efficacious dose, may be achieved while increasing the therapeutic index ("therapeutic window").

The drug moiety (D) of the antibody-drug conjugates (ADC) may include any compound, moiety or group that has a cytotoxic or cytostatic effect. Drug moieties may impart their cytotoxic and cytostatic effects by mechanisms including but not limited to tubulin binding, DNA binding or intercalation, and inhibition of RNA polymerase, protein synthesis, and/or topoisomerase. Exemplary drug moieties include, but are not limited to, a maytansinoid, dolastatin, auristatin, calicheamicin, pyrrolobenzodiazepine (PBD), nemorubicin and its derivatives, PNU-159682, anthracycline, duocarmycin, vinca alkaloid, taxane, trichothecene, CC1065, camptothecin, elinafide, and stereoisomers, isosteres, analogs, and derivatives thereof that have cytotoxic activity. Nonlimiting examples of such immunoconjugates are discussed in further detail below.

EXEMPLARY Antibody-Drug Conjugates

An exemplary embodiment of an antibody-drug conjugate (ADC) compound comprises an antibody (Ab) which targets a tumor cell, a drug moiety (D), and a linker moiety (L) that attaches Ab to D. In some embodiments, the antibody is attached to the linker moiety (L) through one or more amino acid residues, such as a surface amine.

An exemplary ADC has Formula I:

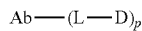

where p is 1 to about 20. In some embodiments, the number of drug moieties that can be conjugated to an antibody is limited by the number of free amine residues. In some embodiments, free amine residues are introduced into the antibody amino acid sequence. Exemplary ADC of Formula I include, but are not limited to, antibodies that have 1, 2, 3, or 4 engineered amine amino acids. In some embodiments, one or more free amine residues are already present in an antibody, without the use of engineering, in which case the existing free amine residues may be used to conjugate the antibody to a drug.

a) Exemplary Antibody

In some embodiments, an immunoconjugate comprises an anti-CDH11 antibody conjugated to one or drug moiety molecules.

As described herein, an exemplary anti-CDH11 antibody, is exemplified by the incorporation of one or more of the sequences in Table 1, shown above.

In another example, an immunoconjugate comprises: (i) an antibody that binds CDH11 and CDH1 conjugated to one or more drug moiety molecules (e.g., a cytotoxic agent).

b) Exemplary Drug Moiety

In some embodiments, an immunoconjugate comprises an antibody conjugated to one or more SN-38 molecules. SN-38 is the active metabolite of irinotecan and is formed via hydrolysis of irinotecan by carboxylesterases and metabolized via glucuronidation by UGT1A1.

An SN-38 drug moiety is an attractive drug moiety in antibody-drug conjugate because it effective against a variety of tumor cell lines.

An SN-38 drug moiety includes that having the structure:

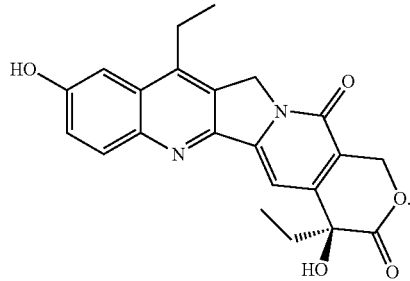 [SMILES: CCc1c2c(nc3ccc(O)cc13)-c1cc3c(c(=O)n1C2)COC(=O)[C@]3(O)CC]

c) Exemplary Linker

A "Linker" (L) is a bifunctional or multifunctional moiety that can be used to link one or more drug moieties (D) to an antibody (Ab) to form an antibody-drug conjugate (ADC) of Formula I. In some embodiments, antibody-drug conjugates (ADC) can be prepared using a Linker having reactive functionalities for covalently attaching to the drug and to the antibody. For example, in some embodiments, an amine of an antibody (Ab) can form a bond with a reactive functional group of a linker or a drug-linker intermediate to make an ADC.

In one aspect, a linker has a functionality that is capable of reacting with a free amine present on an antibody to form a covalent bond. Nonlimiting exemplary such reactive functionalities include activated esters such as succinimide esters, 4-nitrophenyl esters, pentafluorophenyl esters, tetrafluorophenyl esters, maleimide, haloacetamides, α-haloacetyl, anhydrides, acid chlorides, sulfonyl chlorides, isocyanates, and isothiocyanates. See, e.g., the conjugation method at page 766 of Klussman, et al. (2004), *Bioconjugate Chemistry* 15(4):765-773, and the Examples herein.

A linker may comprise one or more linker components. Exemplary linker components include a releasable ester linker described herein. Various linker components are known in the art.

Methods of Preparing Immunoconjugates

An ADC of Formula I may be prepared by several routes employing organic chemistry reactions, conditions, and reagents known to those skilled in the art, including: (1) reaction of a nucleophilic group of an antibody with a bivalent linker reagent to form Ab-L via a covalent bond, followed by reaction with a drug moiety D; and (2) reaction of a nucleophilic group of a drug moiety with a bivalent linker reagent, to form D-L, via a covalent bond, followed by reaction with a nucleophilic group of an antibody.

Nucleophilic groups on antibodies include but are not limited to: (i) N-terminal amine groups, (ii) side chain amine groups, e.g., lysine, (iii) side chain thiol groups, e.g., cysteine, and (iv) sugar hydroxyl or amino groups where the antibody is glycosylated. Amine, thiol, and hydroxyl groups are nucleophilic and capable of reacting to form covalent bonds with electrophilic groups on linker moieties and linker reagents including: (i) active esters such as NHS esters, HOBt esters, haloformates, and acid halides; (ii) alkyl and benzyl halides such as haloacetamides; and (iii) aldehydes, ketones, carboxyl, and maleimide groups. Certain antibodies have reducible interchain disulfides, i.e., cysteine bridges. Antibodies may be made reactive for conjugation with linker reagents by treatment with a reducing agent such as DTT (dithiothreitol) or tricarbonylethylphosphine (TCEP), such that the antibody is fully or partially reduced. Each cysteine bridge will thus form, theoretically, two reactive thiol nucleophiles. Additional nucleophilic groups can be introduced into antibodies through modification of lysine residues, e.g., by reacting lysine residues with 2-iminothiolane (Traut's reagent), resulting in conversion of an amine into a thiol. Reactive thiol groups may also be introduced into an antibody by introducing one, two, three, four, or more cysteine residues (e.g., by preparing variant antibodies comprising one or more non-native cysteine amino acid residues).

ADCs may also be produced by reaction between an electrophilic group on an antibody, such as an aldehyde or ketone carbonyl group, with a nucleophilic group on a linker reagent or drug. Useful nucleophilic groups on a linker reagent include, but are not limited to, hydrazide, oxime, amino, hydrazine, thiosemicarbazone, hydrazine carboxylate, and arylhydrazide. In one embodiment, an antibody is modified to introduce electrophilic moieties that are capable of reacting with nucleophilic substituents on the linker reagent or drug. In another embodiment, the sugars of glycosylated antibodies may be oxidized, e.g., with periodate oxidizing reagents, to form aldehyde or ketone groups which may react with the amine group of linker reagents or drug moieties. The resulting imine Schiff base groups may form a stable linkage, or may be reduced, e.g., by borohydride reagents to form stable amine linkages. In one embodiment, reaction of the carbohydrate portion of a glycosylated antibody with either galactose oxidase or sodium meta-periodate may yield carbonyl (aldehyde and ketone) groups in the antibody that can react with appropriate groups on the drug (Hermanson, Bioconjugate Techniques). In another embodiment, antibodies containing N-terminal serine or threonine residues can react with sodium meta-periodate, resulting in production of an aldehyde in place of the first amino acid (Geoghegan & Stroh, (1992) Bioconjugate Chem. 3:138-146; U.S. Pat. No. 5,362,852). Such an aldehyde can be reacted with a drug moiety or linker nucleophile.

Exemplary nucleophilic groups on a drug moiety include, but are not limited to: amine, thiol, hydroxyl, hydrazide, oxime, hydrazine, thiosemicarbazone, hydrazine carboxylate, and arylhydrazide groups capable of reacting to form covalent bonds with electrophilic groups on linker moieties and linker reagents including: (i) active esters such as NHS esters, HOBt esters, haloformates, and acid halides; (ii) alkyl and benzyl halides such as haloacetamides; (iii) aldehydes, ketones, carboxyl, and maleimide groups.

A nonlimiting exemplary cross-linker reagent that may be used to prepare an ADC is a releasable ester linker. Methods of using such a cross-linker reagent to link two moieties, including a proteinaceous moiety and a chemical moiety, are known in the art. In some embodiments, a fusion protein comprising an antibody and a cytotoxic agent may be made, e.g., by recombinant techniques or peptide synthesis. A recombinant DNA molecule may comprise regions encoding the antibody and cytotoxic portions of the conjugate either adjacent to one another or separated by a region encoding a linker peptide which does not destroy the desired properties of the conjugate.

Exemplary Methods of Preparing Immunoconjugates

The methods, in general, for example, include that as described in the PerKit™ Antibody SN38 Conjugation Kit (CM11408 and CM11408x3) User Reference Guide:

A. Prepare Site and Reagents for Labeling Experiment

A1. Remove Box 1 containing O-succinyl SN38 NHS ester from the −20° C. freezer and warm to RT before opening the bag.

A2. Remove Box 2 from the refrigerator.

A3. Briefly spin the centrifuge tube containing SN38. Place the SN38 tube in a tube holder inside a chemical hood and wait until the antibody is ready for conjugation.

A4. Set the temperature of the incubator or shaker to 25° C.

B. Preparation of Antibody Samples for Conjugation

B1. Insert the Filter Device into one of the provided collection tube (microcentrifuge tube with the cap attached). Perform the step based on the following conditions. If an antibody is supplied as a lyophilized solid, dissolve the antibody in 500 µL of deionized water and then transfer the entire contents to the Filter Device. If your antibody is supplied in <500 µL buffer, transfer your antibody sample to the Filter Device directly. Add Buffer A to make up the total volume to 500 µL and cap it. If the volume of your antibody sample is between 500 and 1000 µL, divide the volume into two Centrifugal Filter Devices. Add Buffer A to make up the total volume in each filter device to 500 µL and cap them. If the volume of your antibody sample is >1000 µL, add up to 500 µL of sample to each of the two Filter Devices and cap them. Repeat Step B1-B4 until all of the antibody sample goes into the Filter Device. Move on to Step B5. Add Buffer A to make up the total volume to 500 µL in each device for the last refill.

B2. Place the capped Filter Device into the centrifuge rotor, aligning the cap strap toward the center of the rotor; counterbalance with a similar device.

B3. Spin the Filter Device at 14,000×g for 8 minutes (preferably cooled to 4° C.) to concentrate to <100 µL (Spin time depends on many factors. The typical spin time for a 500 µL sample is approximately 8 to 20 minutes. The typical volume is ~40 µL after spinning for 8 minutes on an Eppendorf 5417R at 4° C.)

B4. Remove the assembled device from the centrifuge and separate the Filter Device from the collection tube. Transfer the filtrate from the collection tube to a clean centrifuge tube. Save the filtrate until the experiments are done.

B5. Insert the Filter Device back into the collection tube. Add 400-450 µL of Buffer A to make up the total volume to 500 µL. Next, place the capped Filter Device into the centrifuge rotor, aligning the cap strap toward the center of the rotor; counterbalance with a similar device. Spin the device at 14,000×g to concentrate to <100 μL. Remove the assembled device from the centrifuge and separate the Filter Device from the collection tube. Transfer the filtrate from the collection tube to a clean centrifuge tube (not provided). Save the filtrate until the experiments are done.

B6. Repeat Step B5 two more times.

B7. Transfer the concentrated sample from the Filter Device to a 1.5 mL micro-centrifuge tube.

B8. Add 50-100 μL of Buffer A to the Filter Device to rinse (actual volume of Buffer A added will depend upon the calculated total volume in Step B110). Stir it gently with a pipet tip, then transfer the entire contents to the 1.5 mL micro-centrifuge tube from Step B7.

B9. Repeat Step B8 once.

B10. Add Buffer A to the 1.5 mL micro-centrifuge tube from Step B9 to make up the total volume of the sample to 618+/−5 μL and cap it.

Calculation 1 for Less Antibody (Ab):

Total volume of the antibody in step $B10$ (μL)=Ab in mg×206.

B11. Vortex the combined antibody sample for 30 seconds and then spin down.

C. SN38 Labeling

C1. Spin CM01006 to ensure there is no liquid in the cap before opening it. Add 132 μL of CM01006 to the SN38 tube from Step A3. Vortex for 30 seconds to 1 minute to dissolve the reagent and then spin down.

C2. Transfer the entire SN38 solution from Step C1 to the antibody solution from Step B111. When you add the SN38 solution, place the pipette tip inside the antibody solution and then dispense the SN38 slowly while swirling the pipette tip. Dispose of the pipette tip and SN38 tube in the solid waste bag.

Calculation 2 for Less Antibody (Ab):

Volume of SN38 solution to be transferred in Step $C2$ (μL)=Ab in mg×44.

C3. Cap the centrifuge tube. Mix at 25° C. or RT for 4 h or overnight (less than 16 h).

Purification of Immunoconjugate

D1. In a chemical hood, securely attach the Desalting Column to a support stand, lab frame, or any support rod. Remove the top and bottom caps from the column and allow the excess liquid to flow through by gravity. Collect the liquid in a flask.

D2. Add 5 mL of PBS buffer and allow the buffer to completely enter the gel bed by gravity flow.

D3. Repeat Step D2 twice.

D4. Spin the SN38 labeled antibody solution from Step C3 before opening it. Add the entire antibody solution to the column. Allow the sample to enter the gel bed completely. Dispose of the centrifuge tube in the solid waste bag.

D5. Add 250 μL of PBS buffer and allow the liquid to enter the gel bed completely.

Calculation 5 for Less Antibody (Ab):

Volume of storage buffer in Step $D5$ (μL)=1000−Ab in mg×250.

D6. Place a 2.0 mL centrifuge tube under the column. Add 1.25 mL of PBS buffer to the column.

Collect the eluent by gravity and allow the buffer to enter the gel bed completely.

Calculation 6 for Less Antibody (Ab):

Volume of Storage buffer in Step $D6$ (μL)=500+Ab in mg×250.

D7. Label the tube as your product. Store your conjugate at 4° C.

D8. Determine the concentration and the estimated DAR by UV/Vis spectrophotometry.

D9. If the ADC is not used within few days for the experiment, add Stabilization PBS buffer (5×) to the ADC from Step D7. If the total volume of ADC is 1.25 mL, add 312.5 μL of Stabilization PBS buffer. Aliquot and store the conjugate in a <−20° C. freezer or lyophilize to dryness for long-term storage.

EXAMPLES

The following are examples of the methods and compositions described herein. It is understood that various other embodiments may be practiced, given the general description provided above.

Example 1. Materials and Methods

Cell Culture

Breast cancer circulating tumor cell (CTC) lines (Brx-82, Brx-142, Brx-394, Brx-189, Brx-390, Brx-121, Brx-292, Brx-319, Brx-250, Brx-140, Brx-401, Brx-07, Brx-29, Brx-50, Brx-61, Brx-68, and Brx-330) were grown in suspension in ultra-low attachment plates (Corning) in tumor sphere media, consisting of RPMI-1640 with GlutaMAX supplemented with epidermal growth factor (EGF; 20 ng/mL), fibroblast growth factor (FGF; 20 ng/mL), 1× B27, and 1× antibiotic/antimycotic (Life Technologies), in 4% $O_2$. Breast cancer cell line MDA-MB-231, pancreatic ductal adenocarcinoma (PDAC) cells (PDAC9, PDAC3, PDAC2, PDAC5, PDAC7, PDAC6, and PDAC8), and cancer associated fibroblasts (CAF) were grown on adherent tissue culture plates in high glucose DMEM supplemented with 10% fetal bovine serum and penicillin/streptomycin. Cell lines were routinely checked for mycoplasma (MycoAlert, Lonza), and were authenticated by RNA sequencing and DNA sequencing.

RNA Sequencing

RNA was extracted using the RNeasy Mini Kit (Qiagen). To generate libraries for RNA sequencing (RNA-Seq), the SMART-Seq HT Kit (Takara Bio USA) was used according to the manufacturer's instructions. Pooled libraries were sequenced on an Illumina NextSeq sequencer.

Western Blot Analysis

Western blot analysis was performed on whole cell extracts prepared with radioimmunoprecipitation assay (RIPA) buffer. Proteins were separated on 4-15% polyacrylamide gradient-sodium dodecyl sulfate (SDS) gels (Bio-Rad) and transferred onto a Nitrocellulose membrane (Invitrogen). Western blots were visualized with Enhanced Chemiluminescence (Perkin-Elmer). Primary antibodies were used against GAPDH (1:2000; Millipore ABS16) and Cadherin 11 (23C6 [1:500] or 3H10 [1:500]).

shRNA Knockdown

MDA-MB-231 cells were transfected either with control short hairpin (shRNA; antisense sequence, 5 CCGCAGGTATGCACGCGT-3') or with Cadherin 11-targeting shRNA C9 (antisense sequence, 5'-CAATGTGG-GAACGTCAGTAAT-3'), C11 (antisense sequence, 5-CCACTTTCCAACCAGCCAATT-3'), or G12 (antisense sequence, 5-CCACTTTCCAACCAGCCAATT-3') using Lipofectamine RNAiMAX (Life Technologies) and harvested for further analysis 48 hours after transfection.

Histology, Immunohistochemistry, and Immunofluorescence

Tumors were fixed in 10% formalin overnight, then preserved in 70% ethanol. The tissue was embedded in paraffin and cut in 5-μm sections.

For histologic analysis, sections were stained with hematoxylin and eosin or immunohistochemical staining was performed. Tissues were permeabilized, and antigen retrieval was performed in 1× citrate buffer (pH 6) for 15 min. Slides were washed and blocked for 30 min with 5% goat serum. Sections were incubated with primary antibodies Cadherin 11 (23C6 [1:200] or 3H10 [1:200) for 1 hour at room temperature. Slides were incubated with HRP anti-rabbit antibody (DAKO) for 30 min. After washing with PBS, the sections were incubated in 3,3'-diaminobenzidine (Vector Laboratories) for 10 min. Cells were counterstained with Gill's #2 haematoxylin for 10-15 s. Stained tissue sections were digitized using the Aperio CSO (Leica Biosystems).

For immunofluorescence studies, MDA-MB-231 cells were enumerated on the BioView imaging system after staining with Alexa 488-conjugated antibodies against Cadherin 11 followed by secondary antibodies conjugated with Alexa-488 (Invitrogen).

Trans-Well Migration Assay

The in vitro migration assay was performed using a 24-well modified Boyden chamber trans-well with polyethylene terephthalate (PET) membranes containing 8-micron pores (BD BioCoat). Stable pools of MDA-MB-231 cells infected were maintained in growth medium until the day of the assay. 15,000 cells in 100 μL of assay medium were seeded in the upper chamber, and 500 μL assay medium with or without 20 ng/mL EGF was added to the lower chamber. Cells were incubated at 37° C. for 24 hours, then fixed in 70% ethanol for 20 min, rinsed with phosphate buffered saline (PBS), and stained with 2.3% crystal violent. Cells that remained on the upper surface were mechanically removed with a cotton swab. Cells remaining on the underside were counted (5 fields at 20× magnification per transwell). Trans-wells were plated in triplicates and the results were averaged.

Mouse Studies

MDA-MB-231 and PDAC9 cells stably expressing green florescent protein (GFP) and luciferase were injected subcutaneously in 4 female immunocompromised NOD-severe combined immune deficiency interleukin 2 receptor subunit gamma$^{null}$ (NSG) mice per sample. Metastatic growth was measured via in vivo imaging using the IVIS Lumina II (PerkinElmer) following intraperitoneal injection of D-luciferin (Sigma). Mice were sacrificed when they developed poor body condition, and lungs and liver were harvested into 10% formalin for 24 hours for fixation prior to immunohistochemistry. For orthotopic xenograft injections, 2.0×10$^5$ cells were injected into each of the fourth mammary fat pads of 4 female NSG mice per sample.

Survival Assay

For the survival analysis, mice were injected with either MDA-MB-231 or PDAC9 cells as described above. The mice were monitored every 1-2 days for signs of poor body condition. The mice were euthanized when they developed poor body condition according to IACUC protocol and this was determined to be the date of death. Kaplan-Meier analysis for the survival of the mice was performed.

Example 2. Breast Cancer Anti-CDH11 Antibody Therapy

The ability to metastasize is a feature that is not present in all cancer cells of a tumor, such that this heterogeneity features a mechanism for cancer cells to dynamically respond to traditional therapeutic interventions. The ability to target this subset of tumor cells is therefore important in blocking the dissemination of tumor cells that would ultimately lead to mortality.

This Example describes the development of anti-CDH11 antibodies for the treatment of breast cancer, for example, by identifying the expression of CDH11 in multiple CTC lines from breast cancer patients and testing two anti-CDH11 monoclonal antibody clones, 3H10 and 23C6, for the reduction of metastatic burden in a mouse model of primary breast cancer metastasis.

Materials and Methods

Materials and Methods are described in Example 1.

Results

Figure 2:
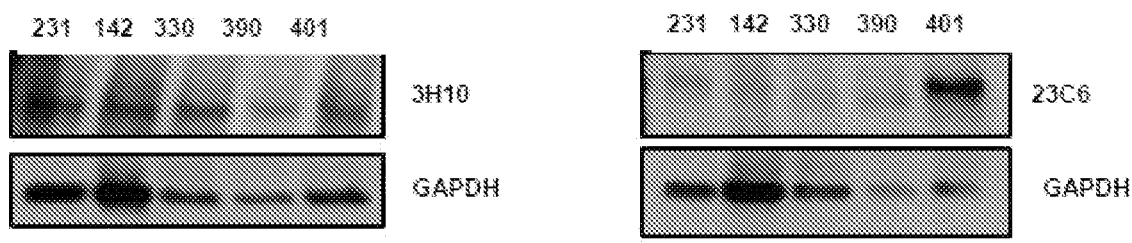
FIG. 2 is a western blot showing CDH11 protein expression in the breast cancer cell line MDA-MB-231 (231) and breast cancer CTC lines Brx-142 (142), Brx-330 (330), Brx-390 (390), and BRX-401 (401), normalized to glyceraldehyde 3-phosphate dehydrogenase (GAPDH). The left and right autoradiographs depict western blots with different CDH11 monoclonal antibodies (3H10, left; and 23C6, right).
Figure 3:
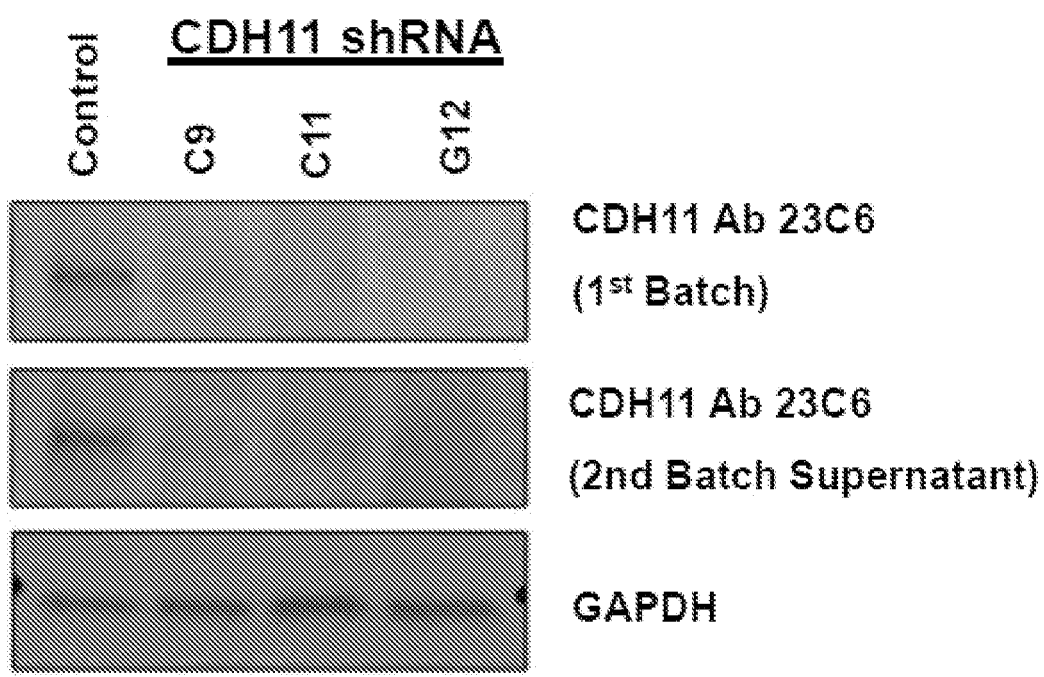
FIG. 3 is a western blot showing that a CDH11-targeted short hairpin RNA (shRNA) elicited CDH11 knockdown in the breast cancer cell line MDA-MB-231 (231), as measured using the 23C6 anti-CDH11 antibody and normalized to GAPDH. From left to right, the immunoblot lanes depict control shRNA or Cadherin 11 targeting shRNA C9, C11, or G12.

FIG. 1 is the RNA expression levels of cell adhesion molecules in the CTC lines Brx-82, Brx-142, Brx-394 AVG, Brx-189, Brx-390, Brx-121, Brx-292, Brx-319, Brx-250, Brx-140, or Brx-401 from breast cancer patients. The cell adhesion molecule CDH11 was expressed at the RNA level in multiple breast CTC cell lines (FIG. 1, black outline). Western blots showing the profile of CDH11 yielded similar results, with CDH11 yielding detectable protein expression with the anti-CDH11 monoclonal antibody clone 3H10 (3H10; FIG. 2, left panel) and clone 23C6 (23C6; FIG. 2, right panel) in the highly metastatic breast cancer cell line MDA-MB-231 (abbreviated interchangeably throughout as MDA-MB-231 or 231) and CTC lines Brx-142 (142), Brx-330 (330), Brx-390 (390), and Brx-401 (401). In a study to control for antibody specificity, we found that CDH11 protein detection with 23C6 was reduced when CDH11 was knocked down with short hairpin RNA (shRNA) in MDA-MB-231 cells (FIG. 3).

Figure 4:
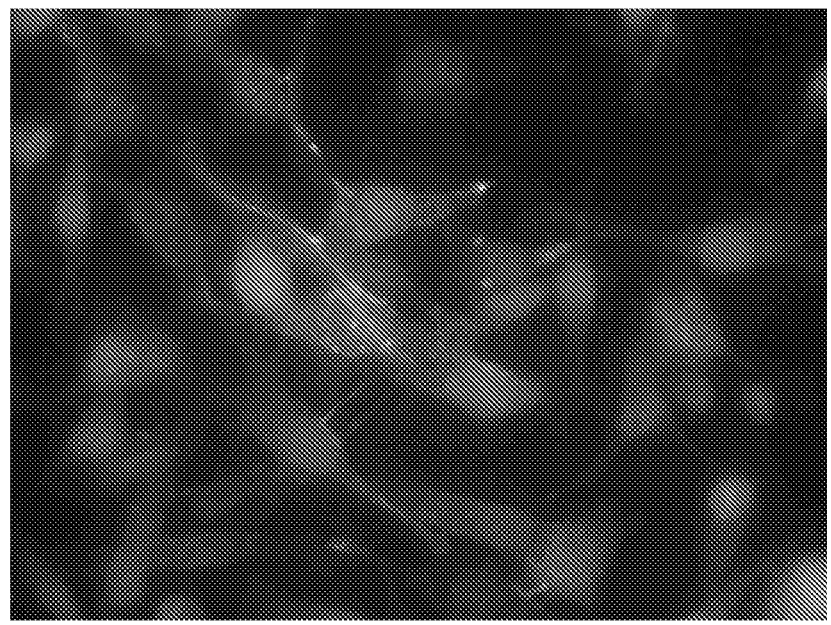
FIG. 4 is a photomicrograph showing immunofluorescent staining of the breast cancer cell line MDA-MB-231 (231) pre-treated in culture for approximately 18 hours with the 3H10 anti-CDH11 antibody.
Figure 5:
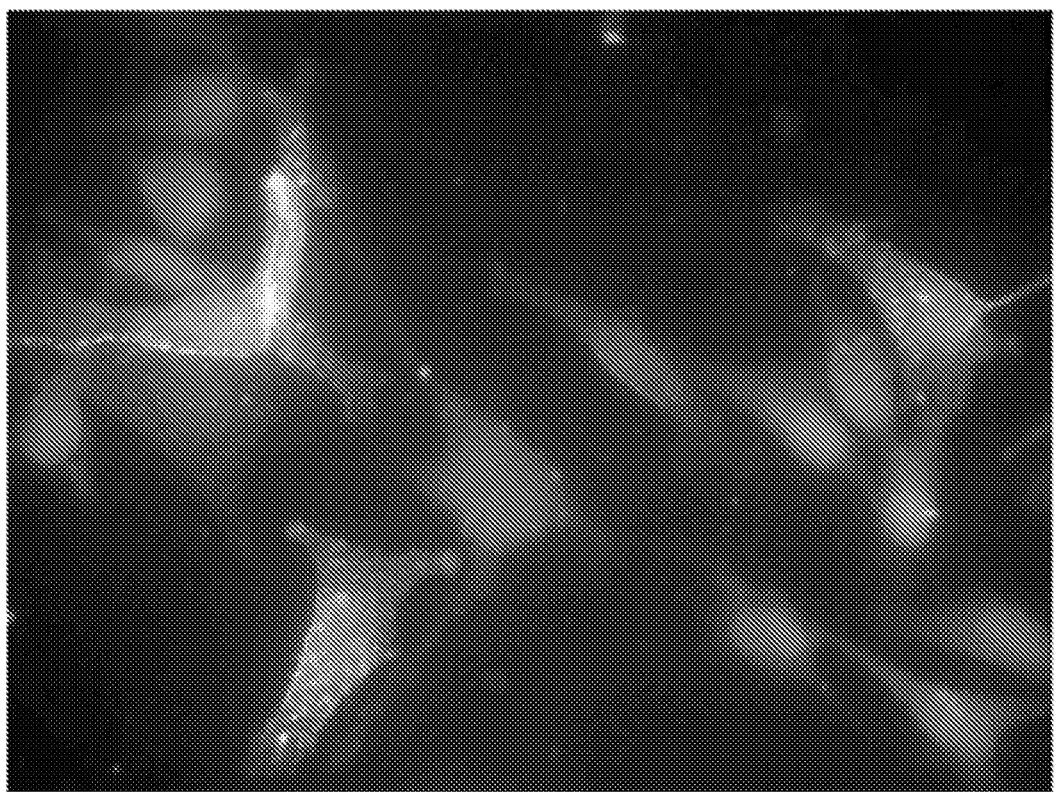
FIG. 5 is a photomicrograph showing immunofluorescent staining of the breast cancer cell line MDA-MB-231 (231) pre-treated in culture for approximately 18 hours with the 23C6 anti-CDH11 antibody.
Figure 7:
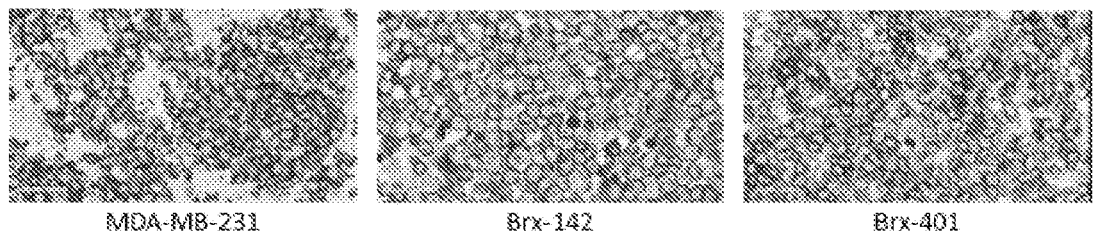
FIG. 7 are photomicrographs showing immunohistological staining of cell blocks derived from the breast cancer cell line MDA-MB-231 (231), the breast cancer CTC line Brx-142 (142), and the breast cancer CTC line Brx-401 (401), respectively, grown in culture and stained using the 23C6 anti-CDH11 antibody.
Figure 8:
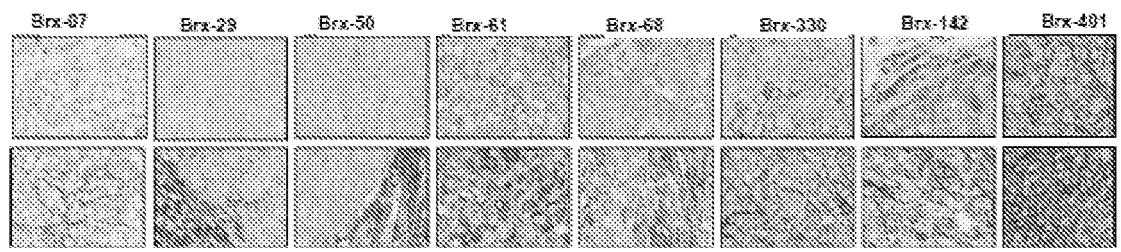
FIG. 8 are photomicrographs showing immunohistological staining of orthotopic xenograft tumors derived from the breast cancer CTC lines Brx-07, Brx-29, Brx-50, Brx-61, Brx-68, Brx-330, Brx-142, and Brx-401, respectively, grown in the mammary gland of NSG mice using the 23C6 anti-CDH11 antibody.

To characterize the localization of CDH11 in tumor cells, in a first experiment, MDA-MB-231 cells, cells were pre-treated in culture with 3H10 for approximately 18 hours. Immunofluorescence demonstrated that MDA-MB-231 cells exhibited heterogeneous punctate cell surface and cell-cell interface staining with the anti-CDH11 3H10 (FIG. 4) and 23C6 (FIG. 5) antibodies. In a second experiment, NSG mice were injected into the mammary gland with orthotopic xenograft tumors derived from the Brx-142 cell lines. Immunohistochemical staining of these orthotopic xenograft tumors with the anti-CDH11 23C6 (FIG. 6, left) and 3H10 (FIG. 6, right) antibodies demonstrated a difference in staining intensity, with 23C6 having membranous staining and a lack of staining with 3H10. These results indicate that 23C6 has a better binding affinity for CDH11 and serve as a better therapeutic antibody for the treatment of cancer. To further characterize the CDH11 expression pattern across cancer cell lines using the 23C6 antibody, MDA-MB-231, CTC Brx-142, or CTC Brx-401 cell lines were grown in culture and immunohistochemistry was performed. Across the three cell lines, immunohistochemical staining of cell blocks demonstrated cell membrane staining (FIG. 7), indicating that 23C6 can bind many types of CTC cell lines as well as the highly metastatic MDA-MB-231 cell line. To test the variability of CDH11 expression patterns in vivo across multiple models of primary breast cancer metastasis, NSG mice were injected into the mammary gland with orthotopic xenograft tumors derived from the CTC Brx-07, Brx-29, Brx-50, Brx-61, Brx-68, Brx-330, Brx-142, or Brx-401 lines, respectively. Immunohistochemical staining of these orthotopic xenograft tumors with the anti-CDH11 23C6 antibody demonstrated cell membrane staining across all cell lines (FIG. 8).

Figure 6:
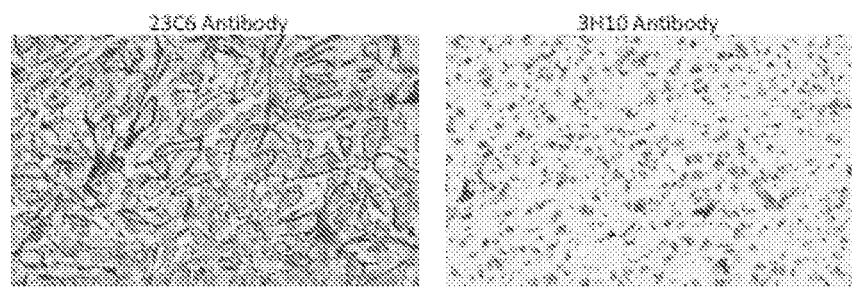
FIG. 6 are photomicrographs showing immunohistological staining of orthotopic xenograft tumors derived from cells of the breast cancer cell line MDA-MB-231 (231) grown in the mammary gland of immunocompromised NOD-severe combined immune deficiency interleukin 2 receptor subunit gamma$^{null}$ (NSG) mice. The left and right images depict immunohistochemistry staining performed with different CDH11 antibodies (23C6, left; and 3H10, right).
Figure 9:
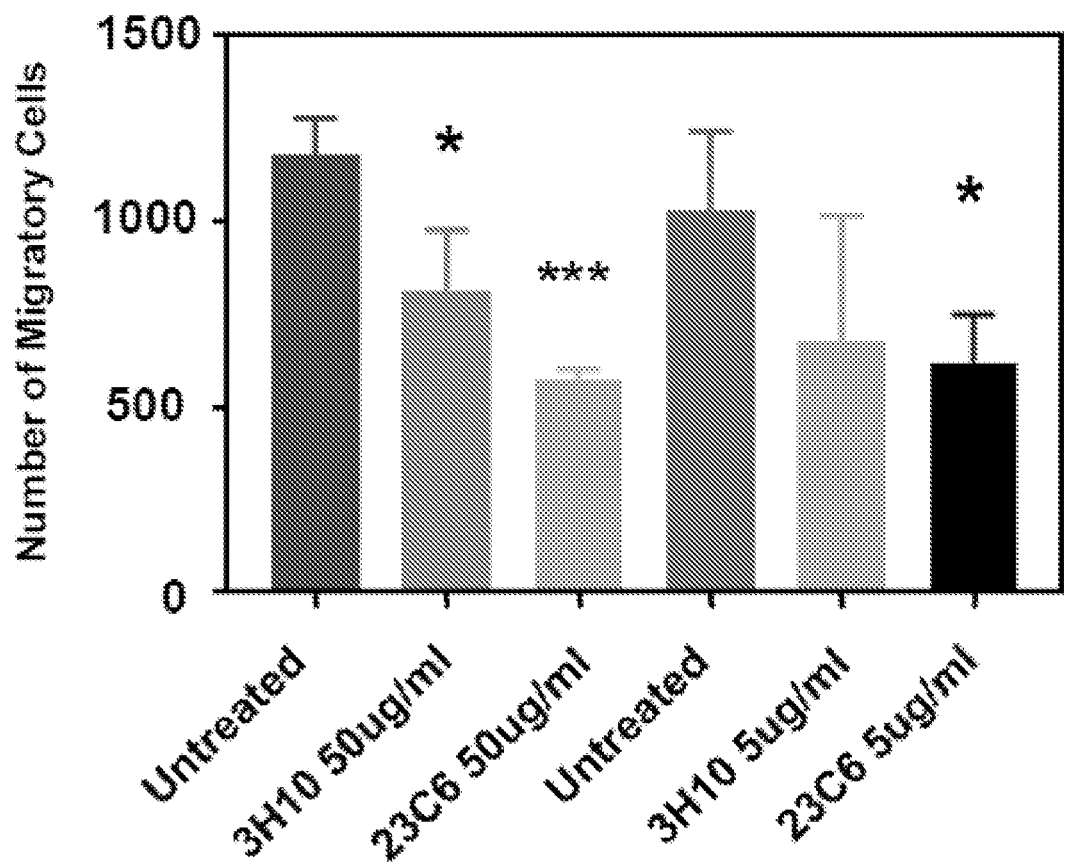
FIG. 9 is a bar graph showing trans-well migration of 15,000 cells from the breast cancer cell line MDA-MB-231 (231) plated for 20 hours with a serum gradient and treated with 50 μg/mL or 5 μg/mL of the 23C6 or 3H10 anti-CDH11 antibodies, respectively. The y-axis units indicate the number of 231 cells migrating in the trans-well migration assay. The x-axis labels indicate the treatment group. Error bars indicate standard error of the mean. * $p<0.05$, *** $p<0.001$.

To test the effects of 23C6 and 3H10 treatment on the migration capability of MDA-MB-231 cells in vitro, functional studies with a trans-well migration assay were performed. 15,000 MDA-MB-231 cells were plated on a trans-well insert containing an 8 µm pore for 20 hours with a serum gradient and with 5 µg/mL or 50 µg/mL of the 23C6 or 3H10 anti-CDH11 antibodies, respectively. Compared to the control, MDA-MB-231 cells treated with 5 µg/mL or 50 µg/mL of 23C6 or with 50 µg/mL of 3H10 had a significant increase in cell motility in the trans-well migration assay in the presence of serum containing media as a chemoattractant (FIG. 9). Notably, 23C6 was more potent than 3H10, consistent with the observed differences in immunohistochemical and immunofluorescent staining between the two antibodies (FIG. 6).

Figure 10:
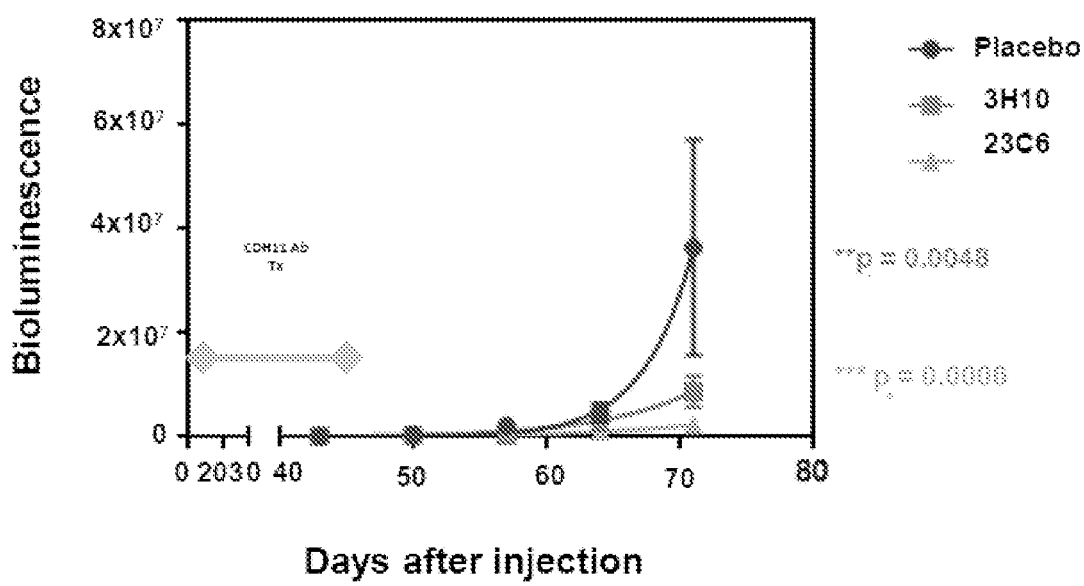
FIG. 10 shows a series of graphs depicting post-resection bioluminescence (y-axis) of images of the lungs of NSG mice in the supine position that were injected into the mammary gland with orthotopic xenograft tumors derived from the breast cancer cell line MDA-MB-231 (231) tagged with green florescent protein (GFP)-luciferase and treated with placebo or the 3H10 or 23C6 anti-CDH11 antibodies (CDH11 Ab Tx; 0.2 mg/week), respectively. The x-axis units indicate time (days after injection). Error bars indicate standard error of the mean.  $p=0.0048$ (3H10 condition), * $p=0.0006$ (23C6 condition), as compared to placebo. The upper and lower panels show bioluminescence of the tumors over time with different temporal granularity.
Figure 10:
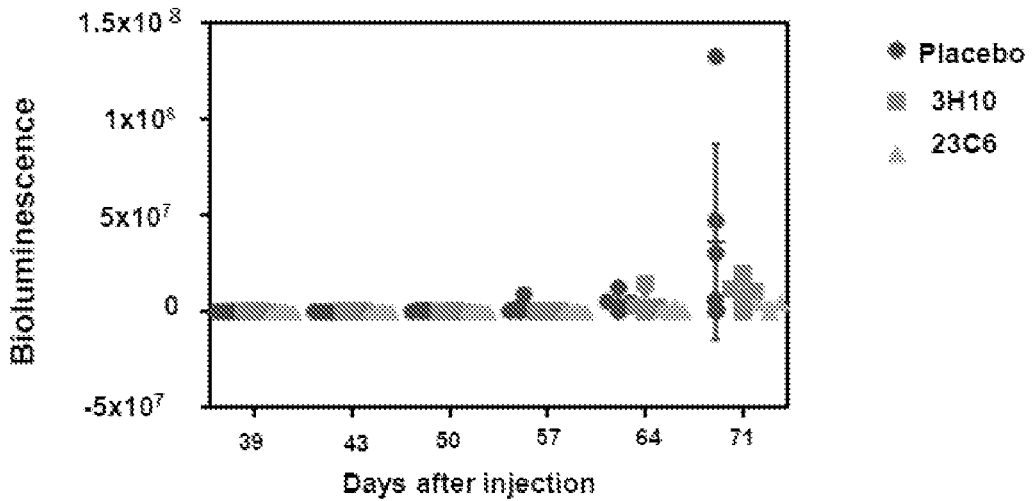
Figure 11:
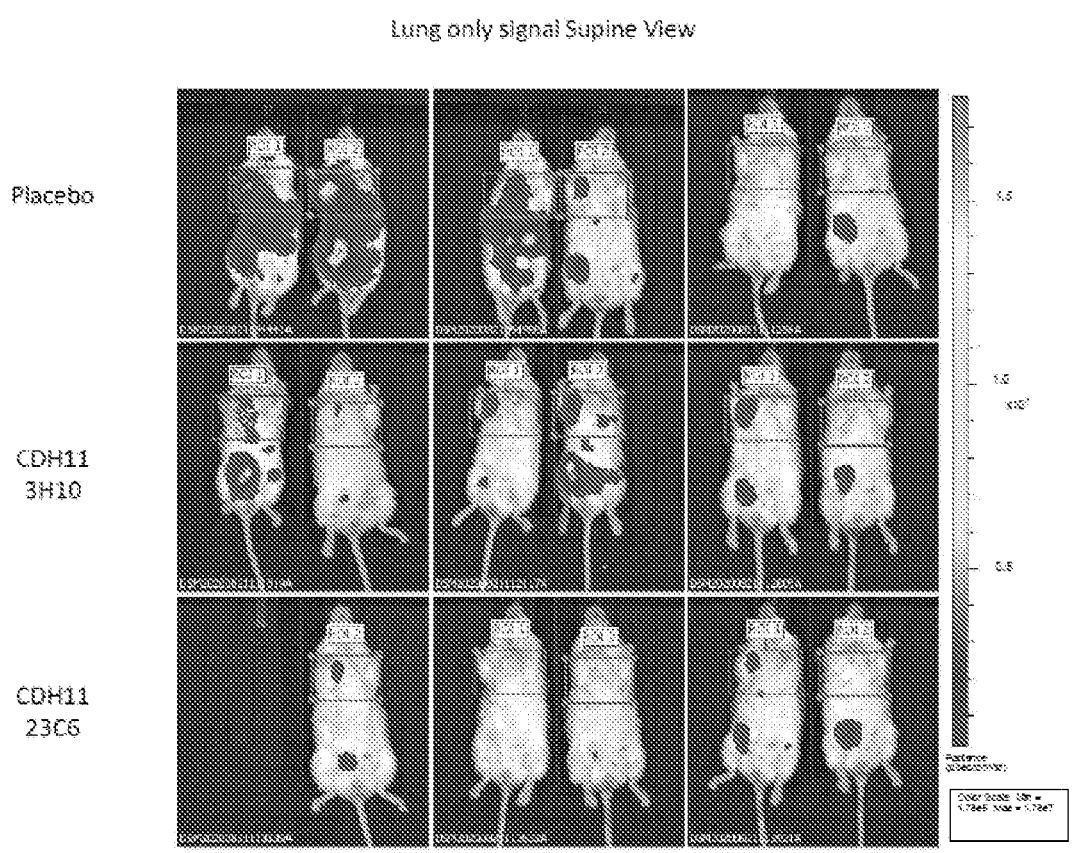
FIG. 11 shows photographs of NSG mice, as described in FIG. 10, at day 71. Boxes, ROI 1 and ROI 2, indicate the regions of interest (ROI) for the measurement of bioluminescence, as described in FIG. 10, while shading intensity indicates bioluminescence signal per section/cm$^2$.
Figure 12:
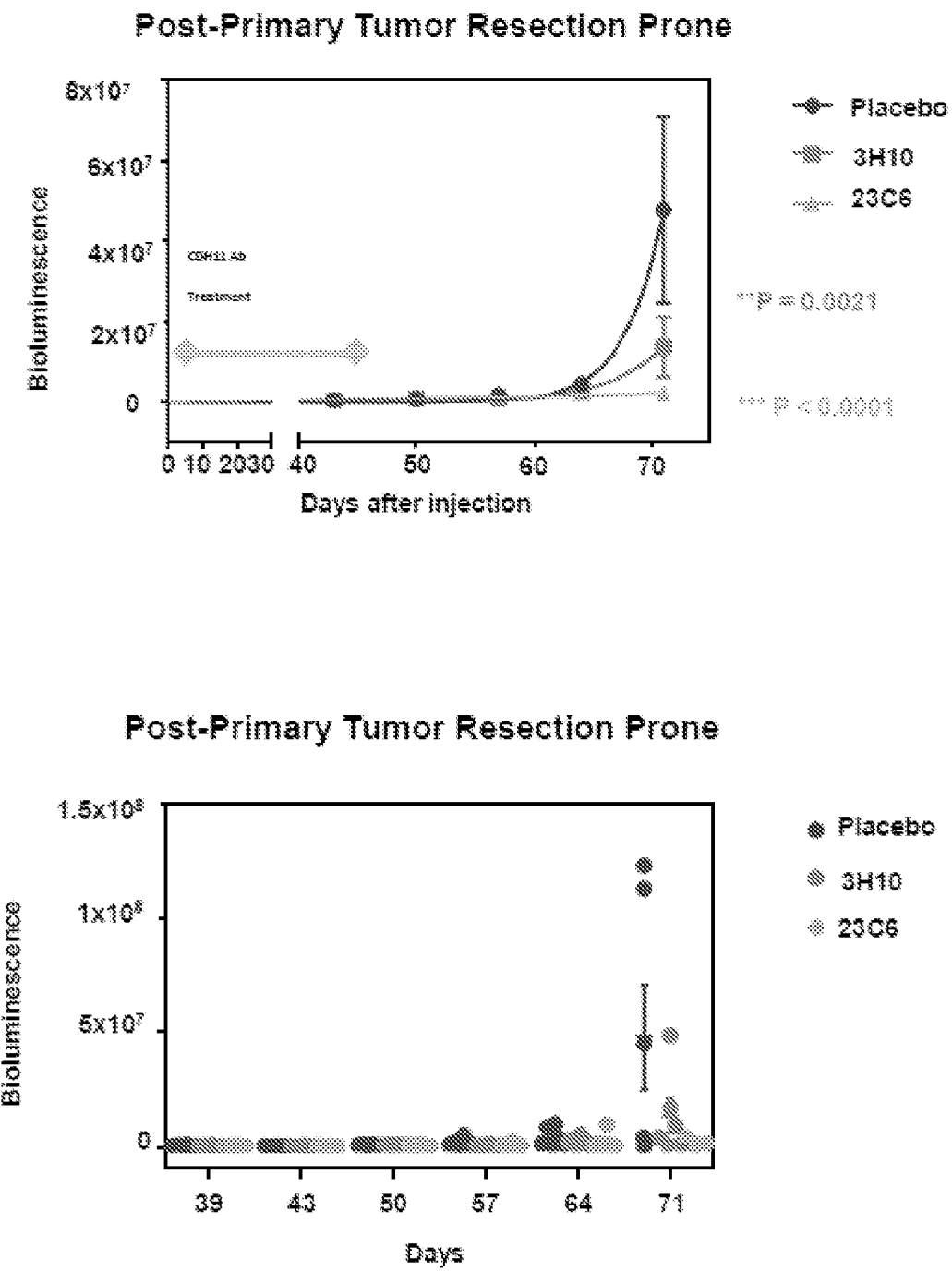
FIG. 12 shows graphs depicting the dataset, as described in FIG. 10, but with bioluminescence (y-axis) quantified from images taken of NSG mice from the prone view and ROIs defined for the total body of each mouse. The x-axis units indicate time (days after injection). Error bars indicate standard error of the mean.  $p=0.0021$ (3H10 condition), * $p=0.0001$ (23C6 condition), as compared to Placebo. The left and right graphs show bioluminescence of the tumors over time with different temporal granularity.
Figure 13:
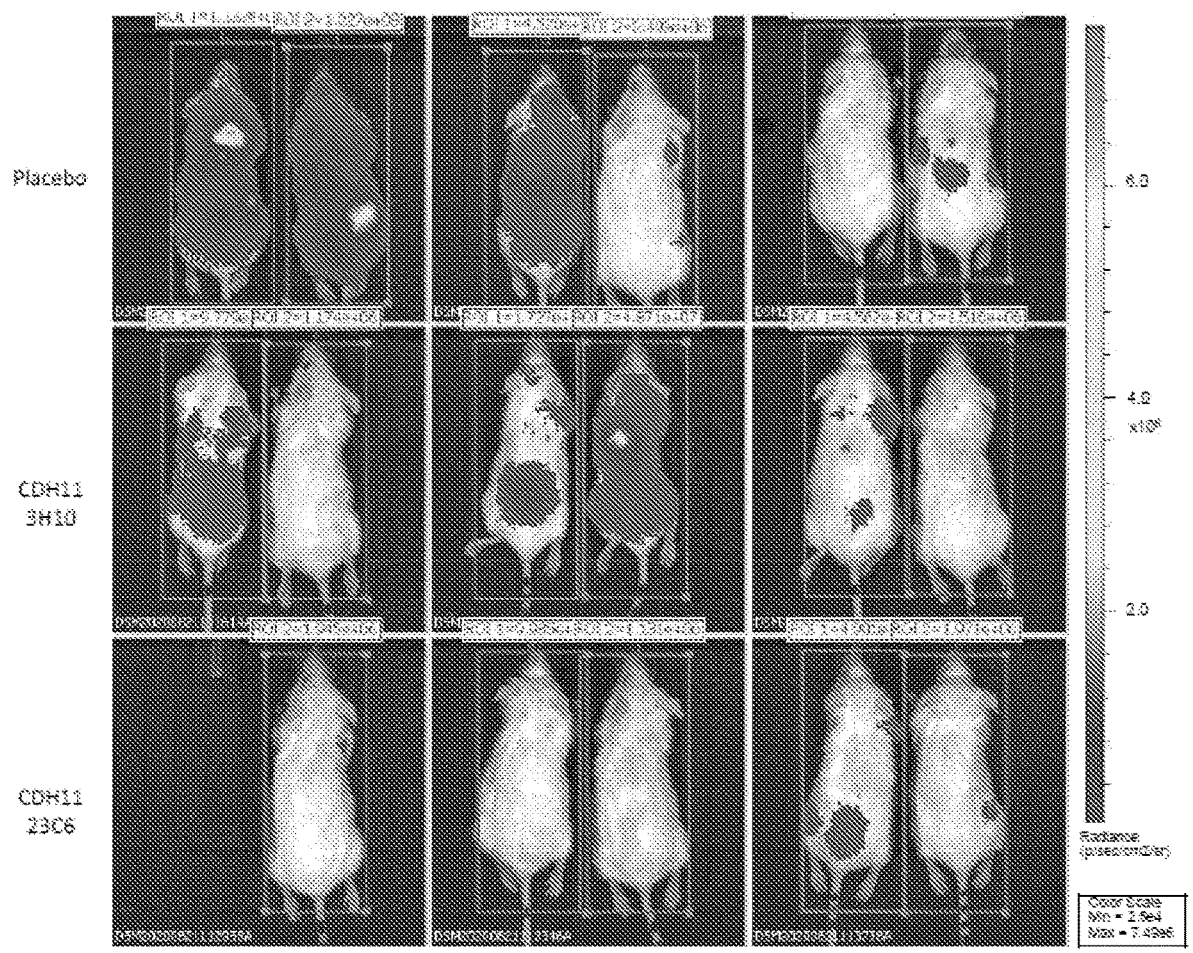
FIG. 13 shows NSG mice as described in FIG. 11 but with ROIs defined for the total body of each mouse. Shading intensity indicates bioluminescence signal per section/cm$^2$.
Figure 14:
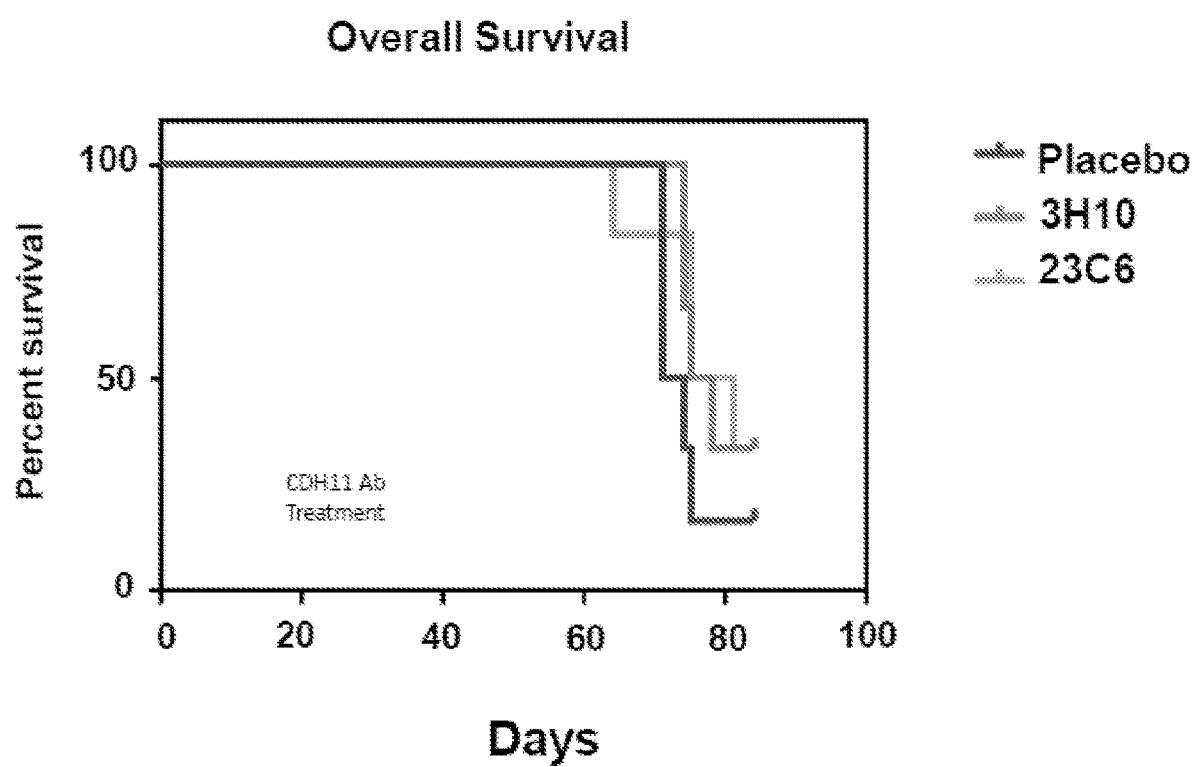
FIG. 14 is a graph showing the percent of surviving NSG mice (x-axis) over time (y-axis) from the experiment described in FIG. 10.

To identify whether 23C6 or 3H10 anti-CDH11 antibody treatment affects metastatic burden in an in vivo mouse model of primary breast cancer, further functional studies were conducted. MDA-MB-231 cells tagged with GFP-Luciferase were injected orthotopically into the mammary gland of NSG mice that were treated with placebo, 23C6, or 3H10 (0.2 mg/week) for 5.5 weeks. After resecting the primary tumor, mice continued to receive treatment with the placebo, 23C6, or 3H10 (0.2 mg/week) for 1-week post-resection. Following intraperitoneal injection of D-luciferin, MDA-MB-231 metastatic growth was measured. In images of NSG mice taken from the supine view with regions of interest (ROI) defined for the lungs, at day 71, both the 23C6 antibody- and 3H10 antibody-treated mice exhibited a significant decrease in metastatic burden, as measured by bioluminescence (FIGS. 10 and 11) These results demonstrate that the CDH11 antibodies decrease metastatic burden in a mouse model of primary breast cancer metastasis. When the same mice were analyzed but with total body luminescence measured in the prone view, a similar pattern of results was observed, whereby treatment with CDH11 antibody decreased metastatic burden (FIGS. 12 and 13). When the survival of mice from this experiment was measured over time, mice treated with the 23C6 or the 3H10 anti-CDH11 antibody exhibited a greater likelihood to survive, as expressed as a percent compared to placebo controls (FIG. 14).

Figure 15:
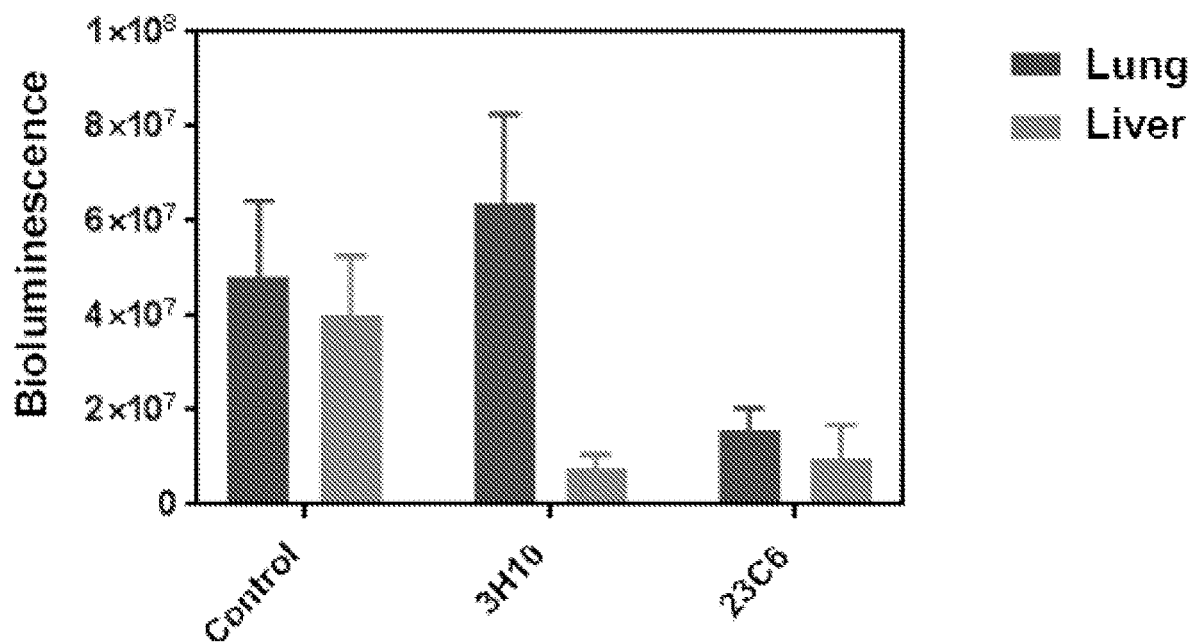
FIG. 15 is a graph showing the bioluminescence (y-axis) of resected ex vivo lungs and liver with orthotopic xenograft tumors derived from the breast cancer cell line MDA-MB-231 (231) tagged with GFP-luciferase that were injected into the organs of NSG mice treated with placebo (Control) or the 3H10 or 23C6 anti-CDH11 antibody (0.2 mg/week), respectively. The x-axis labels indicate the treatment group. Error bars indicate standard error of the mean.

Using similar approaches and the same mice for ex vivo analyses, when organs were explanted and the lungs and liver were imaged for metastatic burden, both the 23C6 antibody- and 3H10 antibody-treated mice exhibited a decrease metastatic burden in the liver, and 23C6 antibody-treated mice additionally exhibited a suppression of lung metastases, as compared to placebo controls (FIG. 15). Together, these studies provide evidence that the 23C6 anti-CDH11 antibody and the 3H10 anti-CDH11 antibody both suppress metastatic dissemination in breast cancer in vivo models. These results also support the relatively higher efficacy of 23C6, as compared to 3H10.

Example 3. Pancreatic Cancer Anti-CDH11 Antibody Therapy

This Example describes the development of an anti-CDH11 antibody for the treatment of pancreatic cancer, for example, by identifying the expression of CDH11 in multiple PDAC lines from patients with pancreatic ductal adenocarcinoma and testing an anti-CDH11 monoclonal antibody clone, 23C6, for the reduction of metastatic burden in a mouse model of primary pancreatic cancer metastasis.

Materials and Methods

Materials and Methods are described in Example 1.
Results

Figure 16:
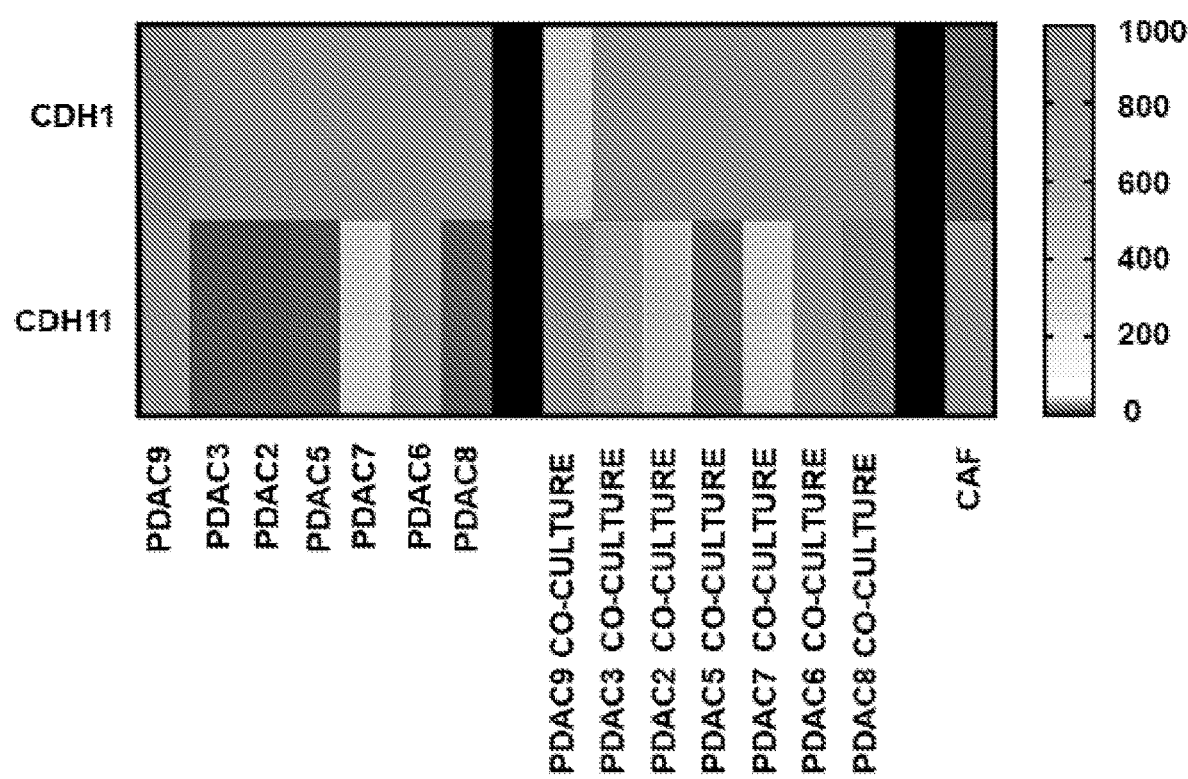
FIG. 16 is a graph showing the RNA expression levels of Cadherin 1 (CDH1) or CDH11 (y-axis), respectively, in pancreatic ductal adenocarcinoma (PDAC) cell lines (PDAC9, PDAC3, PDAC2, PDAC5, PDAC7, PDAC6, and PDAC8), co-cultured PDAC and cancer associated fibroblast (CAF) cell lines (PDAC9 CO-CULTURE, PDAC3 CO-CULTURE, PDAC2 CO-CULTURE, PDAC5 CO-CULTURE, PDAC7 CO-CULTURE, PDAC6 CO-CULTURE, and PDAC8 CO-CULTURE), and CAF cells, respectively, as shown in transcript reads per million. The x-axis labels indicate the respective cell line.

FIG. 16 is the RNA expression levels of cell adhesion molecules CDH11 and Cadherin 1 (CDH1) in patient derived PDAC lines (PDAC9, PDAC3, PDAC2, PDAC5, PDAC7, PDAC6, and PDC8), co-cultured PDAC and CAF cell lines (PDAC9 CO-CULTURE, PDAC3 CO-CULTURE, PDAC2 CO-CULTURE, PDAC5 CO-CULTURE, PDAC7 CO-CULTURE, PDAC6 CO-CULTURE, and PDAC8 CO-CULTURE), and CAF cells from breast cancer patients. The cell adhesion molecule CDH11 was highly expressed at the RNA level in multiple PDAC cell lines, including PDAC9, PDAC7, and PDAC6. In co-cultured groups, we observed that CDH11 expression was induced in PDAC3, PDAC2, PDAC5, and PDAC8. CDH11 was also highly expressed in the CAF cell line, indicating that an anti-CDH11 therapy could disrupt CAF function and have additional effects on the tumor microenvironment. CDH1 RNA was expressed across all cell lines, excluding CAF.

Figure 17:
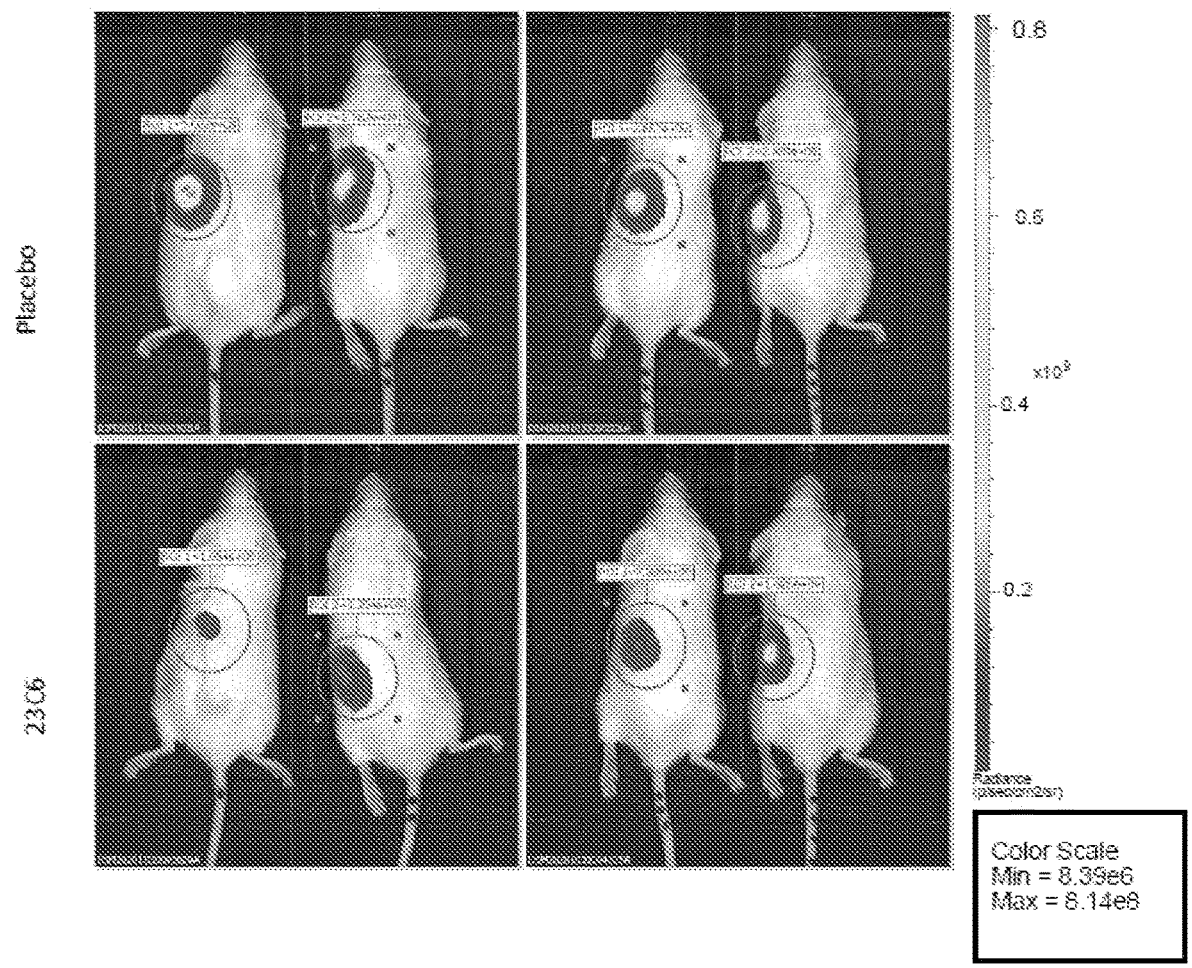
FIG. 17 shows NSG mice in the prone position following the subcutaneous injection of xenograft tumors derived from PDAC9 cells tagged with GFP-luciferase and treatment with placebo or the 23C6 anti-CDH11 antibody (0.2 mg/week), respectively. Shading intensity indicates bioluminescence signal per section/cm$^2$.
Figure 18:
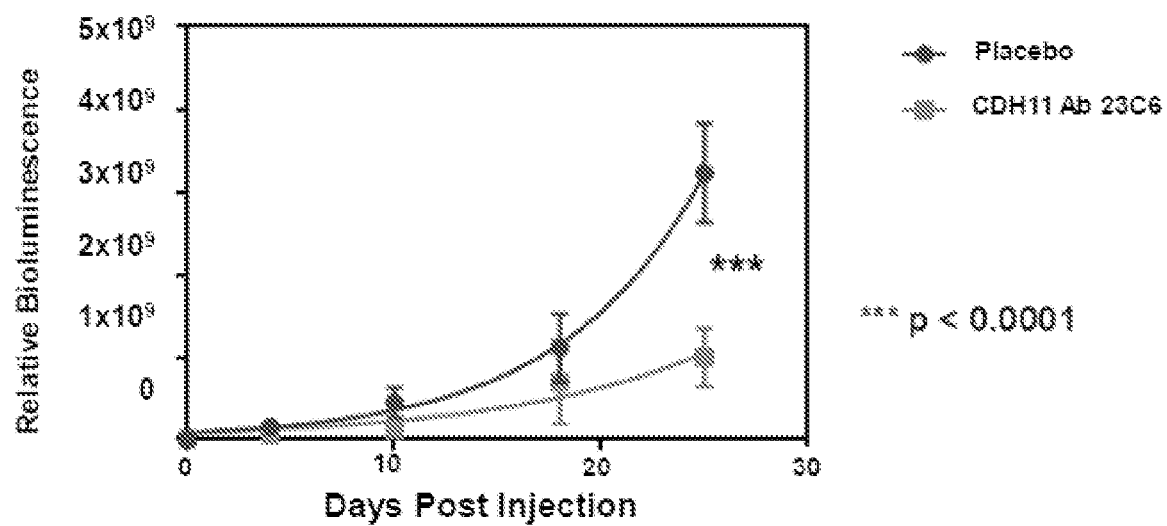
FIG. 18 is a graph showing the bioluminescence (y-axis) of images of NSG mice in the prone position that were injected subcutaneously with xenograft tumors derived from PDAC9 cells tagged with GFP-luciferase and treated with placebo or the 23C6 anti-CDH11 antibody (CDH11 Ab Tx), respectively, as described in FIG. 17. The x-axis units indicate time (days post injection). Error bars indicate standard error of the mean. *** $p<0.0001$.
Figure 19:
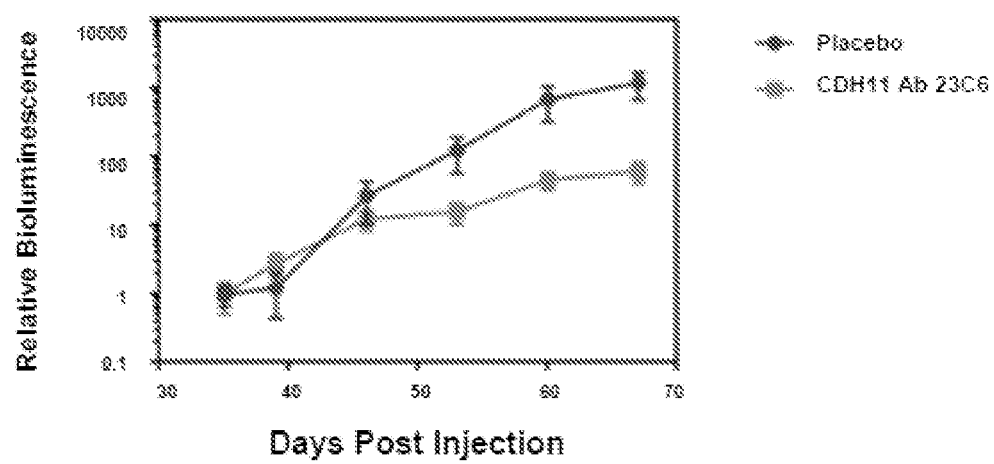
FIG. 19 is a graph showing the post-resection relative bioluminescence (y-axis) of images of NSG mice in the prone position that were injected subcutaneously with xenograft tumors derived from PDAC9 cells tagged with GFP-luciferase and treated with placebo or the 23C6 anti-CDH11 antibody (0.2 mg/week; CDH11 Ab 23C6), respectively, as described in FIG. 17. The x-axis units indicate time (days post injection). Error bars indicate standard error of the mean.

Based upon the observation that PDAC9 had the highest CDH11 expression (FIG. 16), PDAC9 was used in subsequent functional studies to test the effects of 23C6 anti-CDH11 antibody treatment on metastatic burden in an in vivo mouse model of primary pancreatic cancer. PDAC9 cells tagged with GFP-luciferase were injected subcutaneously into NSG mice that were treated with placebo or the 23C6 anti-CDH11 antibody (0.2 mg/week). Following intraperitoneal injection of D-luciferin, PDAC9 metastatic growth was measured. In images of NSG mice taken from the prone view, by day 25, 23C6 antibody-treated mice exhibited a significant decrease in primary tumor growth compared to placebo controls (FIGS. 17 and 18) as well as a reduced metastatic burden, as determined by total body luminescence after resection of the primary tumor in the live animals over time (FIG. 19).

Figure 20:
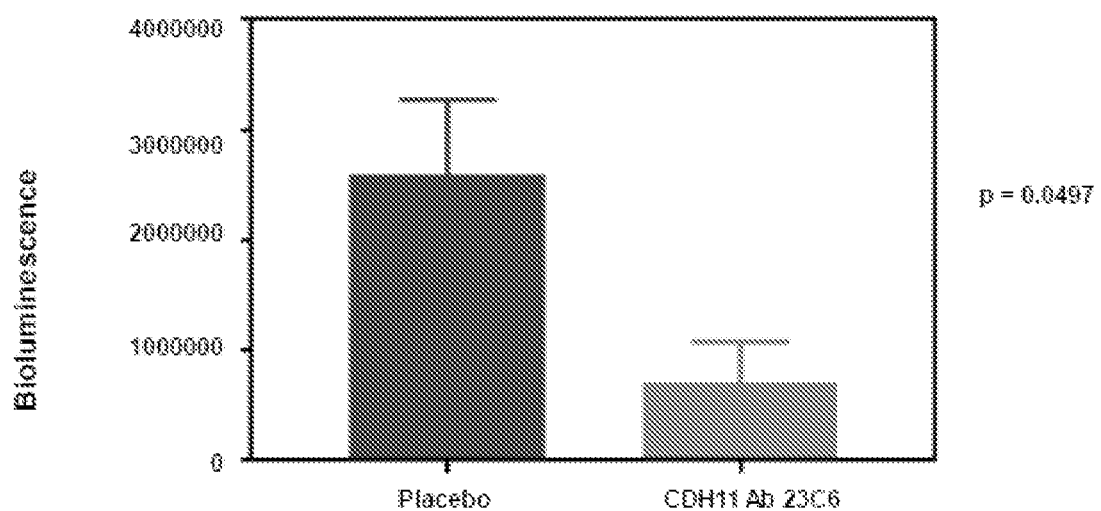
FIG. 20 is a graph showing the bioluminescence (y-axis) of ex vivo lungs taken from NSG mice that were injected subcutaneously with xenograft tumors derived from PDAC9 cells tagged with GFP-luciferase and treated with placebo (Control) or the 23C6 anti-CDH11 antibody (0.2 mg/week), respectively, as described in FIG. 17. The x-axis labels indicate the treatment group. Error bars indicate standard error of the mean.

Using similar approaches and the same mice for ex vivo analyses, when organs were explanted and the lungs were imaged for metastatic burden, 23C6 antibody-treated mice demonstrated a significant reduction of metastases, as compared to placebo controls (FIG. 20). Together, these findings provide evidence that the 23C6 anti-CDH11 antibody acts upon PDAC primary tumors and suppresses metastatic capability in pancreatic cancer in vivo models.

Example 4: Anti-CDH11 Antibody SN38 Conjugation

SN38 Preparation

To prepare SN38 for conjugation to a 23C6 anti-CDH11 antibody (23C6), a centrifuge tube containing O-succinyl SN38 NHS ester (SN38) was warmed from storage at −20° C. to room temperature (RT) and briefly spun down.

23C6 Preparation

To prepare the 23C6 for conjugation, 455 µL of the 23C6 antibody was added to each of the two Filter Devices and capped. The total volume was adjusted to 500 µL in each device for the last refill, such that 1 mg of 23C6 was used. Following, the filter device containing 23C6 was spun at 14,000×g for 8 minutes at ° C. to concentrate to <100 µL. The filtrate from the collection tube was transferred to a clean tube. 400-450 µL of Buffer A (CellMosaic) was added to the collection tube, for a total volume of 500 µL and spun at 14,000×g for a concentration of <100 µL. The filtrate from the collection tube was transferred to a second clean tube. Two more times, 400-450 µL of Buffer A (CellMosaic) was added to the collection tube, for a total volume of 500 µL and spun at 14,000×g for a concentration of <100 µL. Each time, the filtrate from the collection tube was transferred to said second clean tube. Next, the concentrated sample from the filter device was transferred to a 1.5 mL micro-centrifuge tube, and 50-100 µL of Buffer A (CellMosaic) was added to rinse. The entirety of the contents from the filter device were transferred to said 1.5 mL micro-centrifuge tube. Again, 50-100 µL of Buffer A (CellMosaic) was added to rinse the filter device, and the entirety of the contents were transferred to said 1.5 mL micro-centrifuge tube. Buffer A (CellMosaic) was added to the 1.5 mL micro-centrifuge tube to make up the total volume of the sample to 206±5 µL. The antibody sample was vortexed for 30 seconds and then briefly spun down.

SN38 Labeling

To prepare SN38 for labeling, 44 µL of CM01006 (CellMosaic) was added to the SN38 tube, as described in the final step of the SN38 Preparation. Said SN38-containing tube was vortexed for 30-60 seconds and spun down. Following, the entire SN38 solution was transferred to the micro-centrifuge tube containing the antibody solution, as described in the final step of the 23C6 Preparation. Following swirling, the tube was mixed at 25° C. or RT for 4 h or overnight.

Purification of Conjugate

In a chemical hood, 5 mL of PBS was added to a desalting column (CellMosaic), and the buffer was allowed to completely enter the gel bed by gravity flow. Twice more, 5 mL of PBS was added to a desalting column (CellMosaic) and allowed to completely enter the gel bed. The 2N38-labelled 23C6, as described in the final step of SN38 Labeling, was added to the column as well as 250 µL of PBS buffer. A 2.0 mL centrifuge tube was placed under the column, and 1.25 mL of PBS buffer was added to the column. The eluent (e.g., SN38-labelled 23C6) was collected and stored at 4° C. For longer term storage, Stabilization PBS buffer (5×)(CellMosaic) was added. For example, when the total volume of 2N38-labelled 23C6 was 1.25 mL, 312.5 µL of Stabilization PBS buffer was added, and the solution was stored at <−20° C.

To determine the concentration of the 2N38-labelled 23C6, DAR by UV/Vis spectrophotometry was performed.

Figure 21:
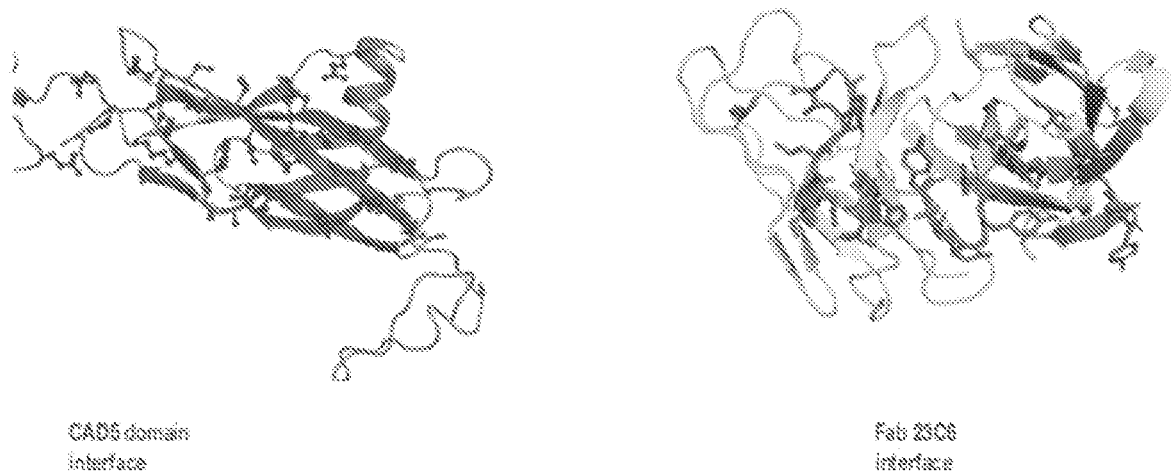
FIG. 21 shows a structure of the 23C6:CDH11 complex as shown in a ribbon diagram. Contact residues are shown in darkest gray.

Example 5: Identification of Residues or Regions of 23C6 Targeted for Mutagenesis as Determined by the Crystal Structure of the 23C6:CDH11 Complex Methods A predicted structure of 23C6 is shown in FIG. 21. The 23C6 amino acid sequence was modeled using I-TASSER multiple template threading methodology e.g., see Roy et al., I-TASSER: a unified platform for automated protein structure and function prediction. *Nature Protocols*. 2010. 5:4; 725-73; Roy et al., COFACTOR: An accurate comparative algorithm for structure-based protein function annotation. *Nucleic Acids Research*. 2012. 40: W471-W477; Pei et al., PROMALS3D: a tool for multiple protein sequence and structure alignments. *Nucleic Acids Research*. 2008. 36:7, 2295-300 incorporated herein by reference in the NovaFold application software (DNASTAR Inc., Madison, WI). New York, NY.

The protein-protein docking application uses an algorithm based upon SwarmDock, which makes docking predictions based on the particle swarm optimization algorithm. Binding interactions are predicted between two protein-protein binding partners (e.g., 23C6 and CDH11). Each binding partner can consist of one or multiple protein chains. The application requires a complete protein structure that uses only standard residues and has no missing residues and atoms.

During modeling, NovaFold Antibody searched the 23C6 input sequence against thousands of non-redundant protein antibody structures from PDB and found the best template match for the chain or complex. Particular consideration was given to the complementary determining region (CDR) loops. NovaFold Antibody limits CDR-H3 loop modeling to fifteen or fewer residues. Lastly, an energy minimization calculation was performed to construct the final predicted structure model for the 23C6 antibody chain or complex.

Results

Figure 22:
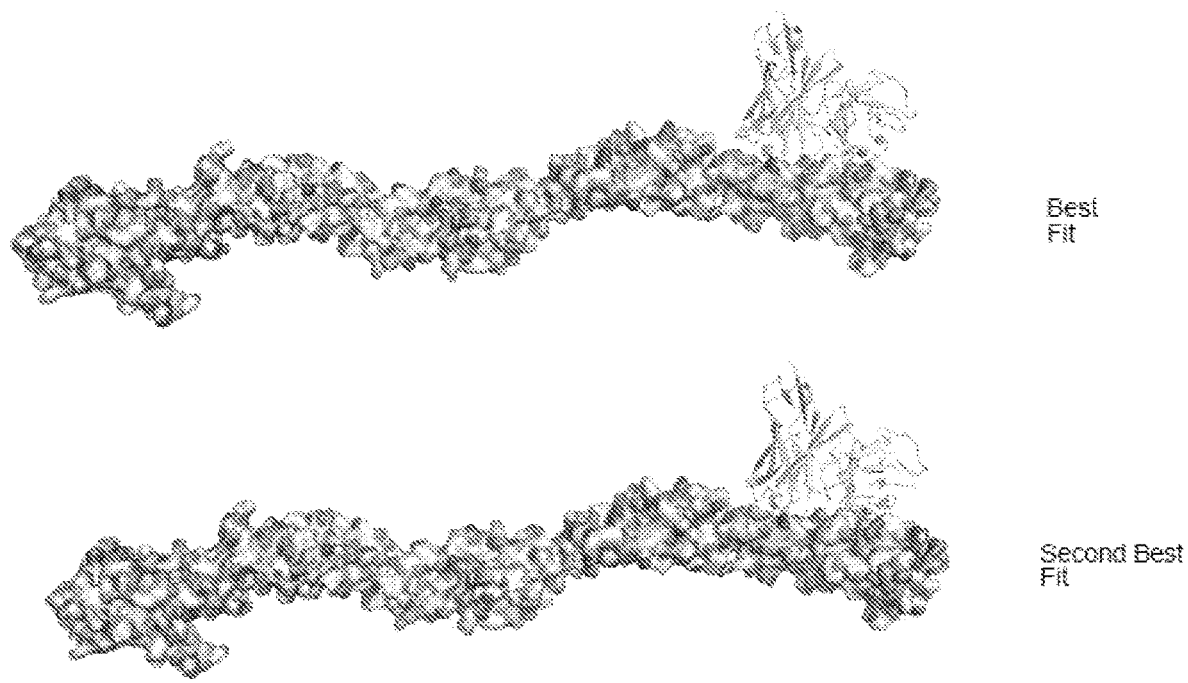
FIGS. 22-23 are schematics showing the crystal structure of the 23C6 Fab bound to mouse CDH11 from different views, identifying certain key contact residues of 23C6 (paratope residues) and CDH11 (epitope residues) ordered from "best fit" to "fourth best solution."
Figure 23:
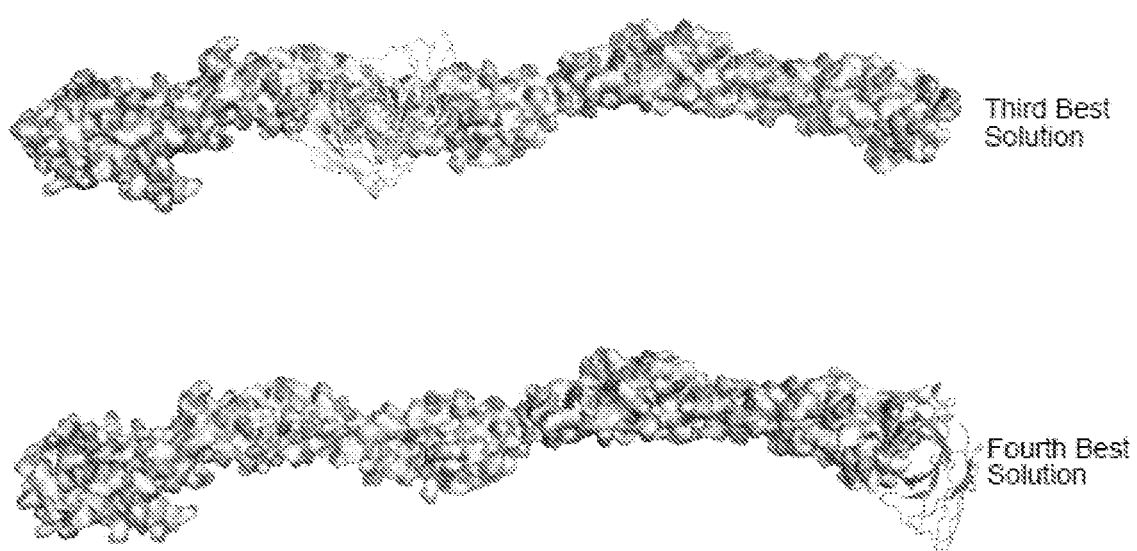
Figure 24:
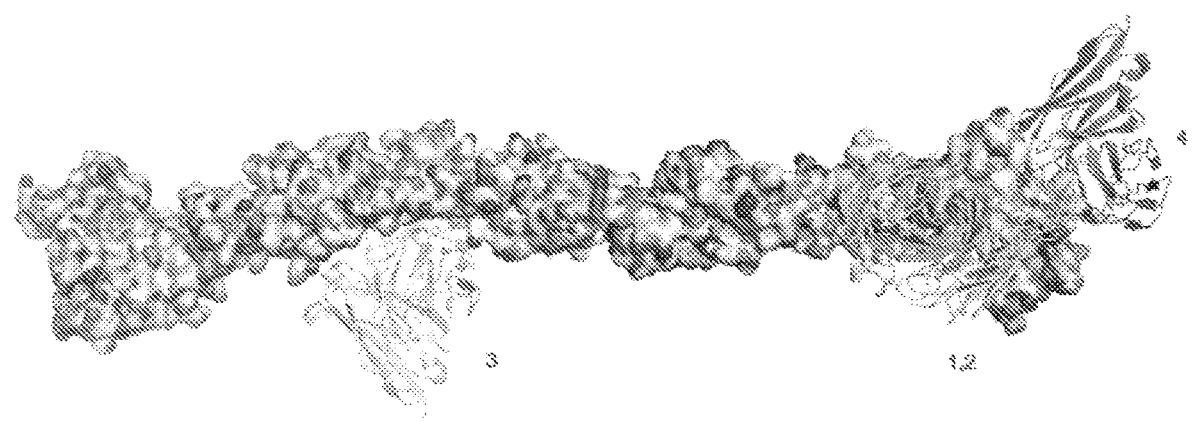
FIG. 24 is a schematic of the crystal structure of a 23C6 Fab bound to mouse CDH11 comparing the four potential binding sites of the 23C6 Fab.

Two models were produced that were of the same 7-member cluster. We observed that these top two models are almost identical binding on the same epitope of the N-terminal IgG domain (CAD5 domain) (FIG. 22; best fit and second-best fit). The model with the most stable energy was chosen as the best prediction (FIG. 22; best fit). The other viable solutions have the 23C6 Fab on a different IgG domain or N-terminal domain in a different orientation (FIG. 23; third best solution and fourth best solution). For comparison, the top four predicted structure models were plotted on the same CDH11 molecule (FIG. 24). The same analysis was performed on the C-terminal IgG domain (CAD1 domain).

The identified CAD5 and CAD1 23C6 F(ab) contact residues are listed in Table 4 and Table 5, respectively, below:

TABLE 4

CAD5 Domain Contact Residues

| 23C6 F(ab) Contact Residue | CDH11 Contact Residue |
|---|---|
| Heavy Chain Contacts | |
| Gly 26 | Thr 585 |
| Tyr 27 | Ser 583 |
| Ser 28 | Ala 485, Asn 484, Met 582, Ser 583, and Ser 584 |
| Thr 30 | Ala 485, Asn 484, Asp 483, Lys 487, and Met 582 |
| Asp 31 | Ala 485, Lys 487, Pro 486, and Ser 584 |
| Tyr 32 | Ser 584 and Thr 585 |
| Asn 54 | Asn 484, Glu 449, and Lys 487 |
| Tyr 55 | Glu 449 |
| Arg 98 | Thr 585 |
| Tyr 100 | Asn 586, Lys 487, Phe 488, Pro 486, Ser 584, and Thr 585 |
| Tyr 101 | Lys 487 and Phe 488 |
| Gly 102 | Ala 489, Ala 490, Phe 488, and Pro 491 |
| Ser 103 | Ala 489, Ala 490, Asn 586, Phe 488, and Pro 491 |
| Arg 104 | Pro 491 |
| Tyr 105 | Asn 586, Pro 491, Thr 585, and Thr 587 |
| Light Chain Contacts | |
| Tyr 50 | Leu 588, Pro 491, Thr 587, Thr 589, and Tyr 492 |
| Ser 51 | Pro 491 |
| Ser 53 | Glu 493 and Lys 591 |
| Asn 54 | Glu 493, Lys 591, and Thr 589 |
| Leu 55 | Leu 567, Leu 569, Thr 587, and Thr 589 |
| Ala 56 | Leu 569 and Thr 587 |
| Ser 57 | Glu 534, Leu 569, Leu 570, Leu 588, Pro 571, and Thr 587 |

TABLE 4-continued

CAD5 Domain Contact Residues

| 23C6 F(ab) Contact Residue | CDH11 Contact Residue |
|---|---|
| Gly 58 | Leu 569 |
| Val 59 | Leu 569 |
| Ala 61 | Leu 567 |

TABLE 5

CAD1 Domain Contact Residues

| 23C6 F(ab) Contact Residue | CDH11 Contact Residue |
|---|---|
| Heavy Chain Contacts | |
| Phe 2 | Glu 40 and Lys 41 |
| Tyr 27 | Glu 40 and Lys 43 |
| Asp 31 | Lys 43 |
| Asn 54 | Leu 139 |
| Tyr 55 | Glu 140, Leu 139 and Pro 138 |
| Thr 57 | Asn 87 |
| Arg 98 | Glu 40 |
| Tyr 100 | Glu 40, His 19, His 39, and Lys 43 |
| Gly 102 | Arg 32 and His 21 |
| Ser 103 | Arg 32, Gly 37, and His 19 |
| Arg 104 | Arg 32, Asp 82, Ile 81, Leu 31, Phe 35, and Ser 83 |
| Tyr 105 | Glu 40, Gly 37, His 38, His 39, and Lys 41 |
| Asp 107 | Glu 40, His 38, and Lys 41 |
| Light Chain Contacts | |
| Ser 30 | Arg 27, Arg 28, Gly 29, and His 30 |
| Ser 31 | Gly 29 and His 30 |
| Ser 32 | Gly 29, His 30, and Leu 31 |
| Tyr 33 | Arg 27, Arg 28, Asp 82, Leu 31, and Ser 79 |
| His 35 | Leu 31 |
| Tyr 50 | Gly 37, His 36, His 38, and Phe 35 |
| Ser 51 | Arg 32, His 30, Leu 31, and Phe 35 |
| Asn 54 | Phe 35 and Ser 34 |
| Leu 55 | His 38 |
| Ala 56 | His 38 |
| Ser 57 | His 38 and Lys 41 |
| Gly 58 | Lys 41 |
| Tyr 92 | Asp 82 |
| His 93 | Arg 28 |

In certain embodiments, a CDH11 antibody variant is designed to have one or more amino acid substitutions at a F(ab) contact residue, as described herein, and/or a neighboring residue thereof.

Example 6: Targeting Breast and Pancreatic Cancer Metastasis Using a Dual-Cadherin Antibody Below the antibody (2306) against cadherin proteins is described as effectively suppressing blood-borne metastasis in mouse isogenic and xenograft models of triple negative breast and pancreatic cancers. The 23C6 antibody is in that it recognizes both the epithelial E-cadherin (CDH1) and mesenchymal OB-cadherin (CDH11), thus overcoming considerable heterogeneity across tumor cells. Despite its efficacy against single cells in circulation, the antibody does not suppress primary tumor formation, nor does it elicit detectable toxicity in normal epithelial organs, where cadherins may be engaged within intercellular junctions and hence inaccessible for antibody binding. Antibody-mediated suppression of metastasis is comparable in matched immunocompetent and immunodeficient mouse models. These studies indicate that antibody targeting CTCs within the vasculature suppresses blood-borne metastasis.

Results
Heterogeneity of Cadherin Expression and Binding by Antibody 23C6

Figure 25:
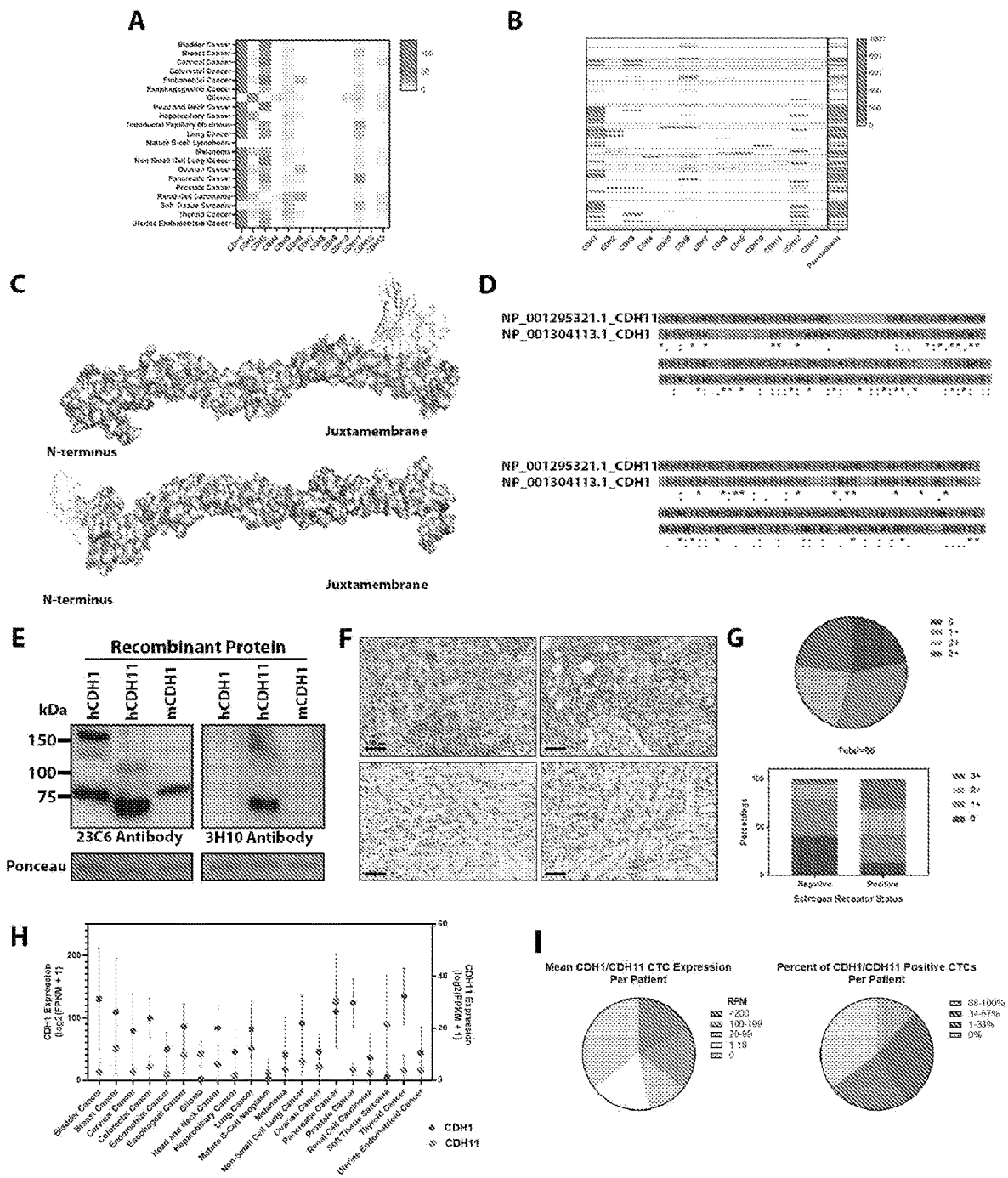
FIG. 25 shows an (A) analysis of RNA-Seq data from TCGA Pan-cancer analysis of whole genomes with mean value for the FPKM for each cancer type and each cadherin family member (B) RNA-seq from CTCs enriched from whole blood with the iChip microfluidic device and isolated as single cells. Expression values represent log 10(RPM+1). Grey horizontal lines demarcate individual patients. (C) shows a 3-dimensional modeling of the top two docking sites of the antigen binding region (ribbon model) of the 23C6 antibody on the extracellular domain of CDH11 (space filling model). Upper panel with delta E=−46.4 and lower panel model with delta E=−32.6. (D) Protein sequence alignment using Clustal omega of the two docking sites of the 23C6 antibody on CDH11 compared to the protein sequences for CDH1. Colors represent amino acid properties: Red=small; Blue=acidic; Magenta=basic; Green=Hydroxyl, sulfhydryl or amine. Symbols: "*"=conserved residue; ":"=conservation with strongly similar properties; "."=conservation with weakly similar properties. (E) shows a Western blot analysis of recombinant purified hCDH1, hCDH11 and mCDH1 proteins detected with 23C6 antibody or a CDH11 specific antibody 3H10. "h" indicates human and "m" indicated murine. Loading control with Ponceau staining. (F) shows an H&E staining (left panels) and 23C6 immunohistochemical staining (right panels) of representative sections of a breast cancer tumor array (G) Distribution (upper panel) and breakdown in ER positive and negative tumors (lower panel) of membranous staining intensity on a scale of 0 (no staining) to 3+(intense staining). (H) shows an analysis of RNA-Seq data from TCGA Pancancer analysis of whole genomes with mean value for the FPKM for CDH1 and CDH11. Error bars represents SD. Error bars represent SD. (I) shows RNA-seq from single cell CTCs enriched from whole blood from metastatic breast cancer patients. (Left panel) Proportion of patients with average expression of the combined sum of CDH1 and CDH11 in the indicated ranges. (Right panel) Proportion of CTCs with >5 RPM expression of CDH1 and CDH11 within individual patients.

To investigate the cadherin proteins as potential targets for the rational design of an antibody therapeutic, we examined the landscape of cadherin expression in both primary cancers and in circulating tumor cells (CTCs) from patients with metastatic cancer. RNA expression of the cadherin family, in the TCGA dataset across different histological types of primary cancers, shows high levels of expression outside of hematologic malignancies (FIG. 25A). E-cadherin (CDH1) is most highly expressed across epithelial cancers (97.2% of samples express >5 FPKM at the RNA level across 16 epithelial cancers), but significant heterogeneity across other cadherin family members is evident, with N-Cadherin (CDH2) (38.4%), P-cadherin (CDH3) (60.4%) and OB-Cadherin (CDH11) (38.9%) as the dominant family members expressed in epithelial cancers.

Figure 26:
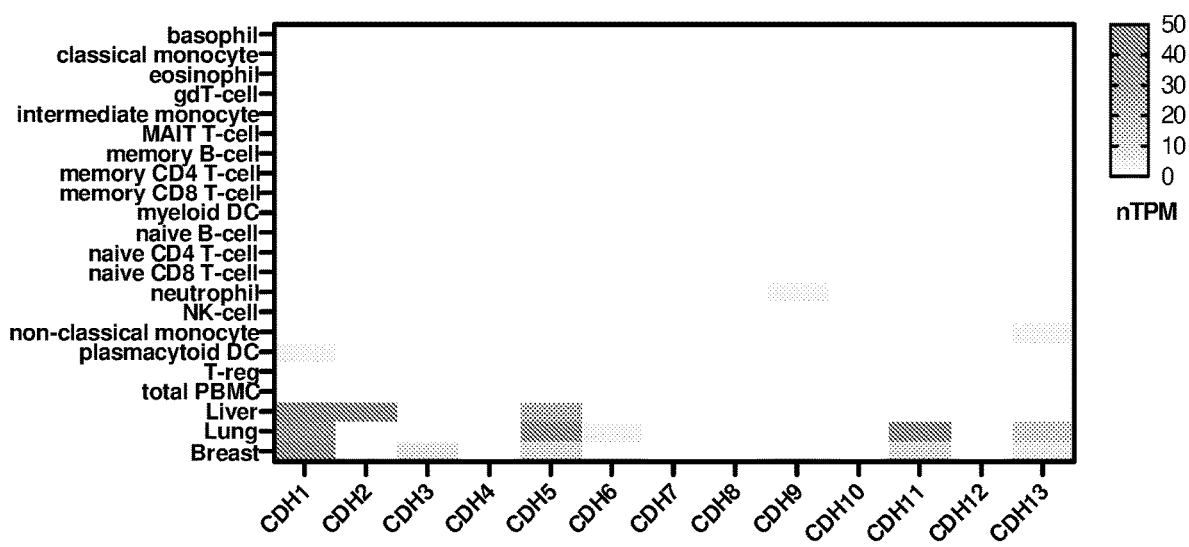
FIG. 26 shows that RNA analysis of Human Protein Atlas blood cell transcript expression level for CDH family members in 18 blood cell types, total peripheral blood mononuclear cells and representative epithelial tissue. Values represent normalized transcripts per million (nTPM).

To further characterize the heterogeneity of cadherin expression, single cell RNA-Seq of CTCs isolated from patients with metastatic hormone receptor positive (HR+) breast cancer was analyzed. Compared with primary tumors, CTCs demonstrate considerably higher variability in cadherin expression: E-cadherin is again the predominant cadherin in breast CTCs, but with only 32.1% of single CTCs expressing at >5 RPM (34/106 CTCs from 32 patients) (FIG. 25B). Combining all cadherins with >5 RPM achieves coverage of 61.3% of CTCs. In contrast, the expression of the cadherin family in hematopoietic cells is minimal compared the expression in epithelial tissue (FIG. 26). Together, this analysis indicated that targeting multiple cadherin family members would have the advantage of addressing heterogeneity in expression of individual gene family members across CTCs.

Figure 27:
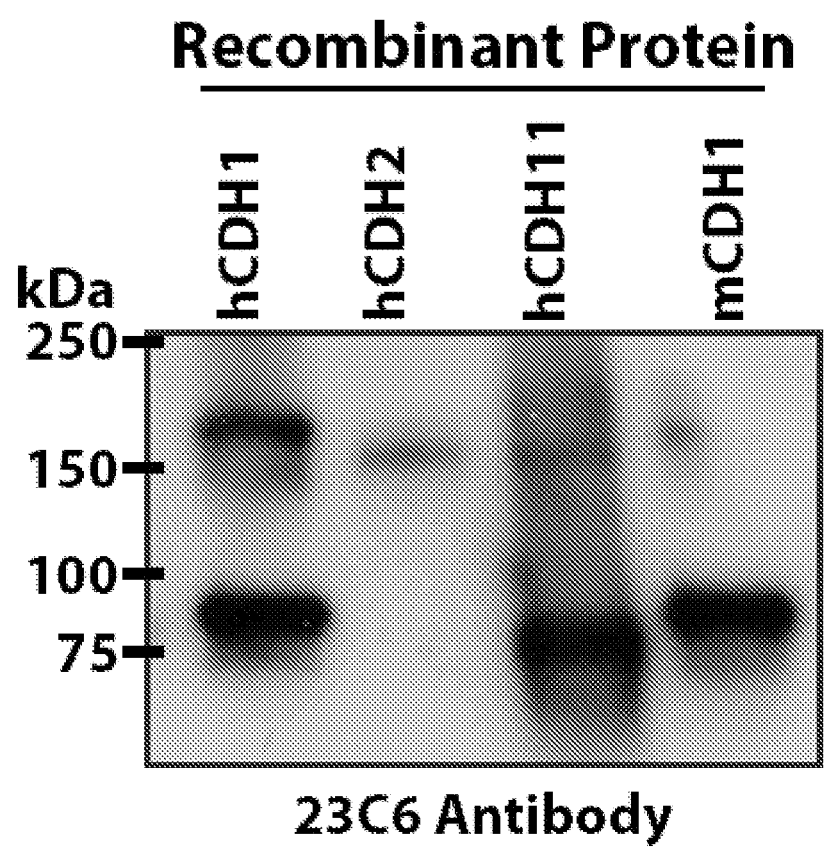
FIG. 27 shows the Western blot analysis of recombinant purified CDH proteins detected with 23C6 antibody. "h" indicates human and "m" indicated murine.

The mouse monoclonal antibody 23C6 was initially developed against the extracellular domain of CDH11 (Lee et al. Science 315, 1006-1010 (2007)). Upon sequencing its variable domains and modeling their potential binding to Cadherin-11, two potential binding sites were identified within the extracellular domain (FIG. 25C), both of which are highly conserved in CDH1 (58.5% and 42.9% amino acid homology for potential binding sites 1 and 2, respectively) (FIG. 25D). Western blot analysis revealed strong reactivity with recombinant human CDH11, as well as human and murine CDH1 that was not observed with an independent CDH11 antibody (3H10) (FIG. 25E), consistent with the recognition of a conserved region. Lesser reactivity with human CDH2 (FIG. 27) was observed. To confirm the dual specificity of the 23C6 antibody, a shCDH11 knockdown cell lines in MDA-MB-231 cells that do not express CDH1 (FIG. 28) and observed a loss of signal detecting CDH11 by western blot (FIG. 29A-B) were generated. Furthermore, expression of CDH1 in PDAC9 cells that predominantly express CDH1 and demonstrate a shift in the reactivity with the 23C6 antibody by flow cytometry (FIG. 27, FIG. 33C-E) was knocked down. To determine the spectrum of breast cancers with reactivity to the 23C6 antibody, a tumor array of 96 breast cancers consisting of HR+, HER2+ and triple negative (TNBC) breast cancers was stained. Immunohistochemical staining demonstrated a cell membrane staining pattern, with 79% of all breast cancers having strong staining of tumor cells, including 88% of HR+ and 60% of TNBC subtypes of breast cancers (FIG. 25F and FIG. 25G).

Figure 30:
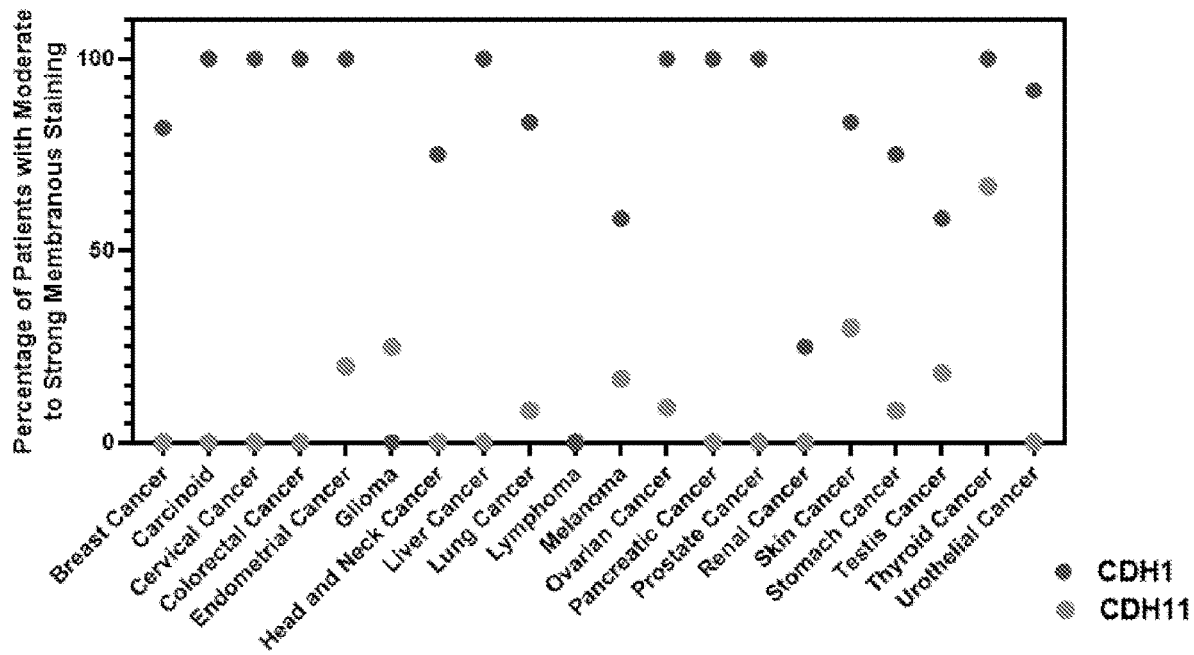
FIG. 30 shows the percentage of patients with moderate to strong membranous immunohistochemical staining of CDH1, CDH2 or CDH11 from the Human Protein Atlas version 21.0 for each indicated cancer type.
Figure 31:
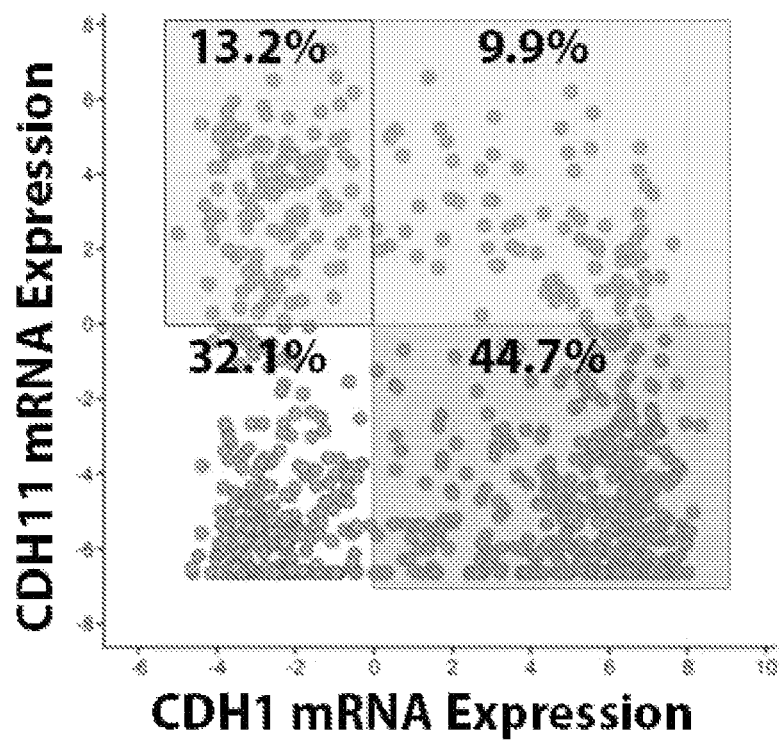
FIG. 31 shows the RNA expression of CDH1, CDH2 and CDH11 in the Cancer Cell Line Encyclopedia (CCLE) on a 3-dimensional scatter plot. Blue indicates cell lines with expression of CDH1, CDH2 or CDH11 above 1 RPKM. Red indicates cell lines with expression of CDH1, CDH2 and CDH11 below 1 RPKM.

Given that the 23C6 antibody recognizes CDH1 and CDH11, the expression of these two cadherin family members at the RNA and protein level across different cancer types was evaluated. With the exception of hematologic malignancies, virtually all cancers express detectable RNA and protein for at least one of these cadherin genes (FIG. 25H, FIG. 30). Our findings that 624/921 (67.8%) express high levels (>5 RPM) of at least one of these two cadherins (FIG. 31). Finally, across metastatic breast cancer patients, 47.1% (8/17) have a combined average expression of CDH1 and CDH11 in their CTCs greater than >20 RPM and 41.2% (7/17) of patients with greater than one third of their CTCs expressing CDH1 or CDH11 (FIG. 25I).

Suppression of Metastasis by 23C6 Antibody in a Mouse Breast Tumor Model

Figure 32:
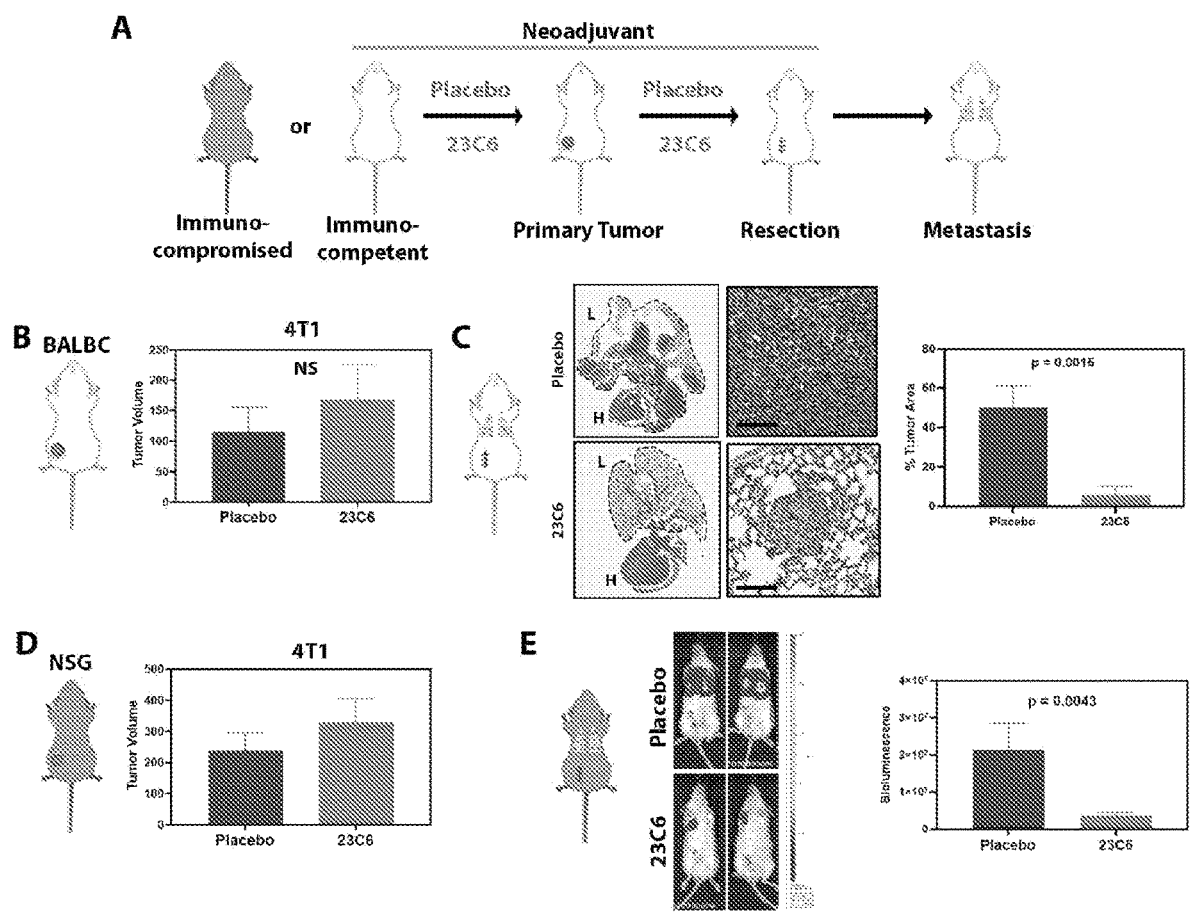
FIG. 32 shows a (A) schema for the mouse models of neoadjuvant placebo or 23C6 treatment (B) shows tumor volume measurements of 4T1 orthotopic mammary gland tumors in BALBC immunocompetent mice treated with placebo or 23C6 antibody at day 20 prior to resection. (C) shows representative H&E sections of lung and heart whole mount (lungs outlined with dashed line) in placebo and 23C6 treated mice. High magnification section of representative lung metastases. Right panel with quantified percentage tumor area. (D) shows tumor volume measurements of 4T1 orthotopic mammary gland tumors in NSG immunocompromised mice treated with placebo or 23C6 antibody at day 20 prior to resection. (E) shows a representative whole body bioluminescent images in placebo and 23C6 treated mice. Right panel with quantification of total body bioluminescent imaging. Error bars represent SEM. P values calculated by unpaired Mann-Whitney Tests.

To assess the potential anti-metastatic activity of the 23C6 antibody, first murine TNBC-related 4T1 breast cancer cells was selected, whose tumorigenicity in syngeneic mice provides a model for ADCC and immune related functions. Following orthotopic mammary gland inoculation of 4T1 cells, mice were treated twice weekly antibody treatment (5 mg/kg intraperitoneal injection) (FIG. 32A). Primary tumor growth was not significantly different between placebo and 23C6 treated mice (FIG. 32B). Tumors were resected after 20 days (median size 200 mm$^3$) followed by continued antibody treatment, and the metastatic burden in the lungs was assessed after 36 days. Antibody-treated mice showed a dramatic decrease in metastatic burden, both in the number and size of metastatic deposits (tumor percentage of 50.3 vs 5.8%; p=0.0015) suggesting that 23C6 impairs blood-borne metastasis in this model (FIG. 32C).

To test whether the effect of the 23C6 antibody is dependent on an intact immune system, the 4T1 tumorigenesis experiment in NSG immunocompromised mice was repeated. Compared with the immunocompetent model, 4T1 cells generated larger primary tumors in NSG mice, but again 23C6 antibody treatment did not impact primary tumor cell growth (FIG. 32D). However as in the immunocompetent model, there was a significant decrease in lung metastatic burden in mice treated with 23C6 antibody (FIG. 32E). Thus, antibody treatment effectively decreases blood-borne metastasis, independent of immune cell activation.

Efficacy of 23C6 Antibody in Human Tumor Xenografts

Figure 28:
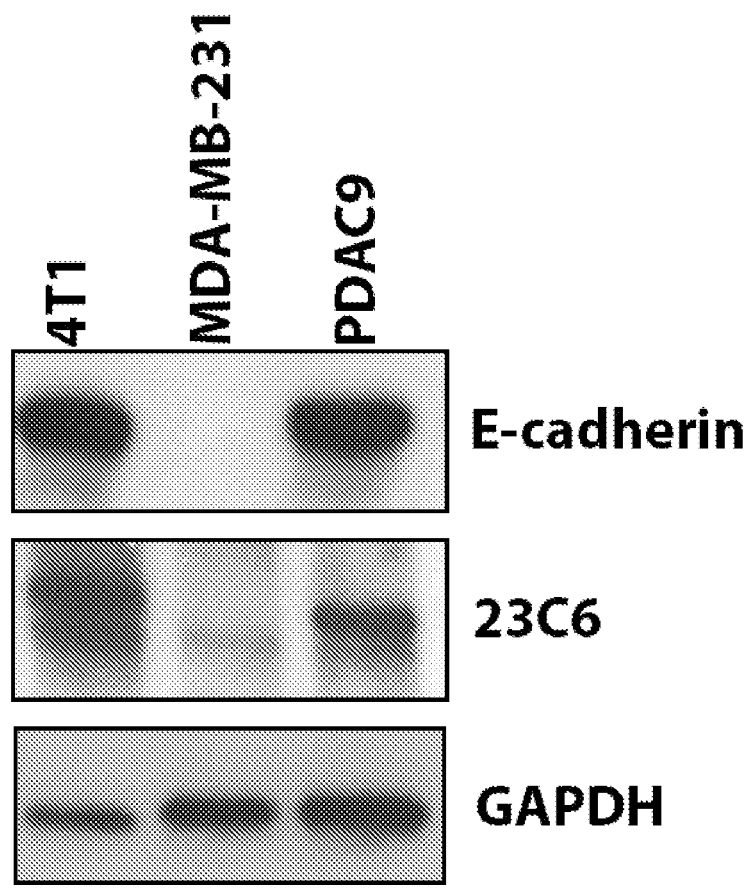
FIG. 28 shows the Western blot analysis with anti-E-cadherin antibody or 23C6 antibody in 4T1, MDA-MB-231 and PDAC9 whole cell lysates. GAPDH is a loading control.
Figure 33:
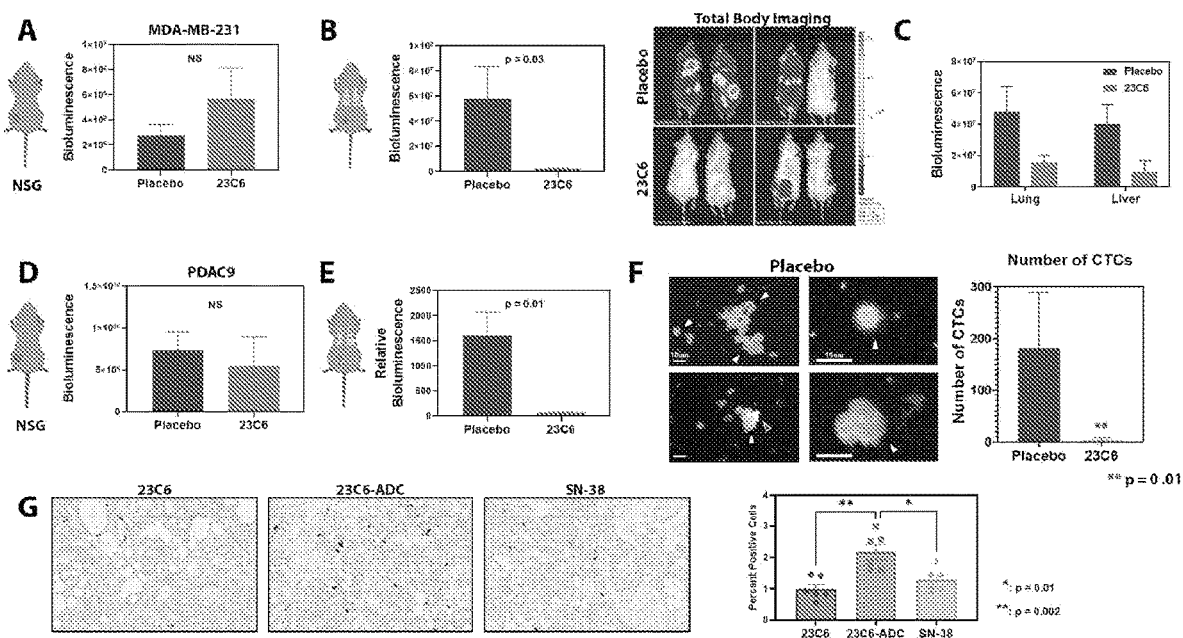
FIG. 33 shows (A) a primary tumor bioluminescence measurement of MDA-MB-231 orthotopic mammary gland tumors in NSG immunocompromised mice treated with placebo or 23C6 antibody at day 36 prior to resection. (B) shows a left panel with quantification of total body bioluminescent imaging of MDA-MB-231 cells in placebo and 23C6 treated mice. P values calculated by unpaired Mann-Whitney Tests. Right panel with representative whole body bioluminescent images. (C) shows quantification of ex vivo bioluminescent signal of the lung and liver from mice treated with placebo or 23C6 after dissection on Day 74. (D) shows primary tumor bioluminescence measurement of PDAC9 subcutaneous flank tumors in NSG immunocompromised mice treated with placebo or 23C6 antibody at day 32 prior to resection. (E) shows quantification of total body bioluminescent imaging of PDAC9 cells in placebo and 23C6 treated mice. P values calculated by unpaired Mann-Whitney Tests. (F) sows immunofluorescent imaging of single and clustered CTCs stained with DAPI (blue), human specific HLA antibody (green) or mouse specific CD45 (red). White arrowhead indicates CTCs while black arrowhead indicated CD45 positive cells. Right panel with quantification of the number of CTCs in PDAC9 injected, placebo and 23C6 treated mice. P values calculated by two tailed unpaired t test. (G) shows representative immunohistochemical staining of cleaved caspase-3 indicating apoptotic cells in primary tumors derived from PDAC9 cells in mice treated with naked 23C6, 23C6 conjugated to SN38 or an equimolar SN-38. Quantification of as the percentage of cleaved caspase-3 positive cells in right panel. P values calculated by two tailed unpaired t test. Error bars represent SEM.
Figure 34:
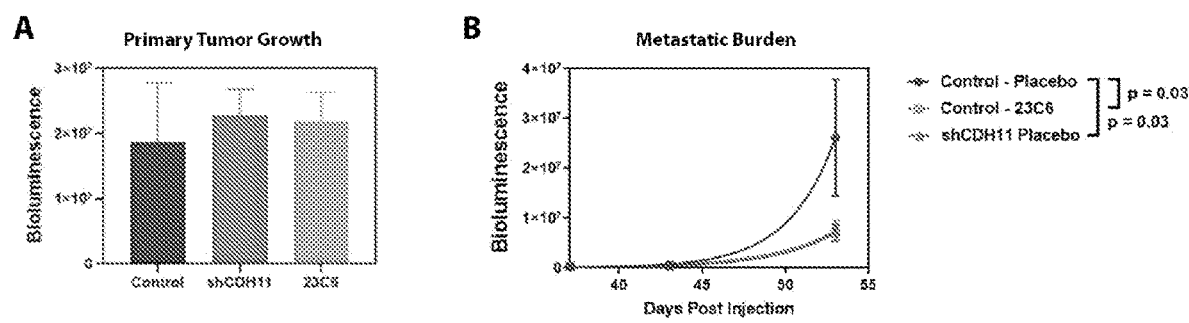
FIG. 34 shows (A) primary tumor bioluminescence measurement derived from orthotopic injection of MDA-MB-231 shRNA control or a shRNA CDH11 knockdown lines on day 35 prior to resection. Error bars represent SEM. (B) shows quantification of total body bioluminescent imaging of MDA-MB-231 shRNA control, a shRNA CDH11 knockdown line or treatment with 23C6. Error bars represent SEM. Curves were fit by the least squares method. P values were calculated by the extra sum-of-squares F test.

Studies of 23C6 antibody efficacy across different human xenograft models in NSG immunodeficient mice were extended. The MDA-MB-231 cell line is an aggressive and metastasis-prone model of the TNBC subtype of breast cancer, lacking expression of CDH1, but expressing CDH11 (FIG. 28). Orthotopic mammary tumor formation by these cells was not significantly affected by 23C6 treatment (FIG. 33A), but administration of antibody for 39 days before and 4 days after resection of the primary tumor was sufficient to significantly suppress metastatic burden in both lungs and liver (FIG. 33B-C). In these cells, shRNA-mediated knockdown using two independent constructs (68% and 83% knockdown) impaired metastatic growth without affecting primary tumor formation (FIG. 34). These observations suggest that CDH11-dependent functions may be disrupted either by antibody binding or genetic knockdown, with comparable consequences for metastasis in this model.

Figure 35:
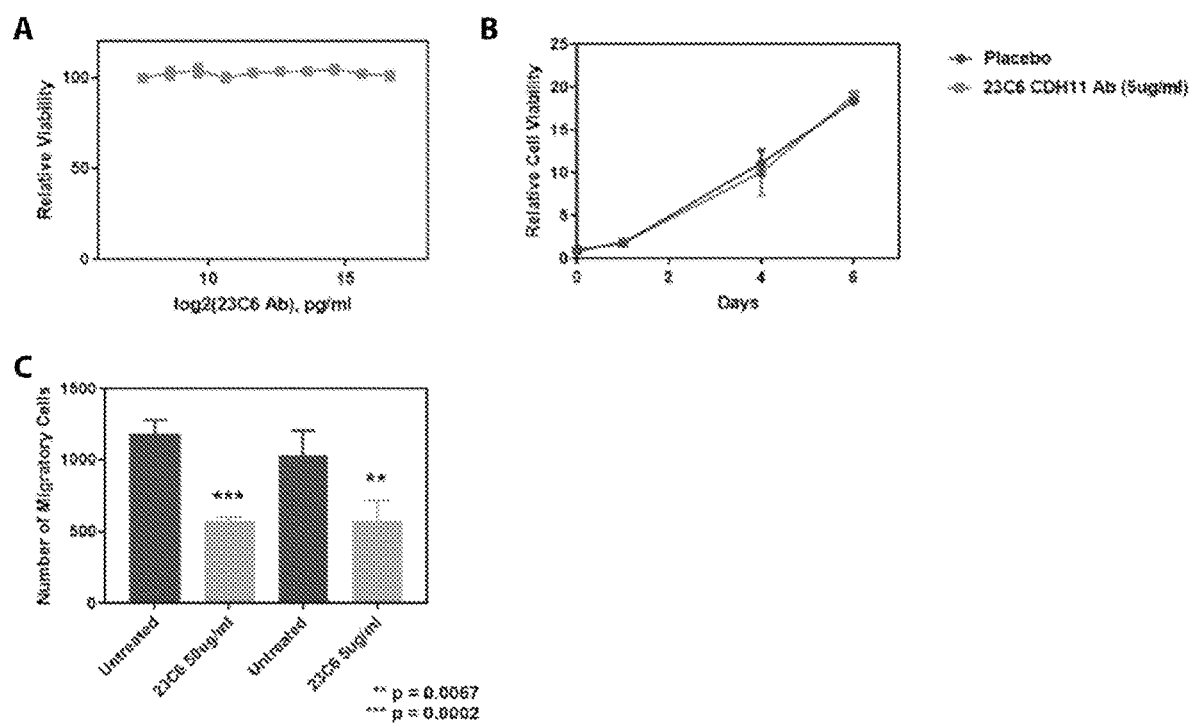
FIG. 35 shows (A) cell viability of MDA-MB-231 cells treated in vitro with increasing doses of 23C6 antibody. (B) shows proliferation of MDA-MB-231 cells treated in vitro with a single treatment of placebo or 23C6 antibody. (C) shows migration of MDA-MB-231 cells treated in vitro with a single treatment of placebo or 23C6 antibody through a transwell. Values represent the number of cells that traversed the membrane. P values calculated by two tailed unpaired t test. Error bars represent SD.

To investigate whether the 23C6 antibody directly affects cancer cells, MDA-MB-231 cells grown in vitro were treated with the 23C6 antibody and assessed viability, growth and invasiveness. Treatment with the 23C6 antibody did not affect cell viability even to high doses and did not impair cell proliferation (FIG. 35A-B). However, 23C6 antibody treatment decreased MDA-MB-231 cell migration through a Boyden chamber at high and low doses of the 23C6 antibody indicating that impaired motility may contribute to the observed anti-metastatic activity (FIG. 35C).

Figure 29:
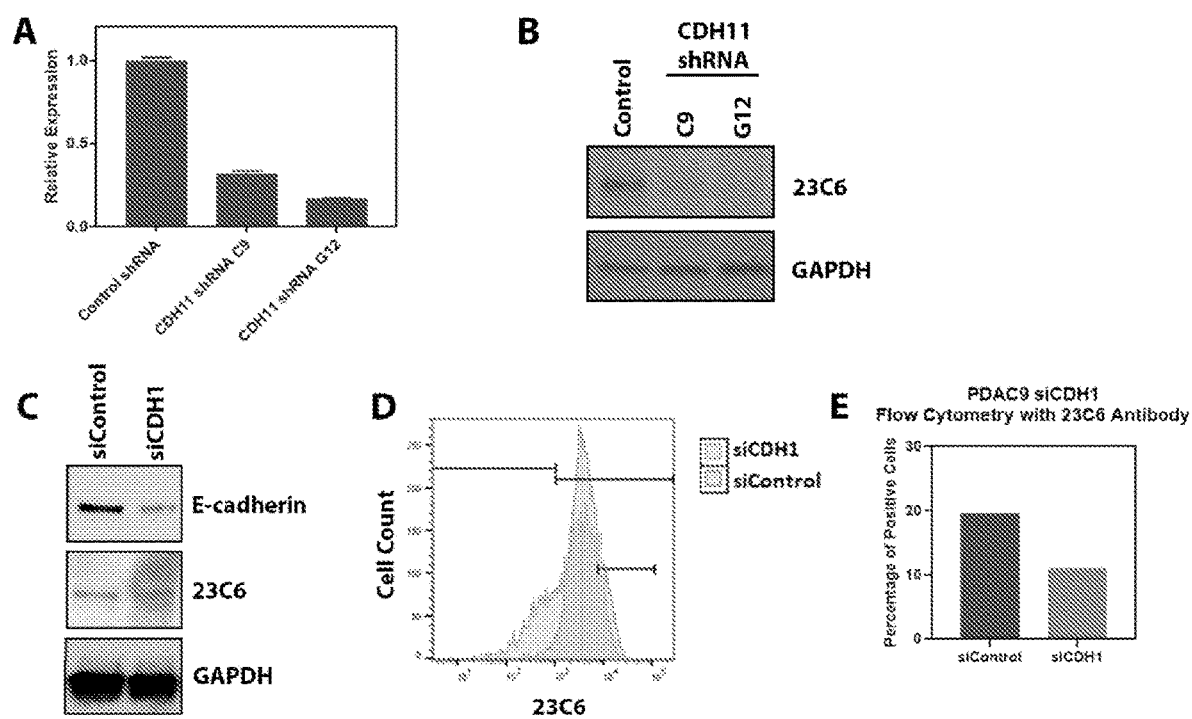
FIG. 29 shows a (A) quantitative PCR analysis of CDH11 RNA expression in MDA-MB-231 cells expressing a shRNA control or a shRNA CDH11 knockdown. (B) shows a Western blot analysis of cadherin protein expression in as detected by 23C6 in shRNA control and two shRNA CDH11 knockdown cell lines. GAPDH is a loading control. (C) shows a Western blot analysis with anti-E-cadherin antibody or 23C6 antibody in PDAC9 after siRNA knockdown of CDH1. (D) shows a flow cytometry histogram of PDAC9 cells with siControl or siCDH11 knockdown stained with 23C6 antibody. Cells were gated for singlets and live cells. (E) shows quantitation of flow cytometry to positive or negative cells based on indicated gates.

Like the TNBC subtype of breast cancer, pancreatic ductal adenocarcinoma (PDAC) represents a highly aggressive malignancy with limited treatment options and with heterogeneous expression of diverse cadherin proteins. The 23C6 antibody in a patient-derived pancreatic cell line was tested, PDAC9, that spontaneously develops metastases after subcutaneous injection. Western blot analysis demonstrates protein expression of E-cadherin and reactivity with the 23C6 antibody (FIG. 29C-E).

Primary tumor formation by PDAC9 cells in NSG mice was not significantly reduced by continuous treatment with the 23C6 antibody (FIG. 33D). However, after resection of the primary tumor, 23C6 antibody-treated mice had a 25-fold reduction in metastatic burden measured via total body luminescence (p=0.01) (FIG. 33E). Importantly, in this highly vascular invasive tumor model the number of CTCs in the blood at the terminal timepoint were enumerated. Antibody-treated mice demonstrated a 100-fold reduction in the number of CTCs (median 238 vs 4 CTC per ml of blood, p=0.01) (FIG. 33F). Together, these xenograft studies demonstrate the efficacy of a dual cadherin targeting antibody, across different tumor types, in suppressing blood-borne metastasis by epithelial cancers, even in immunosuppressed mouse models.

Figure 36:
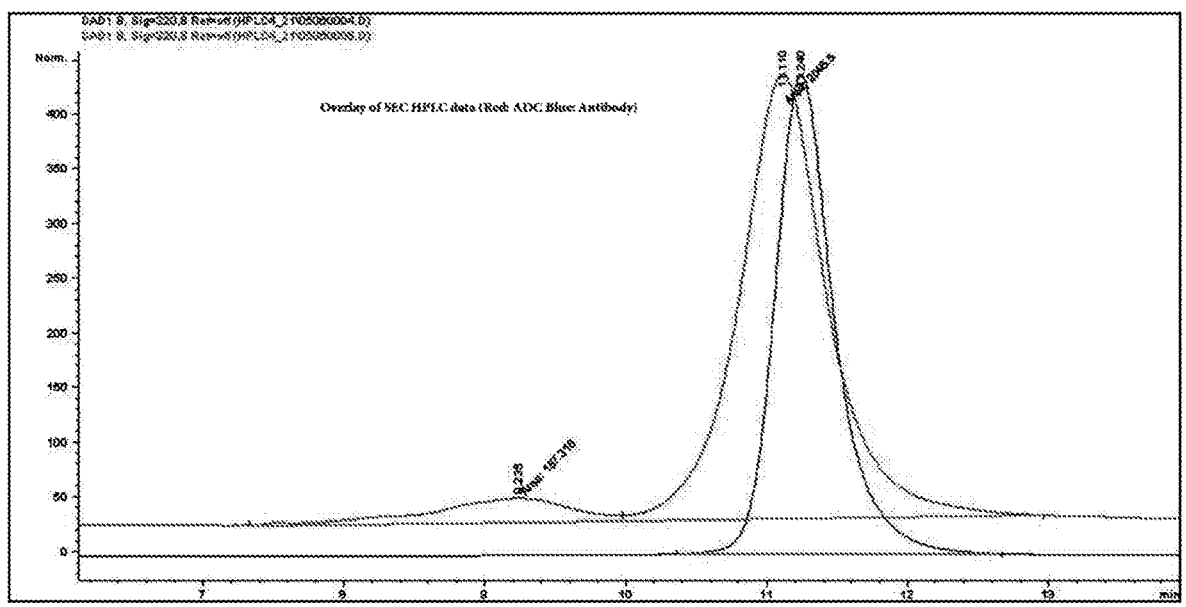
FIG. 36 shows the HPLC tracing of 23C6-SN38 (red) and naked 23C6 (blue).
Figure 37:
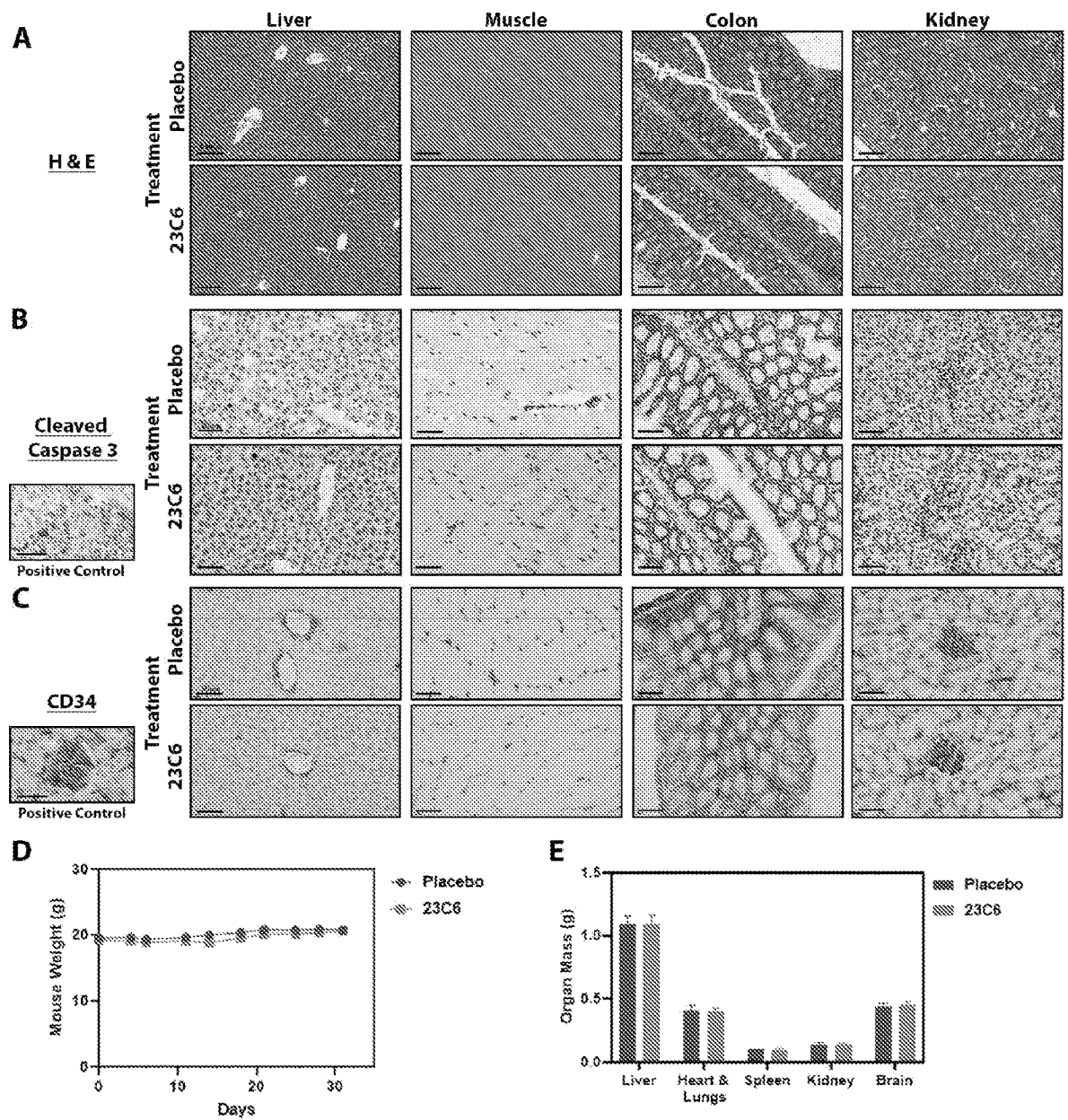
FIG. 37 shows (A) H&E staining (B) cleaved caspase 3 and (C) CD34 immunohistochemical staining of sections of organs derived from BALBC mice treated with placebo or 23C6. Positive control for cleaved caspase 3 and CD34 in inset. (D) shows measurement of mouse masses over time with treatment of a placebo or 23C6 antibody. (E) shows measurement of organ weights after treatment with placebo or 23C6 for 31 days upon necropsy. Error bars represent SEM.
Figure 38:
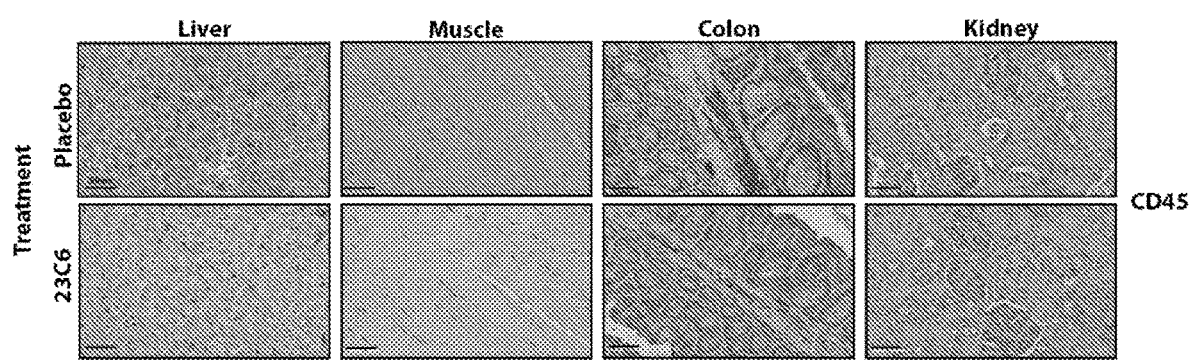
FIG. 38 shows CD45 immunohistochemical staining of sections of organs derived from BALBC mice treated with placebo or 23C6 for 43 days.

Next, the 23C6 antibody was conjugated to SN-38, the highly potent metabolite of the Topoisomerase I inhibitor irinotecan (Bailly et al., Pharmacol Res 148, 104398 (2019)). Successful conjugation was confirmed by HPLC (FIG. 36) and the drug:antibody ratio was calculated to be 1.84. Sufficient quantities of the 23C6-ADC were produced for a single administration in mice with an established PDAC9-derived tumor. Histological analysis at 8 days post-treatment demonstrated an increased fraction of apoptotic tumor cells (cleaved caspase-3) in 23C6-ADC treated mice (2.2%), compared with mice receiving either equimolar naked 23C6 antibody (1%, p=0.002) or equimolar SN-38 drug alone (1.3%, p=0.019) (FIG. 33G).

Lack of Toxicity to Normal Epithelial Tissues by Antibody 23C6

Figure 39:
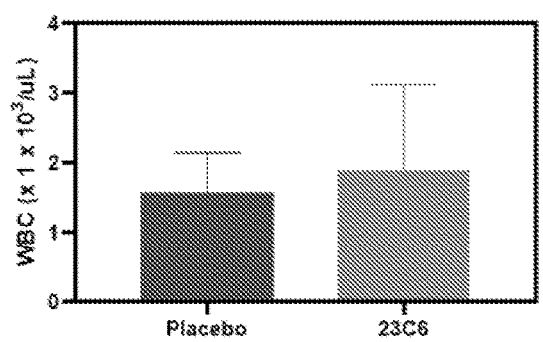
FIG. 39 shows the white blood cell count (left panel) and hemoglobin measurements (right panel) from BALBC mice treated with placebo or 23C6 for 31 days. Error bars represent SEM.
Figure 39:
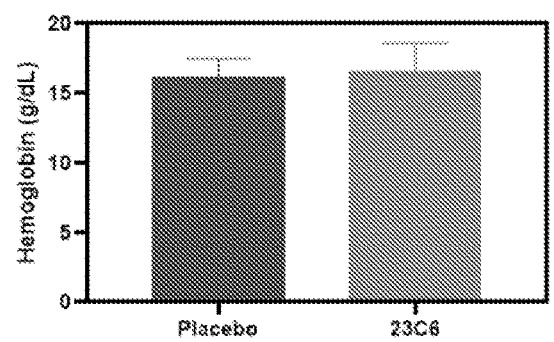

Cadherin expression is ubiquitous across normal epithelial tissues, raising the significant concern that therapeutic targeting of these proteins may induce antibody-mediated inflammation and toxicity in normal organs. The 23C6 antibody recognized recombinant murine E-cadherin protein (FIG. 25E), a cross-reactivity that is supported by its effectiveness against mouse 4T1 tumor cells. To examine the effect of antibody treatment on normal mouse organs, immunocompetent BALBC mice were treated with 23C6 antibody (5 mg/kg twice per week for 32 days), followed by histological analysis of multiple organs. Histological appearance of multiple tissues, including kidney, liver, colon and muscle, was indistinguishable between antibody- and placebo-treated mice, with no evidence of increased cell death (cleaved caspase-3), disruption of epithelial borders or blood vessels (CD34) or immune cell infiltration (CD45) (FIG. 37A-C, FIG. 38). At 32 days, antibody-treated mice were not externally distinguishable from controls, maintaining identical levels of activity and mass (mean mass 20.7 g for placebo vs 20.6 g for 23C6 treated mice), organ mass on necropsy (FIG. 37D-E), white blood cell count and hemoglobin levels in the blood (FIG. 39). Thus, despite their ubiquitous expression in normal tissues, targeting cadherins CDH1 and CDH11 does not result in evident toxicity.

Reactivity of the 23C6 Antibody Across Cancer Histologies

Figure 40:
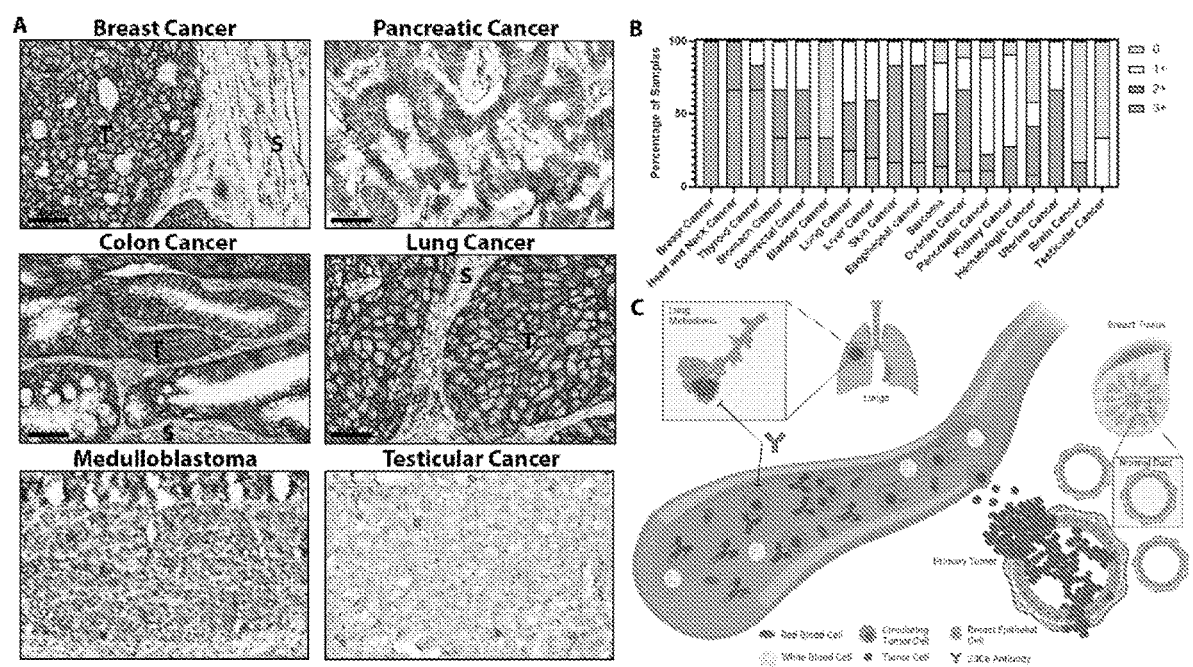
FIG. 40 shows (A) representative immunohistochemical staining with 23C6 of breast, pancreatic, colon and lung cancer, medulloblastoma and testicular cancer sections. T=tumor, S=stroma. (B) shows quantification of intensity of membrane staining of tumor sections from a tumor array on a scale of 0 (no staining) to 3+(intense staining). (C) shows a model of 23C6 antimetastatic activity. Primary tumor cells access the circulation as CTCs and then exit the vasculature at a distant organ site as precursors of metastases. The 23C6 antibody decreases the number of CTCs in circulation and inhibits metastatic spread without affecting primary tumor growth or normal organs and tissues of the body.

To determine the spectrum of cancers with potential reactivity for the 23C6 antibody, a tumor tissue array with 124 individual samples derived from 18 different human cancers was stained. All solid tumor types, with the exception of medulloblastoma, testicular and bladder cancers, had more than 50% of samples positive for membranous staining using the 23C6 antibody (FIG. 40A-B). Breast cancers, across all histological subtypes, show the highest proportion of tumors with strong staining for 23C6. However other prevalent cancer types including pancreatic cancer, colon cancers and lung cancers frequently showed high reactivity with the 23C6 antibody, expanding the potential activity of the 23C6 antibody to other common cancers.

Here, we have shown that an antibody targeting multiple cadherins, expressed in both epithelial (CDH1) and mesenchymal (CDH11) cell types does not appear to be toxic to normal tissues, and does not suppress primary tumor formation, but effectively suppresses the blood-borne metastatic spread to lungs and other distant organs (FIG. 40C).

The above-described results were generated using the following materials and methods.

Materials and Methods

Antibody Generation

The 23C6 antibody was generated as previously described (Lee et al., Science 315, 1006-1010 (2007)). The hybridoma derived 23C6 clone was expanded for bioreactor production, purified and concentrated (Antibody Solutions Santa Clara, CA). Conjugation of the 23C6 antibody was performed using PerKit™ Antibody SN38 Conjugation Kit (Cell Mosaic). Briefly, 1 mg of 23Cg was prepared and then added to 0-succinyl SN38 NHS ester and incubated at RT overnight according to the manufacturer's recommendation. The conjugate was then purified using a desalting column washed and eluted. Analysis of the antibody conjugate was performed using HPLC and to determine the concentration of the SN38-labelled 23C6, DAR by UV/Vis spectrophotometry was performed. The drug to antibody ratio was ~1.84 and the aggregation was ~8%.

Antibody Binding Modeling

The next generation sequencing was used to determine the RNA sequence of the V-region of the heavy and light chains for 23C6 from the hybridoma. The protein amino acid sequence was modeled using I-TASSER (Roy et al., Nat Protoc 5, 725-738 (2010), Roy et al., Nucleic Acids Res 40, W471-477 (2012)) multiple template threading methodology in the NovaFold application software (DNASTAR Inc., Madison, WI). A 3-D analysis of the predicted structure of the Fab for the 23C6 antibody was generated. SwarmDock was used for the protein-protein docking analysis (Torchala et al., Methods Mol Biol 1137, 181-197 (2014)).

Western Blot Analysis

Western blot analysis was performed on whole cell extracts prepared with RIPA buffer. Proteins were separated on 4-15% polyacrylamide gradient-SDS gels (Bio-Rad), and transferred onto nitrocellulose membrane (Invitrogen). Immunoblots were visualized with Enhanced Chemiluminescence (Perkin-Elmer). Primary antibodies were used against E-cadherin (1:5000; BDBiosciences Clone 36), N-cadherin (1:500; EBiosciences Clone 8C11) and GAPDH (1:2000; Millipore ABS16). 23C6 was also used as a primary antibody for western blot analysis (1:250). Recombinant protein obtained as follows: human CDH1 (R&D Systems 8505-EC-050), murine CDH1 (R&D Systems 8875-EC-050), human CDH2 (R&D Systems 1388NC050) and human CDH11 (Elabscience #PKSH032136).

Quantitative Realtime PCR

RNA was isolated using RNeasy Mini Kits (Qiagen). RNA was reverse transcribed using Superscript III First Strand Synthesis Supermix (Invitrogen). TaqMan probe and primer sets for CDH11 and GAPDH were used.

Histology and Immunohistochemistry

Tumors and multiple organs were fixed in 10% formalin overnight, then preserved in 70% ethanol. The tissue was embedded in paraffin and cut in 5-μm sections. For histologic analysis, sections were stained with hematoxylin and eosin or immunohistochemical staining was performed. Tissues were permeabilized, and antigen retrieval was performed in 1× citrate buffer (pH 6) for 15 min. Slides were washed and blocked for 30 min with 5% goat serum. Sections were incubated with primary antibodies against 23C6 (1:250), CD45 (1:2000; Abcam ab281586), CD34 (1:2000; Abcam ab81289), Cleaved caspase-3 (1:1000; Cell Signaling Technology 9664S) for 1 hour at room temperature. Slides were incubated with HRP anti-rabbit antibody (DAKO) for 30 min. After washing with PBS, the sections were incubated in 3,3'-diaminobenzidine (Vector Laboratories) for 10 min. Cells were counterstained with Gill's #2 haematoxylin for 10-15 s. Stained tissue sections were digitized using the Aperio CSO (Leica Biosystems) or Vectra Polaris (Perkin Elmer). Tumor foci in the lungs were quantified by Halo Imaging software (Indica Labs). Tissue and tumor arrays were obtained from US Biomax and prepared and stained as described above.

Cell Culture

Cell lines were routinely checked for mycoplasma (MycoAlert, Lonza), and were obtained from ATCC. 4T1 and MDA-MB-231 were grown as recommended by ATCC. PDAC9 were grown as previously described (Porter et al., Proc Natl Acad Sci USA, (2019)). Viability assays were performed at 48 hours after treatment with varying concentration of the 23C6 antibody or PBS control. Viability was determined using Cell Titer Glo reagent (Promega). Proliferation assays were performed by treating MDA-MB-231 cells with a single dose of 23C6 antibody or PBS control and timepoints as indicated, where the relative cell number was determined with the Cell TiterGlo reagent. For migration assays, the MDA-MB-231 cells were harvested with trypsin, and the cells suspended in serum free media. The cell suspension was added to the upper chamber of a Boyden chamber cell culture plate insert with a gradient generated by adding full serum media in the lower chamber. The cell suspensions were treated with 23C6 or control, and after 48 hours, the number of cells migrating through the membrane was determined by crystal violet staining and microscopic imaging with automated counting of individual cells using Image J. For siRNA knockdown, ONTARGETplus siRNA smartpools (Horizon Discovery) were obtained and transfected using Lipofectamine RNAiMax reagent (Invitrogen) and the cells harvested for analysis after 5 days. For flow cytometry, in brief the cells were fixed with 4% PFA, blocked with 5% BSA in PBS and incubated with the 23C6 antibody at 1:500 followed by anti-mouse IgG-AlexaFlour 555 and then analyzed on BD Fortessa machine.

Lentivirus Production

HEK293T cells were grown in high-glucose DMEM supplemented with 10% fetal bovine serum and 1% penicillin/streptomycin. Cells were transfected at ~80% confluency with Lipofectamine (Invitrogen). 24 h after transfection, the media was changed. Virus supernatant was harvested 48 h post-transfection, filtered through a 0.45 μm PVDF filter.

Lentiviral Transduction

MDA-MB-231 cells were transduced with shCDH11 encoding lentivirus in 6-well plates in 2 mL media supplemented with 6 μg/mL Polybrene. 24 h after infection, media was changed. 72 h after infection, cells were selected using puromycin (3 μg/mL) for 7 days.

Mouse Experiments

NOD.Cg-Prkdcscid II2rgtm1Wjl/SzJ (NSG) and BALB/cj mice were obtained from The Jackson Laboratory. 4T1, MDA-MB-231 and PDAC9 cell lines were labeled with GFP-Luciferase for in vivo imaging. Female mice approximately 6 weeks old were injected with 10,000 4T1 cells or 200,000 MDA-MB-231 cells into the fourth mammary gland. For PDAC9, 200,000 cells were injected subcutaneously in the flank. All injections were performed with a 1:1 mixture of growth factor depleted Matrigel. Primary and metastatic growth was measured weekly via in vivo imaging using the IVIS Lumina II (PerkinElmer) following intraperitoneal injection of D-luciferin (Sigma). For 4T1 injections into BALB/c mice in vivo tumor caliper measurements were used for the primary tumor. At the time of primary tumor resection, the mice were anesthetized with isoflurane and the tumor resected under sterile conditions with the use of electric cautery. Oral analgesics were administered per standard animal protocols with buprenorphine. The mice were monitored 2-3 times per week. At the terminal time points, the mice were either injected with D-luciferin for ex vivo organ bioluminescence imaging or a blood collection from cardiac sampling. The mice were treated with twice weekly intraperitoneal injections of placebo (sterile PBS) or 23C6 antibody with 5 mg/kg dosing. For the 23C6-ADC experiment, a PDAC9 derived primary tumor was generated by injection of 500,000 cells subcutaneously in the flank. After primary tumor formation on day 14 post-injection, a single dose of equimolar 23C6, 23C6-SN-38 or SN38 was administered via intraperitoneal injection. The mice were sacrificed after an additional 7 days and the tumor harvested for IHC. For 23C6 toxicity experiments, female BALB/c mice were treated with twice weekly intraperitoneal injections of placebo (sterile PBS) or 23C6 antibody with 5 mg/kg dosing for 31 days. Body weight was monitored twice weekly. At the termination of this experiment, the organs were harvested, weighed and prepared for IHC. A sample of blood was collected for complete blood count analysis.

CTC Isolation and Identification

On average per mouse, 440μL of blood was obtained via retroorbital collection at the terminal timepoint, directly into EDTA, for a final concentration of 5 mM. Tumor-derived cells and cell clusters were then concentrated and separated from white blood cells, red blood cells, platelets and plasma by size-based sorting using our microfluidic CTC cluster chip, at 10 psi input pressure, as described (Edd et al., Lab Chip 20, 558-567 (2020)). After this isolation into a clean buffer (0.2% F127 in PBS), purified CTCs and CTC clusters were fixed (0.5% PFA, 10 min), plated onto slides using the Shandon EZ megafunnel (Thermo Fisher) and Cytospin cytocentrifuge (2000 rpm, 5 min), and then processed for automated immunofluorescent imaging. Staining highlighted human HLA (clone W6/32 in AlexaFluor 488, BioLegend) on CTCs, mouse CD45 (30-F11 clone in AlexaFluor 647, BioLegend) and CD16+CD32 (2.4G2 clone in AlexaFluor 647, LSBio) on white blood cells, and cell nuclei (DAPI). Slide images were captured and digitized with Vectra Polaris multispectral imaging (PerkinElmer). Image analysis was performed with Halo imaging software (Akoya Biosciences) to identify potential CTCs and then manually evaluated and enumerated.

Bioinformatic Analysis

For analysis of the TCGA data, RNA-Seq data for the CDH family of genes across cancer types was accessed from cBioPortal. Values representing transcripts per millions were utilized and the mean expression values across each individual cancer type was plotted on a heat map or scatter plot with SD values represented by the error bars. For analysis of single cell RNA-Seq dataset from breast cancer CTCs, the CTCs were isolated, RNA isolated and processing of RNA-Seq data performed as previously described (Ebright et al., Science 367, 1468-1473 (2020)). Expression of CDH family of genes was determined as log 10(RPM+1) and represented on a heat map grouped by individual patients and individual CTCs. For analysis of CCLE, the dataset was downloaded from (sites.broadinstitute.org/ccle/datasets) as RPKM. The data was log transformed and plotted on a 3-dimensional axis using OriginLab. For analysis of CDH expression across blood cell types in ProteinAtlas, the data was downloaded from (www.proteinatlas.org/about/download) and TPM values plotted on a heat map. The proportion of patients with strong to moderate staining for CDH1, CDH2, and CDH11 protein was calculated and plotted. Unless otherwise noted, plots and graphs were generated with GraphPad. Model was generated with Biorender software.

Other Embodiments

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the invention that come within known or customary practice within the art to which the invention pertains and may be applied to the essential features hereinbefore set forth, and follows in the scope of the claims.

Other embodiments are within the claims.

What is claimed is:

1. A method for treating or delaying progression of a cancer in an individual, said method comprising administering to the individual an effective amount of an antibody that binds cadherin-11 (CDH11) comprising a CDR-H1 comprising the amino acid sequence of SEQ ID NO: 1;
   a CDR-H2 comprising the amino acid sequence of SEQ ID NO: 2;
   a CDR-H3 comprising the amino acid sequence of SEQ ID NO: 3;
   a CDR-L1 comprising the amino acid sequence of SEQ ID NO: 4;
   a CDR-L2 comprising the amino acid sequence of SEQ ID NO: 5; and
   a CDR-L3 comprising the amino acid sequence of SEQ ID NO: 6;
   wherein the cancer expresses CDH11.

2. The method of claim 1, wherein the antibody binds to a circulating tumor cell.

3. The method of claim 1, wherein the cancer is a localized cancer.

4. The method of claim 1, wherein the method suppresses metastasis.

5. The method of claim 1, wherein the method comprises a neoadjuvant therapy in combination with chemotherapy, radiation therapy, hormone therapy, targeted therapy, immunotherapy, or biological therapy.

6. The method of claim 1, wherein the method comprises an adjuvant therapy alone or in combination with chemotherapy, radiation therapy, hormone therapy, targeted therapy, or biological therapy.

7. The method of claim 1, wherein the cancer is a metastatic cancer.

8. The method of claim 7, wherein the metastatic cancer is breast cancer.

9. The method of claim 7, wherein the metastatic cancer is pancreatic cancer.

10. The method of claim 1, wherein the method comprises administering one or more chemotherapeutic agents.

11. The method of claim 1, wherein the method comprises administering radiation therapy.

12. The method of claim 1, wherein the antibody comprises:
(a) a heavy chain variable region (HCVR) sequence having at least 90% sequence identity to the amino acid sequence of SEQ ID NO: 7;
(b) a light chain variable region (LCVR) sequence having at least 90% sequence identity to the amino acid sequence of SEQ ID NO: 8; or
(c) a HCVR sequence as in (a) and a LCVR sequence as in (b).

13. The method of claim 1, wherein the antibody comprises a HCVR comprising the amino acid sequence of SEQ ID NO: 7 and a LCVR comprising the amino acid sequence of SEQ ID NO: 8.

14. The method of claim 1, wherein the antibody is a monoclonal antibody.

15. The method of claim 1, wherein the antibody is a humanized antibody, a chimeric antibody, or a bi-specific antibody.

16. The method of claim 1, wherein the antibody is a full-length antibody.

17. The method of claim 1, wherein the antibody is an antibody fragment that binds to CDH11.

18. The method of claim 17, wherein the antibody fragment is selected from the group consisting of Fab, Fab'-SH, Fv, scFv, and (Fab') 2 fragments.

19. The method of claim 1, wherein the antibody is an IgG1, IgG2*a,* or IgG2*b* antibody.

20. The method of claim 1, wherein the antibody is conjugated to a cytotoxic agent.

21. The method of claim 20, wherein the cytotoxic agent is SN-38.

22. The method of claim 1, wherein the antibody also binds CDH1.

* * * * *